(12) United States Patent
Kim et al.

(10) Patent No.: US 12,142,194 B2
(45) Date of Patent: Nov. 12, 2024

(54) DISPLAY APPARATUS

(71) Applicant: SAMSUNG ELECTRONICS CO., LTD., Suwon-si (KR)

(72) Inventors: Jinho Kim, Suwon-si (KR); Tetsuya Shigeta, Suwon-si (KR); Jongsu Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/118,583

(22) Filed: Mar. 7, 2023

(65) Prior Publication Data
US 2023/0230536 A1 Jul. 20, 2023

Related U.S. Application Data

(63) Continuation of application No. PCT/KR2021/013558, filed on Oct. 5, 2021.

(30) Foreign Application Priority Data

Nov. 4, 2020 (KR) .................. 10-2020-0146257
May 21, 2021 (KR) .................. 10-2021-0065556

(51) Int. Cl.
*G09G 3/32* (2016.01)
(52) U.S. Cl.
CPC ....... *G09G 3/32* (2013.01); *G09G 2300/0842* (2013.01); *G09G 2320/0209* (2013.01);
(Continued)
(58) Field of Classification Search
CPC ............. G06F 3/147; G09G 2300/026; G09G 2300/043; G09G 2300/0819;
(Continued)

(56) References Cited

U.S. PATENT DOCUMENTS 8,614,697 B2   12/2013   Kim et al.
10,706,766 B2   7/2020   Kim et al.
(Continued)

FOREIGN PATENT DOCUMENTS

JP    2019-148737 A   9/2019
KR    10-0811552 B1   3/2008
(Continued)

OTHER PUBLICATIONS

International Search Report (PCT/ISA/210) issued Jan. 24, 2022 by the International Searching Authority in International Application No. PCT/KR2021/013558.
(Continued)

*Primary Examiner* — Kenneth Bukowski
(74) *Attorney, Agent, or Firm* — Sughrue Mion, PLLC

(57) ABSTRACT

A display apparatus includes a display panel including: a pixel array in which pixels including a plurality of light-emitting elements are arranged in a plurality of row lines and sub-pixel circuits provided for each of the plurality of light-emitting elements and providing a driving current to the light-emitting elements. The display apparatus also includes a drive unit is configured to: set image data voltages to the sub-pixel circuits of the display panel in a row line order during a data setting period for each row line; and drive the sub-pixel circuits to provide the driving current to the light-emitting elements of the pixel array in the row line order based on a sweep signal sweeping from a first voltage to a second voltage and the set image data voltages during a light-emitting period for each row line.

13 Claims, 62 Drawing Sheets

(52) U.S. Cl.
CPC ............... *G09G 2320/0233* (2013.01); *G09G 2320/0633* (2013.01); *G09G 2330/021* (2013.01)

(58) Field of Classification Search
CPC ... G09G 2300/0842; G09G 2310/0259; G09G 2310/0262; G09G 2310/0283; G09G 2310/0286; G09G 2320/0209; G09G 2320/0223; G09G 2320/0233; G09G 2320/0242; G09G 2320/043; G09G 2320/0633; G09G 2330/021; G09G 2330/12; G09G 3/2014; G09G 3/2025; G09G 3/32; G09G 3/3241; G09G 3/3258; G09G 3/3266
See application file for complete search history.

(56) References Cited

U.S. PATENT DOCUMENTS

| | | | |
|---|---|---|---|
| 10,713,996 | B2 | 7/2020 | Kim et al. |
| 11,056,047 | B2 | 7/2021 | Shigeta et al. |
| 11,100,840 | B2 | 8/2021 | Kim et al. |
| 11,210,995 | B2 | 12/2021 | Kim et al. |
| 11,398,181 | B2 | 7/2022 | Kim et al. |
| 11,508,287 | B2 | 11/2022 | Kim et al. |
| 2011/0084993 | A1 | 4/2011 | Kawabe |
| 2013/0127812 | A1 | 5/2013 | Abe et al. |
| 2018/0301080 | A1* | 10/2018 | Shigeta .................. G09G 3/32 |
| 2019/0371231 | A1* | 12/2019 | Kim .................. G09G 3/2081 |
| 2020/0111403 | A1 | 4/2020 | Kim et al. |
| 2020/0111404 | A1* | 4/2020 | Kim .................. G09G 3/2011 |
| 2020/0265777 | A1 | 8/2020 | Shigeta et al. |
| 2020/0312216 | A1 | 10/2020 | Kim et al. |
| 2020/0312229 | A1 | 10/2020 | Kim et al. |
| 2021/0210003 | A1* | 7/2021 | Kim .................. G09G 3/2014 |
| 2021/0304670 | A1 | 9/2021 | Shigeta et al. |
| 2021/0312856 | A1* | 10/2021 | Jeong .................. G09G 3/32 |
| 2021/0375185 | A1 | 12/2021 | Kim et al. |
| 2022/0327995 | A1 | 10/2022 | Kim et al. |

FOREIGN PATENT DOCUMENTS

| | | |
|---|---|---|
| KR | 10-2017-0037127 A | 4/2017 |
| KR | 10-2019-0069114 A | 6/2019 |
| KR | 10-2020-0038735 A | 4/2020 |
| KR | 10-2020-0038741 A | 4/2020 |
| KR | 10-2020-0101605 A | 8/2020 |
| KR | 10-2020-0114868 A | 10/2020 |
| KR | 10-2020-0115003 A | 10/2020 |
| KR | 10-2021-0087867 A | 7/2021 |

OTHER PUBLICATIONS

Written Opinion PCT/ISA/237) issued Jan. 24, 2022 by the International Searching Authority in International Application No. PCT/KR2021/013558.
Communication issued on Nov. 16, 2023 by the European Patent Office in European Patent Application No. 21889399.8.

* cited by examiner

DISPLAY APPARATUS

CROSS-REFERENCE TO RELATED APPLICATIONS

This application is a by-pass continuation application of International Application No. PCT/KR2021/013558, filed on Oct. 5, 2021, which based on and claims priority to Korean Patent Application No. 10-2020-0146257, filed on Nov. 4, 2020, and Korean Patent Application No. 10-2021-0065556, filed on May 21, 2021, in the Korean Intellectual Property Office, the disclosures of which are incorporated by reference herein in their entireties.

BACKGROUND

1. Field

The disclosure relates to a display apparatus, and more particularly, to a display apparatus including a pixel array including light-emitting elements.

2. Description of Related Art

In the related art, in a display panel in which inorganic light-emitting elements such as a red light-emitting diode (LED), a green LED, and a blue LED are driven as sub-pixels, a gradation of sub-pixels was expressed through a Pulse Amplitude Modulation (PAM) driving method.

In this case, according to a magnitude of a driving current, the gradation of the emitted light and the wavelength of the emitted light change, and thus, color reproducibility of the image is reduced. FIG. 1 illustrates a change in wavelength based on a magnitude of a driving current flowing in a blue LED, a green LED, and a red LED.

Therefore, a method of driving a self-luminous display panel capable of improving the color reproducibility is needed. In this case, problems of power consumption, luminance uniformity, horizontal crosstalk, etc., need to be considered together.

SUMMARY

Provided are a display apparatus capable of providing improved color reproducibility for an input image signal, and a method of driving the same.

Provided are a display apparatus including a sub-pixel circuit capable of driving an inorganic light-emitting element more efficiently and stably, and a method of driving the same.

Provided are a display apparatus including a driving circuit suitable for high-density integration by optimizing a design of various circuits for driving an inorganic light-emitting element, and a method of driving the same.

Provided are a display apparatus capable of solving a problem of deterioration in luminance uniformity due to a deviation in threshold voltage or mobility of a driving transistor, and a method of driving the same.

Provided are a display apparatus capable of reducing power consumption when driving a display panel, and a method of driving the same.

Provided are a display apparatus capable of compensating for an influence of a drop in driving voltage that occurs differently for each position of a display panel on a process of setting a data voltage, and a method of driving the same.

Provided are a display apparatus capable of improving problems of luminance non-uniformity and horizontal crosstalk due to a sweep rod, and a method of driving the same.

According to an aspect of the disclosure, a display apparatus includes: a display panel including: a pixel array in which pixels including inorganic light-emitting elements are arranged in a plurality of row lines; and sub-pixel circuits provided for each of the inorganic light-emitting elements and configured to provide a driving current to the inorganic light-emitting elements; and a drive unit configured to: set image data voltages to the sub-pixel circuits of the display panel in a row line order during a data setting period for each row line; and drive the sub-pixel circuits to provide the driving current to the inorganic light-emitting elements of the pixel array in the row line order based on a sweep signal sweeping from a first voltage to a second voltage and the set image data voltages during a light-emitting period for each row line, wherein each of the sub-pixel circuits includes: a capacitor that has a first end to which the sweep signal is applied; and a first driving transistor that is connected to a second end of the capacitor, receives the sweep signal through the capacitor in the light-emitting period, and is configured to control a time when the driving current is provided to a inorganic light-emitting element based on the sweep signal, and wherein the drive unit is further configured to apply the first voltage to the first end of the capacitor separately from the sweep signal in the data setting period.

The drive unit may include: a sweep driver circuit provided for each row line and configured to provide the sweep signal to the first end of the capacitor; and a power integrated circuit (IC) configured to provide the first voltage applied separately from the sweep signal to the display panel.

The image data voltage may include a constant current generator data voltage and a pulse width modulation (PWM) data voltage, and each of the sub-pixel circuits may further include: a constant current source circuit that may include a second driving transistor and is configured to provide a driving current having a magnitude based on the constant current generator data voltage to the inorganic light-emitting element; and a PWM circuit that includes the first driving transistor and is configured to control a time in a case that the driving current is provided to the inorganic light-emitting element based on the PWM data voltage.

The constant current source circuit may be further configured to set a third voltage based on the constant current generator data voltage and the threshold voltage of the second driving transistor to a gate terminal of the second driving transistor in the data setting period, and the PWM circuit may be further configured to generate a fourth voltage based on the PWM data voltage and the threshold voltage of the first driving transistor while the first voltage is applied to one end of the capacitor in the data setting period.

The constant current source circuit may be further configured to provide a driving current having a magnitude based on the third voltage to the inorganic light-emitting element in the light-emitting period, and the PWM circuit may be further configured to control a time when the driving current is provided to the inorganic light-emitting element based on a voltage of a gate terminal of the first driving transistor that changes from the fourth voltage based on the sweep signal in the light-emitting period.

The sub-pixel circuits may be driven in order of the data setting period and a plurality of light-emitting periods for each row line, and the drive unit may be further configured to drive the sub-pixel circuits of the row line such that a driving current corresponding to the set image data voltage is provided to the inorganic light-emitting elements of the row line in each of the plurality of light-emitting periods.

The display apparatus may further include: a sensing unit configured to sense a current flowing in the first driving transistor and the second driving transistor of each of the sub-pixel circuits, respectively, based on a specific voltage applied to the sub-pixel circuit, the sensing unit being configured to output sensing data corresponding to the sensed current sensing unit; and a correction unit that is configured to correct the constant current generator data voltage and the PWM data voltage applied to the sub-pixel circuits based on the sensing data.

The drive unit may be further configured to: set the image data voltage in the row line order in the sub-pixel circuits based on a first driving voltage in the data setting period, and drive the sub-pixel circuits such that the driving current is provided to the inorganic light-emitting elements of the pixel array in the row line order based on a second driving voltage and the first driving voltage.

The display apparatus may further include a storage unit configured to store data for compensating for a drop in a driving voltage for each position of the display panel based on the driving current, and the correction unit may be further configured to correct the constant current generator data voltage and the PWM data voltage applied to the sub-pixel circuits based on the sensing data and the stored data.

According to an aspect of the disclosure, a display apparatus includes: a display panel including a pixel array in which pixels including a inorganic light-emitting elements are arranged in a row lines and sub-pixel circuits provided for each of the inorganic light-emitting elements and are configured to provide a driving current to the inorganic light-emitting elements; and a drive unit configured to: set image data voltages to the sub-pixel circuits of the display panel in a row line order during a data setting period for each row line, and drive the sub-pixel circuits to provide the driving current to the inorganic light-emitting elements of the pixel array in the row line order based on a sweep signal sweeping from a first voltage to a second voltage and the set image data voltages during a light-emitting period, wherein each of the sub-pixel circuits includes: a capacitor; and a first driving transistor that is connected to a first end of the capacitor, and is configured to control a time when the driving current is provided to a inorganic light-emitting element based on the sweep signal, and wherein the drive unit may be further configured to apply the first voltage to a second end of the capacitor separately from the sweep signal.

The drive unit may include: a sweep driver circuit provided for each row line and configured to apply the sweep signal to the first driving transistor; and a power integrated circuit (IC) configured to provide the first voltage applied separately from the sweep signal to the display panel.

The image data voltage may include a constant current generator data voltage and a pulse width modulation (PWM) data voltage, and each of the sub-pixel circuit may include: a constant current source circuit that includes a second driving transistor, and is configured to provide a driving current having a magnitude based on the constant current generator data voltage to the inorganic light-emitting element; and a PWM circuit that includes the first driving transistor and is configured to control a time when the driving current is provided to the inorganic light-emitting element based on the PWM data voltage.

The constant current source circuit may be further configured to set a third voltage based on the constant current generator data voltage and the threshold voltage of the second driving transistor to a gate terminal of the second driving transistor in the data setting period, and the PWM circuit may be further configured to generate a fourth voltage based on the PWM data voltage and the threshold voltage of the first driving transistor while the first voltage is applied to one end of the capacitor in the data setting period.

The constant current source circuit may be further configured to provide a driving current having a magnitude based on the third voltage to the inorganic light-emitting element in the light-emitting period, and the PWM circuit may be further configured to control a time when the driving current is provided to the inorganic light-emitting element based on a difference in voltage between a source terminal and a gate terminal of the first driving transistor that changes based on the sweep signal in the light-emitting period.

The sub-pixel circuits may be driven in order of the data setting period and a plurality of light-emitting periods for each row line, and the drive unit may be further configured to drive the sub-pixel circuits of the row line such that a driving current corresponding to the set image data voltage is provided to the inorganic light-emitting elements of the row line in each of the plurality of light-emitting periods.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

When it is decided that a detailed description for the known art related to the present disclosure may unnecessary obscure the gist of the present disclosure, it will be omitted. In addition, redundant description of the same configuration will be omitted as much as possible.

In addition, terms "unit" for components used in the following description are used only to easily make the disclosure. Therefore, these terms do not have meanings or roles that distinguish from each other in themselves.

Terms used in the specification are used to describe embodiments, and are not intended to restrict and/or limit the disclosure. Singular forms are intended to include plural forms unless the context clearly indicates otherwise.

It will be understood that terms 'include' or 'have' used in the present disclosure, specify the presence of features, numerals, steps, operations, components, parts mentioned in the present specification, or a combination thereof, but do not preclude the presence or addition of one or more other features, numerals, steps, operations, components, parts, or a combination thereof.

Expressions "first", "second", "1st", "2nd", or the like, used in the present disclosure may indicate various components regardless of a sequence and/or importance of the components, will be used only in order to distinguish one component from the other components, and do not limit the corresponding components.

When it is mentioned that any component (for example: a first component) is (operatively or communicatively) coupled with/to or is connected to another component (for example: a second component), it is to be understood that any component is directly coupled to another component or may be coupled to another component through the other component (for example: a third component).

On the other hand, when it is mentioned that any component (for example: a first component) is "directly coupled" or "directly connected" to another component (for example: a second component), it is to be understood that the other component (for example: a third component) is not present between any component and another component.

Terms used in exemplary embodiments of the present disclosure may be interpreted as the same meanings as meanings that are generally known to those skilled in the art unless defined otherwise.

Hereinafter, one or more embodiments of the present disclosure will be described in detail with reference to the accompanying drawings.

Figure 1:
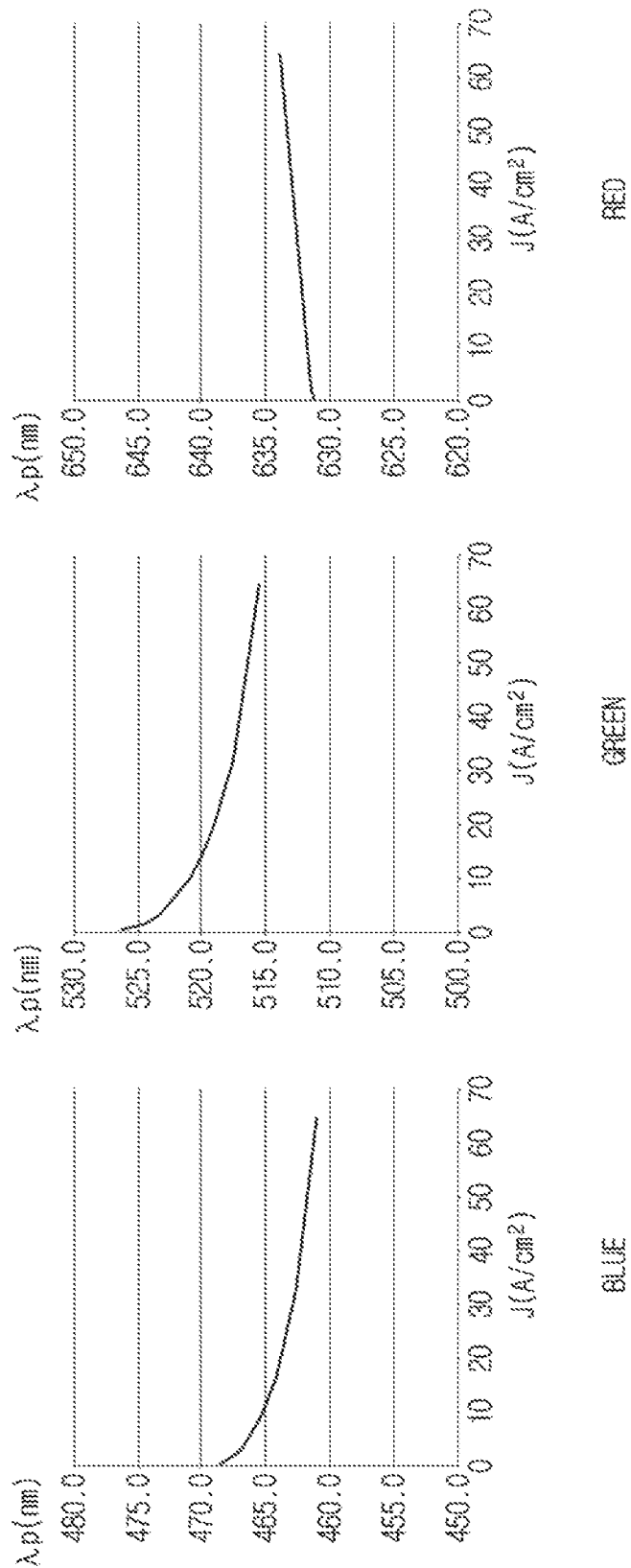
FIG. 1 is a graph illustrating a change in wavelength according to a magnitude of a driving current flowing in a blue Light Emitting Diode (LED), a green LED, and a red LED.
Figure 2:
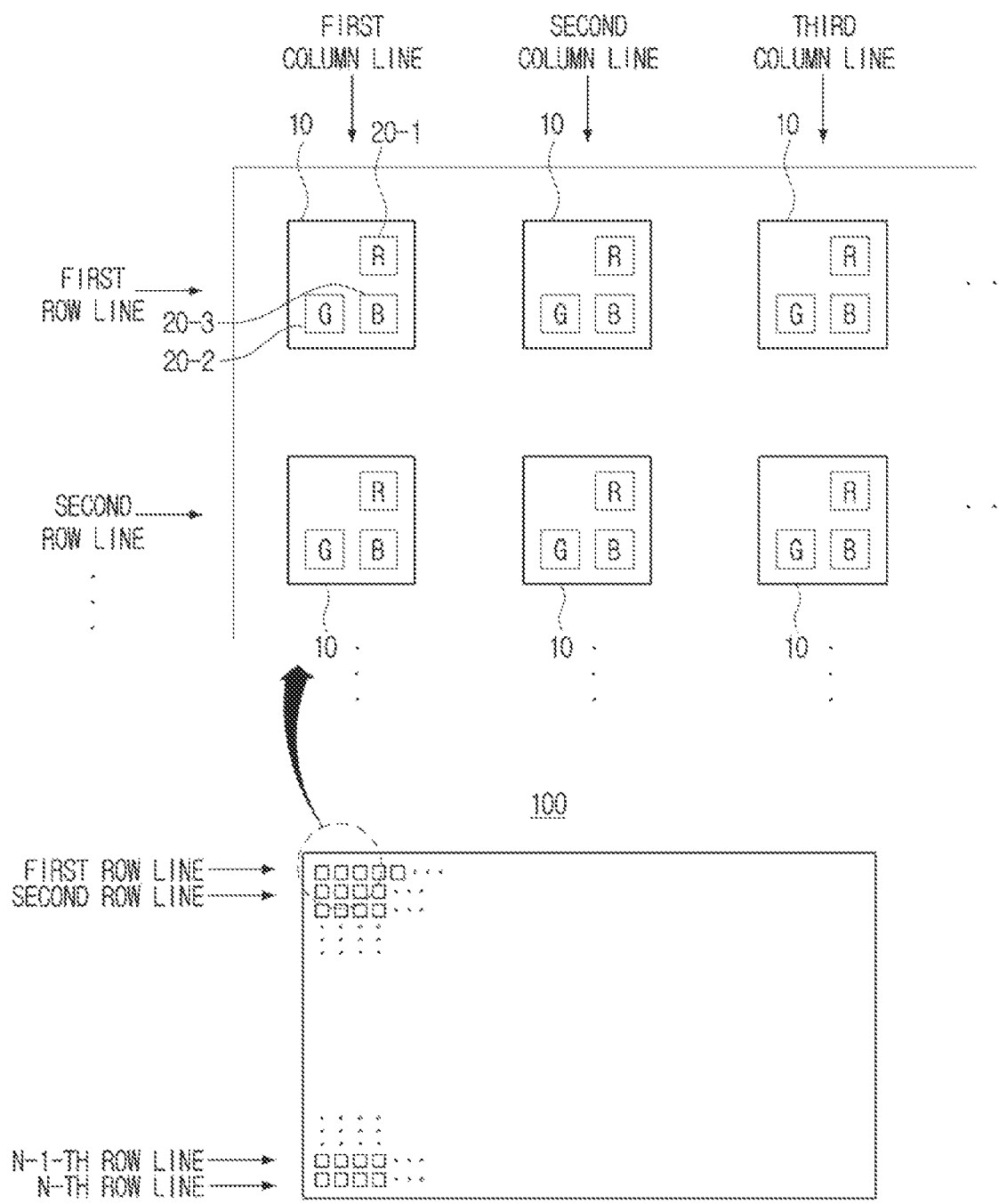
FIG. 2 is a diagram for describing a pixel structure of a display apparatus according to an embodiment of the present disclosure.

FIG. 2 is a view for describing a pixel structure of a display panel according to an embodiment of the present disclosure. In FIG. 2, a display panel 100 includes a plurality of pixels 10 disposed (or arranged) in a matrix form, that is, a pixel array.

The pixel array includes a plurality of row lines or a plurality of column lines. In some cases, the row line may be referred to as a horizontal line, a scan line, or a gate line, and the column line may be referred to as a vertical line or a data line.

Alternatively, in some cases, the terms the row line, the column line, the horizontal line, and the vertical line may be used to refer to lines on a pixel array, and the terms the scan line, the gate line, and the data line may also be used as the term to refer to actual wiring on the display panel 100 to which data or signals are transmitted.

Each pixel 10 of the pixel array may include three types of sub-pixels such as a red (R) sub-pixel 20-1, a green (G) sub-pixel 20-2, and a blue (B) sub-pixel 20-3. In this case, each pixel 10 may include a plurality of inorganic light-emitting elements constituting the sub-pixels 20-1, 20-2, and 20-3.

For example, each pixel 10 may include three types of inorganic light-emitting elements such as an R inorganic light-emitting element constituting the R sub-pixel 20-1, a G inorganic light-emitting element constituting the G sub-pixel 20-2, and a B inorganic light-emitting element.

Alternatively, each pixel 10 may include three blue inorganic light-emitting elements. In this case, a color filter for implementing R, G, and B colors may be provided on each inorganic light-emitting element. In this case, the color filter may be a Quantum Dot (QD) color filter, but is not limited thereto.

A sub-pixel circuit for driving the inorganic light-emitting element may be provided in the display panel 100 for each inorganic light-emitting element. In this case, each sub-pixel circuit may provide a driving current to the inorganic light-emitting element based on the applied image data voltage.

Specifically, the image data voltage includes a constant current generator data voltage and a Pulse Width Modulation (PWM) data voltage. Each sub-pixel circuit may express a gradation of an image by providing a driving current having a magnitude corresponding to the constant current generator data voltage to an inorganic light-emitting element for a time corresponding to the PWM data voltage. Details thereof will be described below.

Sub-pixel circuits included in each row line of the display panel 100 may be driven in the order of "setting (or programming) of an image data voltage" and "providing of a driving current based on the set PWM data voltage." In this case, according to an embodiment of the present disclosure, sub-pixel circuits included in each row line of the display panel 100 may be sequentially driven in row line order.

For example, an operation of setting image data voltages of sub-pixel circuits included in one row line (e.g., first row line) and an operation of setting image data voltages of sub-pixel circuits included in a next row line (e.g., second row line) may sequentially proceed in the row line order. Also, the operation of providing the driving current of the sub-pixel circuits included in one row line and the operation of providing the driving current of the sub-pixel circuits included in the next row line may also sequentially proceed in the row line order.

In FIG. 2, the sub-pixels 20-1 to 20-3 are arranged in an L-shape in which the left and right sides are reversed in one pixel area as an example. However, the embodiment is not limited thereto. The R, G, and B sub-pixels 20-1 to 20-3 may be arranged in a row within a pixel area or may be arranged in various forms according to the embodiment.

In addition, in FIG. 2, three types of sub-pixels have been described as constituting one pixel as an example. However, according to other embodiments, four types of sub-pixels such as R, G, B, and white (W) may constitute one pixel, or any number of other sub-pixels may constitute one pixel.

Figure 3A:
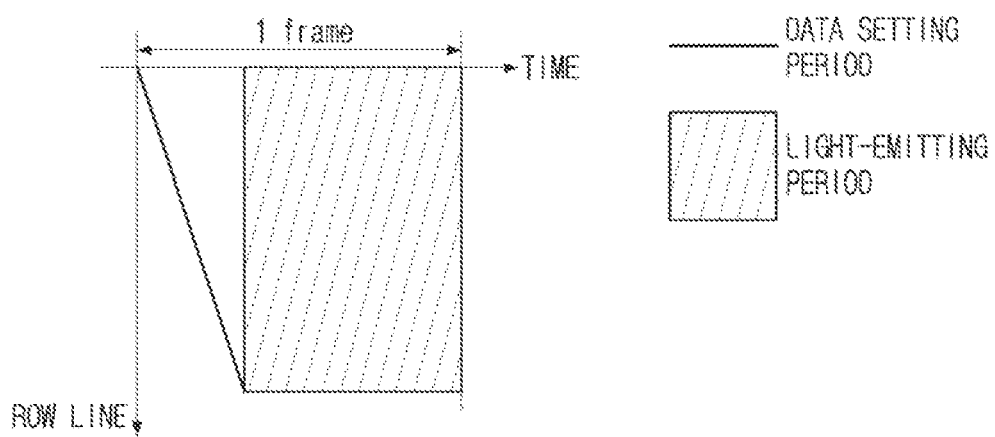
FIG. 3A is a conceptual diagram illustrating a method of driving a display panel in the related art.
Figure 3B:
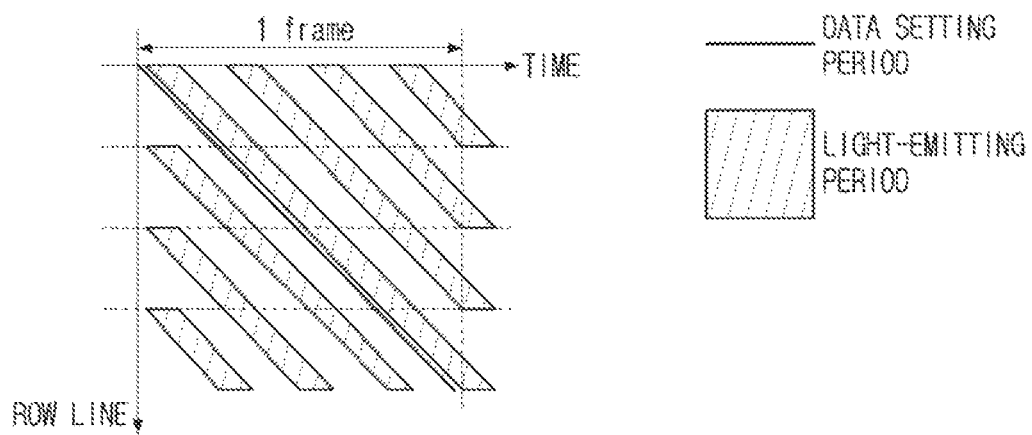
FIG. 3B is a conceptual diagram illustrating a method of driving a display panel according to an embodiment of the present disclosure.

FIG. 3A is a conceptual diagram illustrating a method of driving a display panel in the related art, and FIG. 3B is a conceptual diagram illustrating a method of driving a display panel according to an embodiment of the present disclosure.

FIGS. 3A and 3B illustrate a method of driving a display panel for one image frame time. Also, in FIGS. 3A and 3B, a vertical axis represents a row line, and a horizontal axis represents a time. In addition, a data setting period represents a driving period of the display panel 100 in which image data voltages are set to sub-pixel circuits included in each row line, and the light-emitting period represents a driving period of the display panel 100 in which sub-pixel circuits included in each row line provide a driving current to an inorganic light-emitting element based on a set image data voltage. The inorganic light-emitting elements emit light according to the driving current in the light-emitting period.

According to FIG. 3A, in the related art, after the setting of the image data voltages for all row lines of the display panel is completed, the light-emitting period proceeds collectively. In this case, since all the row lines of the display panel simultaneously emit light during the light-emitting period, a high peak current is required, so there is a problem in that peak power consumption required for products increases. When the peak power consumption increases, the capacity of a power supply device such as a Switched Mode Power Supply (SMPS) mounted in products increases, so cost and volume increase, resulting in design constraints.

On the other hand, according to an embodiment of the present disclosure, as illustrated in FIG. 3B, the data setting period and the light-emitting periods (specifically, a plurality of light-emitting periods) of each row line sequentially proceed in the row line order. Hereinafter, the driving method illustrated in FIG. 3B will be referred to as a "progressive driving method" to be distinguished from the collective driving method of FIG. 3A. In the case of the progressive driving method, since the number of simultaneously emitting row lines is reduced, the required peak current amount is lowered compared to the related art, so the peak power consumption may be reduced.

As described above, according to one or more embodiments of the present disclosure, by PWM-driving the inorganic light-emitting element in an Active Matrix (AM) method, it is possible to prevent a phenomenon in which a wavelength of light emitted by an inorganic light-emitting element changes according to the gradation. In addition, instantaneous peak power consumption may be reduced by driving the display panel 100 such that sub-pixels sequentially emit light in the row line order.

The sub-pixel circuit providing the driving current to the inorganic light-emitting element includes a driving transistor. The driving transistor is a key component that determines the operation of the sub-pixel circuit. Theoretically, electrical characteristics such as a threshold voltage Vth or mobility p of the driving transistor need to be the same among the sub-pixel circuits of the display panel 100.

However, the threshold voltage Vth and mobility p of the actual driving transistor may have deviations for each sub-pixel circuit due to various factors such as a process deviation or an aging change, and such deviations cause deterioration in image quality, which needs to be compensated.

Hereinafter, by dividing an internal compensation method of compensating for deviations in electrical characteristics of a driving transistor based on the configuration of the sub-pixel circuit and an external compensation method of compensating for deviations in electrical characteristics of a driving transistor based on a current flowing in the driving transistor, one or more embodiments of the present disclosure will be described.

Figure 4:
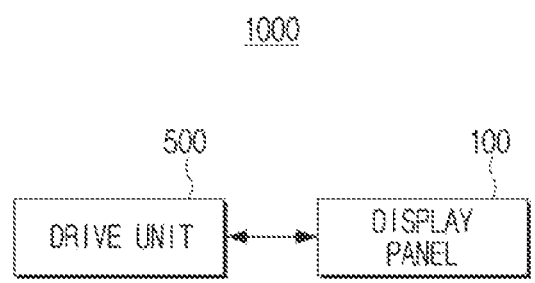
FIG. 4 is a block diagram illustrating a configuration of a display apparatus according to an embodiment of the present disclosure.

First, one or more embodiments of the display apparatus in which the internal compensation method is applied to the deviations in electrical characteristics of the driving transistor will be described with reference to FIGS. 4 to 10B. FIG. 4 is a block diagram illustrating a configuration of a display apparatus according to an embodiment of the present disclosure. In FIG. 4, a display apparatus 1000 includes a display panel 100 and a drive unit (or driver 500.

The drive unit 500 drives the display panel 100. Specifically, the drive unit 500 may drive the display panel 100 by providing various control signals, data signals, driving voltages, and the like to the display panel 100. As described above, according to an embodiment of the present disclosure, the display panel 100 may be driven in the row line order. To this end, the drive unit 500 may include a gate driver for driving pixels on the pixel array in units of row lines.

In addition, the drive unit 500 may include a source driver (or data driver) for providing a PWM data voltage to each pixel (or each sub-pixel) of the display panel 100. In addition, the drive unit 500 may include a DeMUX circuit for selecting each of the plurality of sub-pixels 20-1 to 20-3 included in one pixel 10.

In addition, the drive unit 500 may include a power IC (or a driving voltage providing circuit) for providing various DC voltages (e.g., first driving voltage VDD_PAM, second driving voltage VDD_PWM, ground voltage VSS, test voltage, Vset voltage, etc.), a constant current generator data voltage, a high voltage SW_VGH of a sweep signal, a low voltage SW_VGL of the sweep signal, or the like, to each sub-pixel circuit included in the display panel 100.

In addition, the drive unit 500 may include a clock signal providing circuit for providing various clock signals to a gate driver or data driver, and a sweep signal providing circuit (or sweep driver) for providing a sweep signal (or sweep voltage) to be described below to a sub-pixel circuit.

At least some of the various circuits of the drive unit 500 described above may be implemented in the form of a separate chip and mounted on an external Printed Circuit Board (PCB) together with a Timing Controller (TCON), and may be connected to sub-pixel circuits formed on a TFT layer of the display panel 100 through a Film On Glass (FOG) wiring.

Alternatively, at least some of the various circuits of the drive unit 500 described above may be implemented in the form of a separate chip and disposed on a film in the form of a Chip On Film (COF), and may be connected to the sub-pixel circuits formed on the TFT layer of the display panel 100 through the film on glass (FOG) wiring.

Alternatively, at least some of the various circuits of the drive unit 500 described above may be implemented in the form of a separate chip and disposed in the form of Chip On Glass (COG) (that is, disposed on a back surface (surface opposite to a surface on which the TFT layer is formed based on the glass substrate) of a glass substrate of the display panel 100), and may be connected to the sub-pixel circuits formed on the TFT layer of the display panel 100 through a connection wiring.

Alternatively, at least some of the above-described various circuits of the drive unit 500 may be formed on the TFT layer together with the sub-pixel circuits formed on the TFT layer in the display panel 100 and connected to the sub-pixel circuits.

For example, among various circuits of the drive unit 500 described above, a gate driver, a sweep signal providing circuit, and a DeMUX circuit are formed in the TFT layer of the display panel 100, and the data driver may be disposed on the back surface of the glass substrate of the display panel 100, and the power IC, the clock signal providing circuit, and the TCON may be disposed on an external PCB, but are not limited thereto.

In particular, the drive unit 500 may drive the display panel 100 in the progressive driving method. To this end, the drive unit 500 may set the image data voltages to the sub-pixel circuits of the display panel 100 in the row line order during the data setting period, and may drive the sub-pixel circuits such that the pixels of the pixel array emit light in the row line order based on the sweep signal and the set image data voltage during the light-emitting period.

The display panel 100 includes the pixel array as described above with reference to FIG. 2 and may display an image corresponding to the applied image data voltage. Each sub-pixel circuit included in the display panel 100 may provide a driving current whose magnitude and duration (or pulse width) are controlled to the corresponding inorganic light-emitting element based on the applied image data voltage.

The inorganic light-emitting elements constituting the pixel array emit light according to the driving current provided from the corresponding sub-pixel circuit, and thus, an image may be displayed on the display panel 100.

Figure 5:
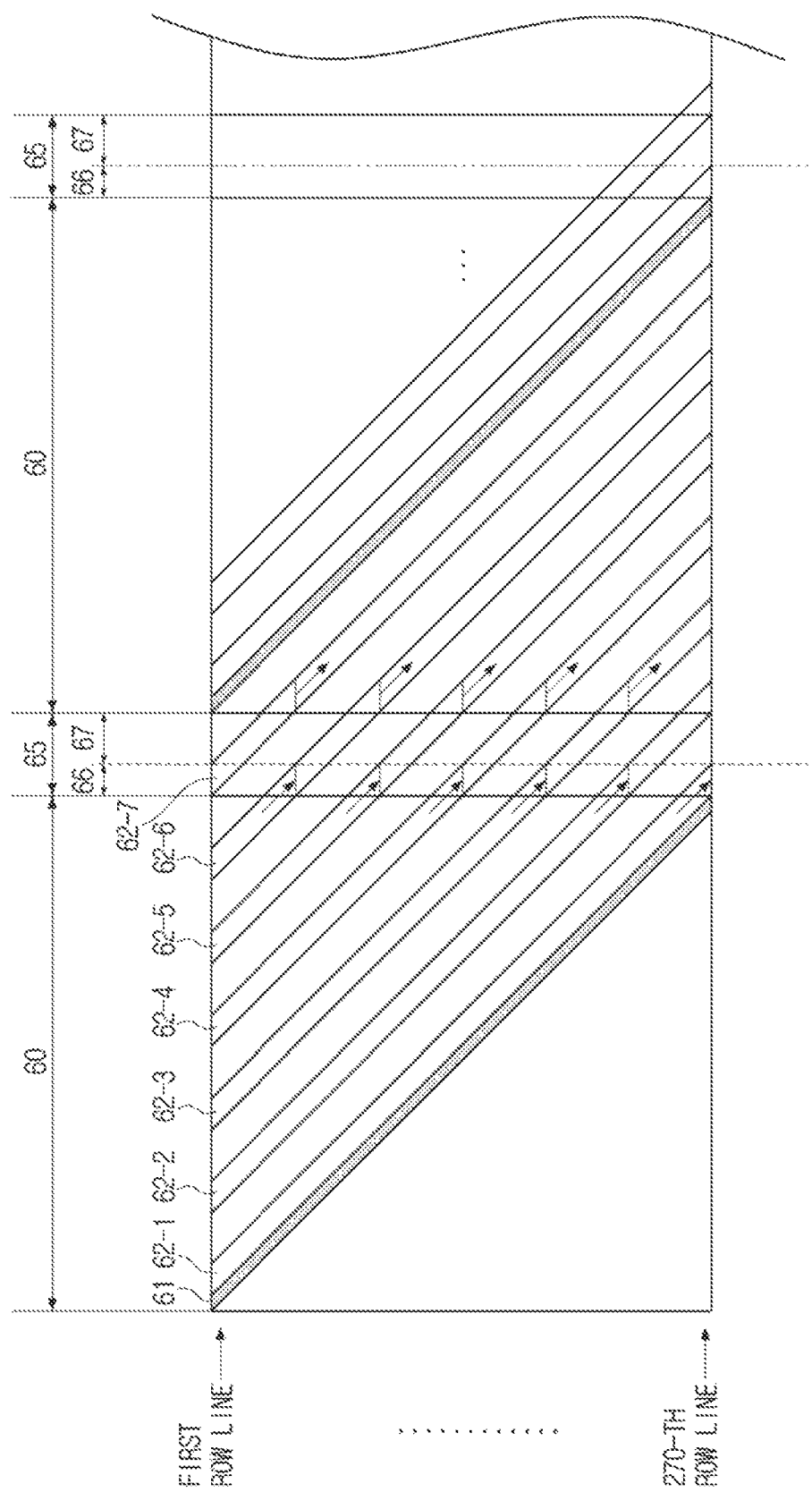
FIG. 5 is a diagram for describing a progressive driving method of a display panel according to an embodiment of the present disclosure.

FIG. 5 is a diagram for describing the progressive driving method of a display panel 100 according to the embodiment of the present disclosure. FIG. 5 conceptually illustrates a driving method of the display panel 100 for two consecutive image frames. In FIG. 5, a vertical axis represents a row line, a horizontal axis represents time, the reference numeral 60 represents an image frame interval, and the reference numeral 65 represents a blanking interval.

In FIG. 5, the display panel 100 includes 270 row lines. For example, seven light-emitting periods 62-1 to 62-7 proceed based on the image data voltage set in the data setting period 61. However, the number of row lines or the number of times the light-emitting period proceeds is not limited thereto. Specifically, in FIG. 5, one data setting period 61 and a plurality of light-emitting periods 62-1 to 62-7 proceed for each row line in one image frame.

During the data setting period 61, the image data voltages may be set to sub-pixel circuits included in each row line. In addition, in each of the plurality of light-emitting periods 62-1 to 62-7, the sub-pixel circuits included in each row line may provide the driving current to the inorganic light-emitting element based on the set image data voltage.

To this end, the drive unit 500 may apply a controls signal for setting the image data voltage (hereinafter, referred to as a scan signal, and, for example, including VST(n) and SP(n) to be described below) to the sub-pixel circuits of each row line during the data setting period 61.

In addition, the drive unit 500 may apply a control signal (hereinafter, referred to as an emission signal. SET(n), Emi_PWM(n), Emi_PAM(n), and Sweep(n) to be described below) for controlling a driving current providing operation to the sub-pixel circuits of each row line during a plurality of light-emitting periods 62-1 to 62-7.

In FIG. 5, the data setting period 61 and each light-emitting period 62-1 to 62-7 sequentially proceed in the row line order with respect to the entire row line of the display panel 100. To this end, the drive unit 500 may apply a scan signal to the sub-pixel circuits in the row line order from a first row line to a last row line of the display panel 100. In addition, the drive unit 500 may apply an emission signal to the sub-pixel circuits in the row line order from the first row line to the last row line of the display panel 100.

As illustrated in FIG. 5, the first light-emitting period 62-1 of each row line is temporally continuous with the data setting period 61, and each of the plurality of light-emitting periods 62-1 to 62-7 has a predetermined time interval. In this case, the number of light-emitting periods proceeding in each row line for one image frame and the predetermined time interval between the light-emitting periods may be set based on the size of the display panel 100 and/or a shutter speed of a camera, etc. However, the present disclosure is not limited thereto.

In general, since the shutter speed of the camera is several times faster than one image frame time, when the display panel 100 is driven such that one light-emitting period proceeds in the row line order from the first row line to the last row line for one video frame time, the image displayed on the display panel 100 captured by the camera may be distorted.

Accordingly, according to an embodiment of the present disclosure, the display panel 100 is driven such that the plurality of light-emitting periods proceed at predetermined time intervals for one image frame time, and the predetermined time interval is set based on the speed of the camera. So, even if the display panel 100 is captured at any moment, the image displayed on the display panel 100 captured by the camera may not be distorted.

A blanking interval 65 in FIG. 5 represents a time interval between consecutive image frame intervals 60 to which valid image data is not applied. In FIG. 5, the data setting period 61 is not included in a blanking interval 65. Therefore, the image data voltage is not applied to the display panel 100 during the blanking interval 65.

Apart from the fact that the image data voltage is not applied in the blanking interval 65 as described above, the inorganic light-emitting elements may emit light in some sections of the blanking interval 65 according to embodiments. In the arrows included in the time interval shown by reference numeral 66 in FIG. 5, the light-emitting period of some row lines proceeds even within the blanking interval 65.

In addition, a non-light-emitting period 67 in which all the inorganic light-emitting elements of the display panel 100 do not emit light may exist in the blanking interval 65. Since no current flows into the display panel 100 in the non-light-emitting period 67, an operation such as detecting a failure of the display panel 100 may be performed.

Figure 6:
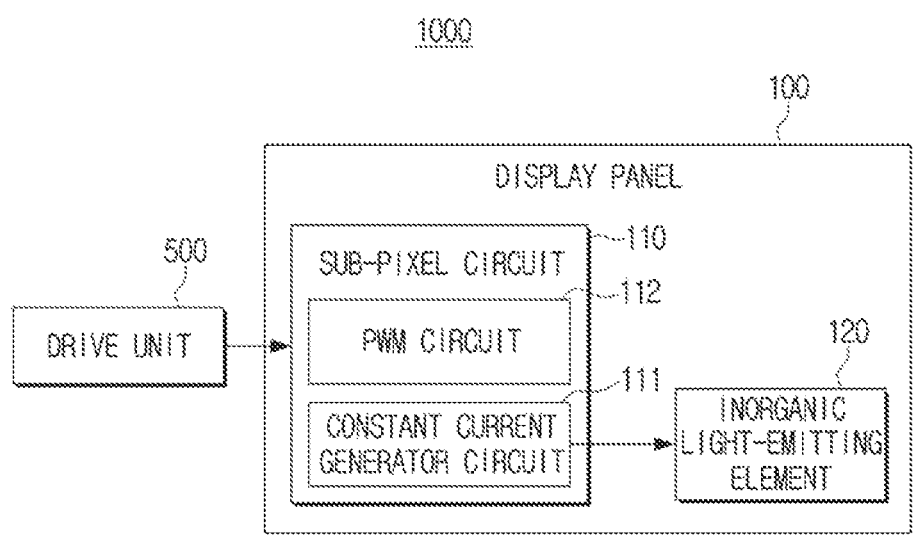
FIG. 6 is a detailed block diagram illustrating a configuration of an apparatus according to an embodiment of the present disclosure.

FIG. 6 is a detailed block diagram illustrating a configuration of a display apparatus 1000 according to an embodiment of the present disclosure. In describing FIG. 6, descriptions of overlapping contents with those described above in FIG. 4 will be omitted. In FIG. 6, the display apparatus 1000 includes a display panel 100 including a sub-pixel circuit 110 and an inorganic light-emitting element 120, and a drive unit 500.

As will be described below, the display panel 100 may have a structure in which the sub-pixel circuit 110 is formed on a glass substrate and the inorganic light-emitting element 120 is disposed on the sub-pixel circuit 110, but is not limited thereto. FIG. 6 shows one sub-pixel related component included in the display panel 100. The sub-pixel circuit 110 and the inorganic light-emitting element 120 are provided for each sub-pixel of the display panel 100.

The inorganic light-emitting element 120 may be mounted on the sub-pixel circuit 110 to be electrically connected to the sub-pixel circuit 110 and emit light based on the driving current provided from the sub-pixel circuit 110. The inorganic light-emitting element 120 constitutes the sub-pixels 20-1 to 20-3 of the display panel 100, and there may be a plurality of types according to the color of the emitted light. For example, the inorganic light-emitting element 120 may include a red (R) inorganic light-emitting element that emits red light, a green (G) inorganic light-emitting element that emits green light, and a blue light-emitting element that emits blue light.

Accordingly, the type of the above-described sub-pixels may be determined according to the type of the inorganic light-emitting element 120. That is, the R inorganic light-emitting element may constitute the R sub-pixel 20-1, the G inorganic light-emitting element may constitute the G sub-pixel 20-2, and the B inorganic light-emitting element may constitute the B sub-pixel 20-3. Here, the inorganic light-emitting element 120 means a light-emitting element manufactured using an inorganic material, different from an Organic Light Emitting Diode (OLED) manufactured using an organic material.

In particular, according to an embodiment of the present disclosure, the inorganic light-emitting element 120 may be a micro light emitting diode (micro LED or pLED) having a size of 100 micrometers (µm) or less.

A display panel in which each sub-pixel is implemented with a micro LED is referred to as a micro LED display panel. A micro LED display panel is one of the flat panel display panels, and the micro LED display panel includes a plurality of inorganic light emitting diodes each having a size of 100 micrometers or less. The micro LED display panel provides better contrast, response time, and energy efficiency compared to Liquid Crystal Display (LCD) panels that require a backlight. Both the OLEDs and micro LEDs have excellent energy efficiency, but the micro LEDs provide better performance than OLEDs in terms of brightness, luminous efficiency, and lifetime.

The inorganic light-emitting element 120 may express different gradation values of brightness according to the magnitude of the driving current provided from the sub-pixel circuit 110 or the pulse width of the driving current. Here, the pulse width of the driving current may also refer to a duty ratio of the driving current or duration of the driving current.

For example, the inorganic light-emitting element 120 may express a brighter gradation value as the driving current increases. In addition, the inorganic light-emitting element 120 may express a brighter gradation value as the pulse width of the driving current is longer (i.e., the higher the duty ratio or the longer the driving time).

The sub-pixel circuit 110 provides the driving current to the inorganic light-emitting element 120. Specifically, the sub-pixel circuit 110 may provide the driving current whose magnitude and duration are controlled to the inorganic light-emitting element 120 based on an image data voltage (e.g., constant current generator data voltage and PWM data voltage), a driving voltage (e.g., first driving voltage, second driving voltage, and ground voltage), various control signals (e.g., scan signal and emission signal), or the like, that are applied from the drive unit 500. That is, the sub-pixel circuit 110 may drive the inorganic light-emitting element 120 through the Pulse Amplitude Modulation (PAM) and/or the Pulse Width Modulation (PWM).

To this end, the sub-pixel circuit 110 may include a constant current source circuit 111 for providing a constant current having a magnitude based on the constant current generator data voltage to the inorganic light-emitting element 120, and a PWM circuit 112 for controlling the time when the constant current is provided to the inorganic light-emitting element 120 based on the PWM data voltage. Here, the constant current provided to the inorganic light-emitting element 120 becomes the above-described driving current.

According to an embodiment of the present disclosure, the same constant current generator data voltage may be applied to all the constant current source circuits 111 of the display panel 100. Therefore, since the driving current (i.e., constant current) having the same magnitude is provided to all the inorganic light-emitting elements 120 of the display panel 100, the problem of changing the wavelength of the LED according to the change in magnitude of the driving current may be solved or reduced.

According to the embodiment, the same constant current generator data voltage for each sub-pixel type may be applied to the constant current source circuits 111 of the display panel 100. That is, since characteristics may be different depending on the type of inorganic light-emitting element 120, the constant current generator data voltages having different magnitudes may be applied to different types of sub-pixel circuits. Even in this case, the same constant current generator data voltage is applied to the same types of sub-pixel circuits.

The PWM data voltages corresponding to the gradation values of each sub-pixel may be applied to each PWM circuit 112 of the display panel 100. Accordingly, the duration of the driving current (i.e., a constant current) provided to the inorganic light-emitting element 120 of each sub-pixel through the PWM circuit 112 may be controlled. Accordingly, the gradation of the image may be suppressed.

According to an embodiment of the present disclosure, the display apparatus 1000 may be applied to a wearable device, a portable device, a handheld device, and various electronic products or electric devices requiring a display.

Also, according to an embodiment of the present disclosure, the display apparatus 1000 may be one display module. In this case, a plurality of display modules are combined or assembled to configure one small display product such as a monitor for a personal computer or TV, or one large display product such as digital signage or electronic display.

When a plurality of display modules are combined to configure one display apparatus, the same constant current generator data voltage is applied to the sub-pixel circuits included in one display panel 100 as described above, but the constant current generator data voltages having different magnitudes may be applied to the sub-pixel circuits included in different display panels 100. Therefore, the deviation in brightness or color between the display modules that may occur when one display apparatus is configured by combining a plurality of display modules may be compensated for by adjusting the constant current generator data voltage.

Figure 7A:
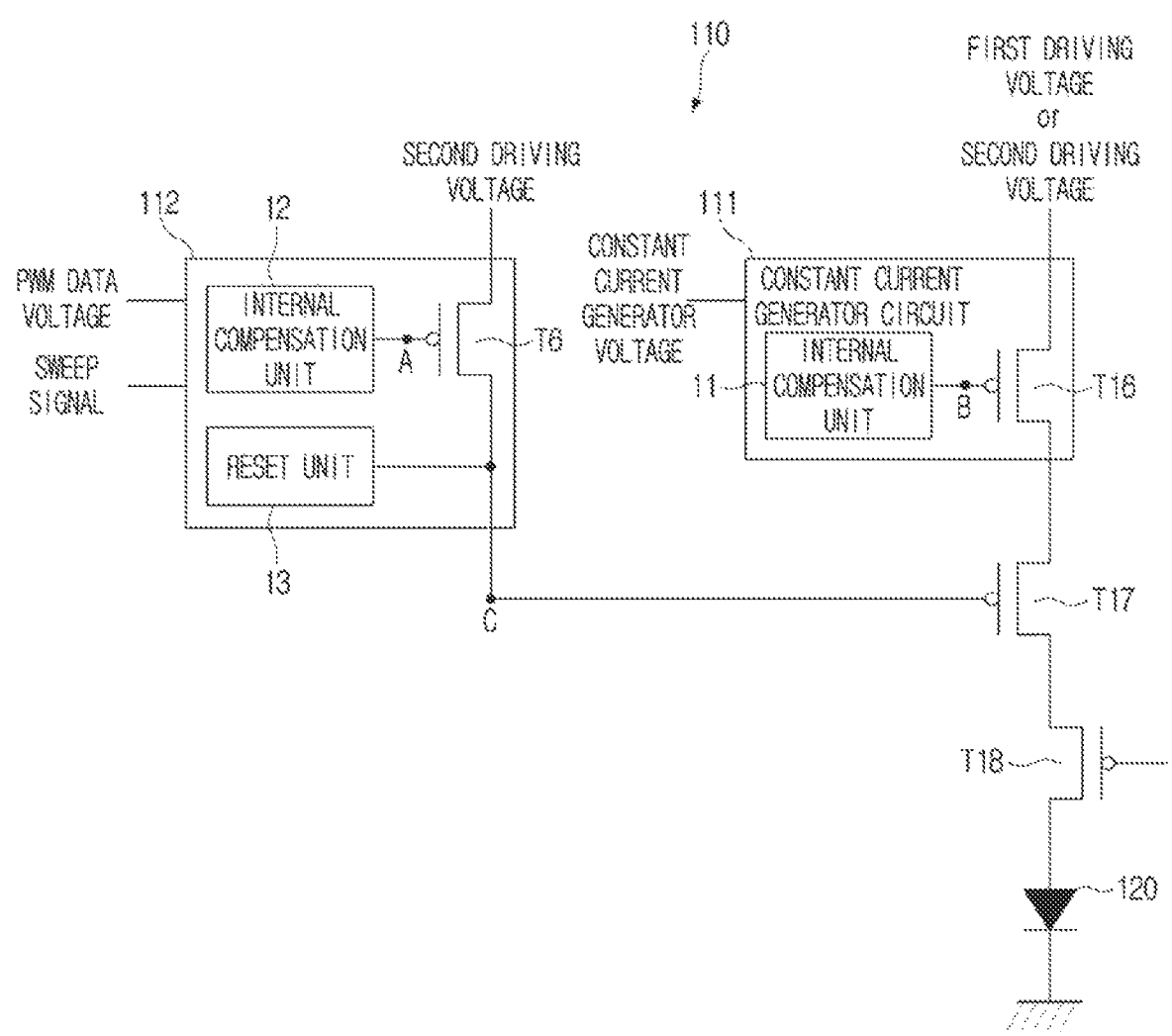
FIG. 7A is a configuration diagram of a sub-pixel circuit according to an embodiment of the present disclosure.

FIG. 7A is a configuration diagram of the sub-pixel circuit 110 according to the embodiment of the present disclosure. In FIG. 7A, the sub-pixel circuit 110 includes the constant current source circuit 111, the PWM circuit 112, a first switching transistor T17, and a second switching transistor T18.

The constant current source circuit 111 includes a first driving transistor T16, and provides a constant current having a constant magnitude based on a voltage applied between a source terminal and a gate terminal of the first driving transistor T16 to the light-emitting element 120.

Specifically, when the constant current generator data voltage is applied from the drive unit 500 (specifically, a data driver) in the data setting period, the constant current source circuit 111 may apply the constant current generator data voltage for which the threshold voltage of the first driving transistor T16 is compensated to the gate terminal B of the first driving transistor T16.

The deviation in the threshold voltage Vth may exist between the first driving transistors T16 included in the sub-pixel circuits of the display panel 100. In this case, even if the same constant current generator data voltage is applied to the constant current source circuit 111 of each sub-pixel, the driving current having a different magnitude by the difference in threshold voltage of the first driving transistor T16 is provided, which appears as stains, etc., on the image.

Therefore, the deviation in the threshold voltage of the first driving transistors T16 included in the display panel 100 needs to be compensated.

To this end, the constant current source circuit 111 includes an internal compensation unit 12. Specifically, when the constant current generator data voltage is applied, the constant current source circuit 111 may apply a first voltage based on the constant current generator data voltage and the threshold voltage of the first driving transistor T16 to the gate terminal B of the first driving transistor T16 through the internal compensation unit 12.

Then, in the light-emitting period, the constant current source circuit 111 may provide a constant current having a magnitude based on the first driving voltage applied to the source terminal of the first driving transistor T16 and the first voltage applied to the gate terminal of the turned-on first driving transistor T16 to the inorganic light-emitting element 120 through the turned-on first driving transistor T16.

Accordingly, the constant current source circuit 111 may provide a driving current having a magnitude corresponding to the applied constant current generator data voltage to the inorganic light-emitting element 120 regardless of the deviation in the threshold voltage of the first driving transistors T16.

As illustrated in FIG. 7A, a source terminal of the first switching transistor T17 is connected to a drain terminal of the first driving transistor T16, and the drain terminal of the first driving transistor T16 is connected to a source terminal of the second switching transistor T18. In addition, the source terminal of the second switching transistor T18 is connected to the drain terminal of the first switching transistor T17, and the drain terminal of the second switching transistor T18 is connected to the anode terminal of the inorganic light-emitting element 120. Accordingly, as illustrated in FIG. 7A, the constant current is provided to the inorganic light-emitting element 120 in a state in which the first switching transistor T17 and the second switching transistor T18 are turned on.

The PWM circuit 112 includes the second driving transistor T6, and controls the turn on/off operation of the first switching transistor T17 to control the time when the constant current flows in the inorganic light-emitting element 120. Specifically, when the PWM data voltage is applied from the drive unit 500 (specifically, the data driver) during the data setting period, the PWM circuit 112 may set the PWM data voltage for which the threshold voltage of the second driving transistor T6 is compensated to the gate terminal A of the second driving transistor T6.

Since the above-described problem due to the deviation in the threshold voltage between the first driving transistors T16 may equally occur with respect to the second driving transistors T6, the PWM circuit 112 also includes the internal compensation unit 12. When the PWM data voltage is applied, the PWM circuit 112 may set the second voltage based on the PWM data voltage and the threshold voltage of the second driving transistor T6 to the gate terminal A of the second driving transistor T6 through the internal compensation unit 12.

Then, when the second driving transistor T6 is turned on based on the sweep signal applied during the light-emitting period, the PWM circuit 112 may apply the second driving voltage to the gate terminal of the first switching transistor T17 to turn off the switching transistor T17, thereby controlling the time when the constant current flows in the inorganic light-emitting element 120.

In this case, when the second voltage set to the gate terminal of the second driving transistor T6 changes according to the sweep signal applied to the PWM circuit 112, and the voltage between the gate terminal and the source terminal of the second driving transistor T6 is the threshold voltage of the second driving transistor T6, the second driving transistor T6 is turned on.

Here, the sweep signal is a signal applied to the sub-pixel circuit 110 in the drive unit 500 (specifically, the sweep voltage providing circuit or sweep driver) to change the voltage of the gate terminal of the second driving transistor T6 during the light-emitting period, and may be a voltage signal that sweeps between two different voltages. For example, the sweep signal may be a signal that linearly changes between two voltages, such as a triangular wave, but is not limited thereto.

Accordingly, the PWM circuit 112 may cause the constant current to flow in the inorganic light-emitting element 120 for the time corresponding to the applied PWM data voltage, regardless of the deviation in the threshold voltage of the second driving transistors T6.

The PWM circuit 112 includes a reset unit 13. The reset unit 13 is a component for forcibly turning on the first switching transistor T17. As described above, in order for the constant current to flow in the inorganic light-emitting element 120 and cause the inorganic light-emitting element 120 to emit light, the first switching transistor T17 should be in the turned-on state. To this end, through the operation of the reset unit 13, the first switching transistor T17 may be in the turned on state at a start time of each of the plurality of light-emitting periods.

As will be described below, the second switching transistor T18 is turned on/off according to an emission signal Emi_PAM(n). The turn on/off timing of the second switching transistor T18 is related to the implementation of black gradation, which will be described in detail below.

A resistance component exists in the display panel 100. Therefore, an IR drop occurs when the driving current flows in the light-emitting period, which causes a drop in the driving voltage. As will be described below, since the driving voltage is also a standard when setting the constant current generator data voltage, the drop in the driving voltage interferes with the accurate setting of the constant current generator data voltage.

Specifically, in one or more embodiments of the present disclosure, as described above, since the data setting period and the light-emitting period proceed in the row line order, sub-pixel circuits of other row lines operate in the data setting period while the sub-pixel circuits of some row lines of the display panel 100 operate in the light-emitting period.

Therefore, when the same driving voltage applied through one wiring is applied to the constant current source circuit 111 regardless of the driving period of the display panel 100, the drop in the driving voltage due to the sub-pixel circuits operating in the light-emitting period affects the operation of setting the constant current generator data voltage of the sub-pixel circuits operating in the data setting period.

In order to overcome this problem, in one or more embodiments of the present disclosure, separate driving voltages applied through separate wirings are applied to the constant current source circuit 111 in the data setting period and the light-emitting period, respectively.

In the example of FIG. 7A, the second driving voltage VDD_PWM is applied to the constant current source circuit 111 in the data setting period, and the first driving voltage VDD_PAM is applied to the constant current source circuit 111 in the light-emitting period. Therefore, even if a voltage drop occurs in the first driving voltage due to the sub-pixel circuits operating in the light-emitting period, a separate second driving voltage unrelated to the driving current is applied to the sub-pixel circuits operating in the data setting period, so it is possible to set a stable constant current generator data voltage.

Figure 7B:
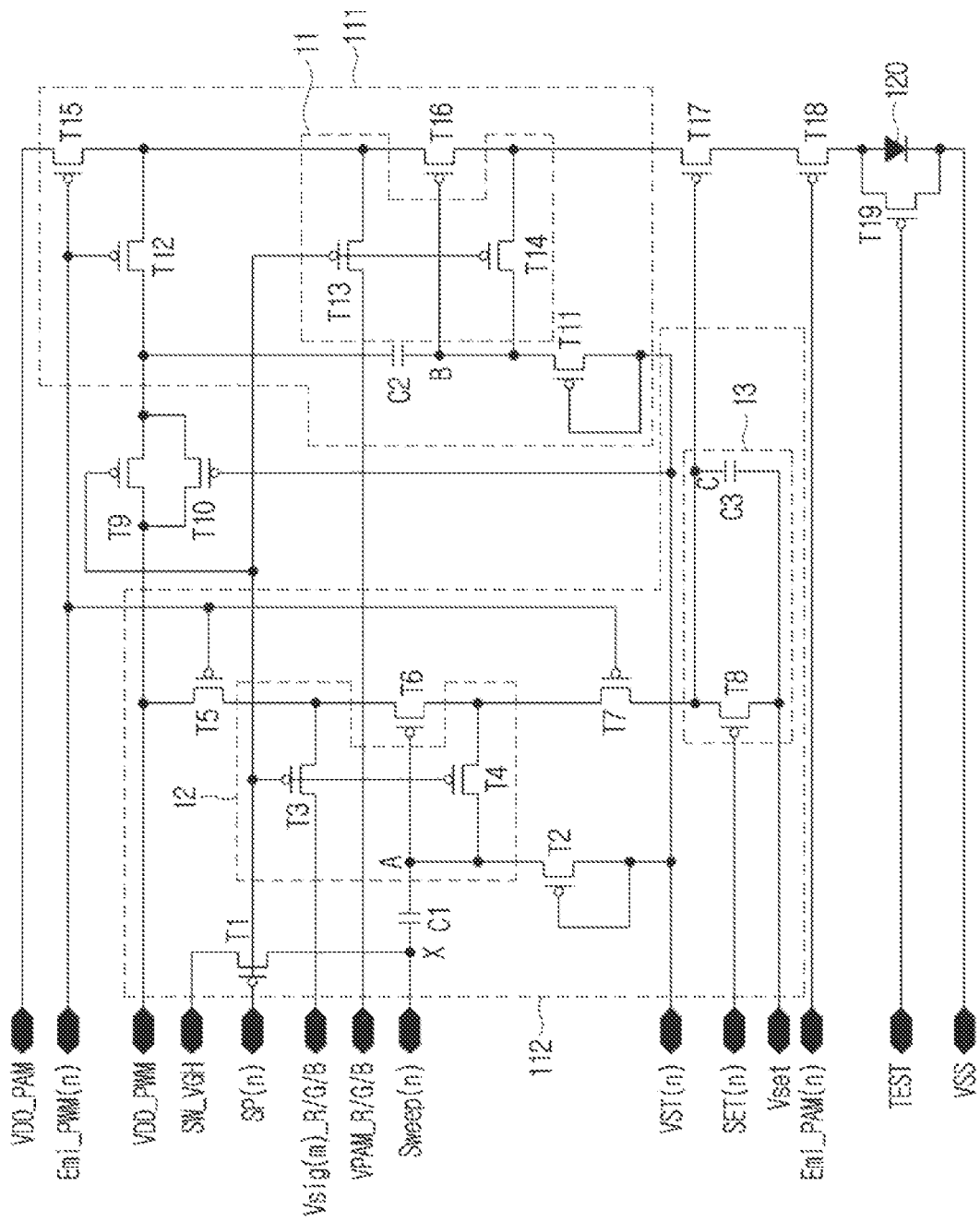
FIG. 7B is a detailed circuit diagram of the sub-pixel circuit according to the embodiment of the present disclosure.

As illustrated in FIG. 7A, the second driving voltage is applied to the PWM circuit 112 during the light-emitting period and is also used as a voltage for turning off the first switching transistor T17. FIG. 7B is a detailed circuit diagram of the sub-pixel circuit 110 according to the embodiment of the present disclosure. In FIG. 7B, the sub-pixel circuit 110 includes the constant current source circuit 111, the PWM circuit 112, the first switching transistor T17, the second switching transistor T18, a transistor T9, a transistor T10, and a transistor T19.

In this case, the PWM circuit 112 includes the internal compensation unit 12 and the reset unit 13, and the constant current source circuit 111 includes the internal compensation unit 12. The transistors T9 and T10 are circuit configurations for applying the second driving voltage VDD_PWM to the constant current source circuit 111 in the data setting period.

The transistor T19 is connected between the anode terminal and the cathode terminal of the inorganic light-emitting element 120. The transistor T19 may be used for different purposes before and after the inorganic light-emitting element 120 is mounted on a TFT layer to be described below and electrically connected to the sub-pixel circuit 110.

For example, before the inorganic light-emitting element 120 and the sub-pixel circuit 110 are connected to each other, the transistor T19 may be turned on according to a control signal TEST to check whether the sub-pixel circuit 110 is abnormal. In addition, after the inorganic light-emitting element 120 and the sub-pixel circuit 110 are connected to each other, as illustrated in FIG. 7B, the transistor T19 may be turned on according to the control signal TEST to discharge the charge remaining in the junction capacitance of the inorganic light-emitting element 120.

In FIG. 7B, the VDD_PAM represents a first driving voltage (e.g., +10[V]), the VDD_PWM represents a second driving voltage (e.g., +10[V]), the VSS represents a ground voltage (e.g., 0[V]), and Vset represents a low voltage (e.g., −3[V]) for turning on the first switching transistor T17. The VDD_PAM, VDD_PWM, VSS, Vset, and TEST voltages may be provided from the above-described power IC, but are not limited thereto.

VST(n) represents a scan applied to the sub-pixel circuit 110 to initialize voltages of node A (gate terminal of the second driving transistor T6) and node B (gate terminal of the first driving transistor T16). SP(n) represents a scan signal applied to the sub-pixel circuit 110 to set (or program) the image data voltages (i.e., PWM data voltage, constant current generator data voltage). SET(n) represents an emission signal applied to the reset unit 13 of the PWM circuit 112 to turn on the first switching transistor T17.

Emi_PWM(n) represents an emission signal to turn on the transistor T5 to apply the second driving voltage VDD_PWM to the PWM circuit 112, and turn on the transistors T15 and T12 to apply the first driving voltage VDD_PAM to the constant current source circuit 111. Sweep (n) represents a sweep signal. According to an embodiment of the present disclosure, the sweep signal may be a voltage signal that linearly changes between two different voltages, but is not limited thereto. The sweep signal may be repeatedly applied in the same form for each light-emitting period. Emi_PAM(n) represents an emission signal for turning on the second switching transistor T18.

Figure 7C:
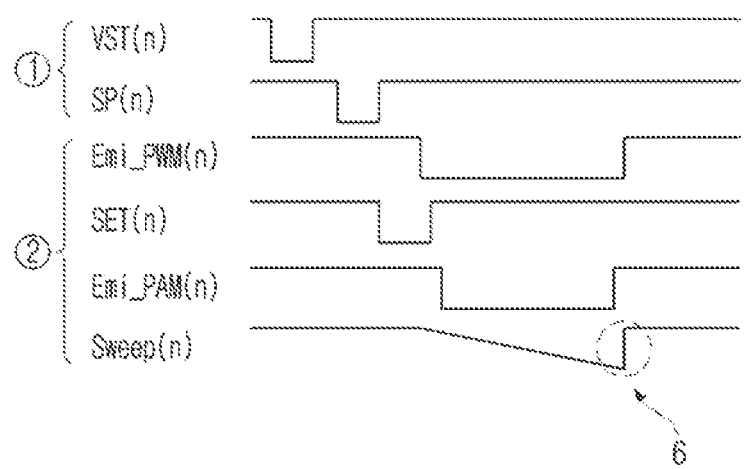
FIG. 7C is timing diagrams for gate signals described in FIG. 7B.

In the above signals, n represents an nth row line. As described above, the drive unit 500 drives the display panel 100 for each row line (or scan line or gate line), and the above-described control signals VST(n), SP(n), SET (n), Emi_PWM(n), Sweep(n), and Emi_PAM(n) may be equally applied to all the sub-pixel circuits 110 included in the n-th row line in the same order as illustrated in FIG. 7C to be described below. The above-described control signals (scan signals, emission signals) may be applied from a gate driver and may be referred to as gate signals.

Vsig(m)_R/G/B represents PWM data voltages for each of the R, G, and B sub-pixels of the pixel included in an m-th column line. Since the above-described gate signals are signals for the n-th row line, Vsig(m)_R/G/B illustrated in FIG. 7B represents the PWM data voltages (specifically, PWM data voltages for each of the time-division multiplexed R, G, and B sub-pixels) applied to pixels disposed where the n-th row line and m-th column line intersect.

In this case, Vsig(m)_R/G/B may be applied from the data driver. In addition, Vsig(m)_R/G/B may be, for example, a voltage between +10[V] (black) and +15[V] (full white), but is not limited thereto.

Since the sub-pixel circuit 110 illustrated in FIG. 7B illustrates the sub-pixel circuit 110 corresponding to any one (e.g., R sub-pixel) of the R, G, and B sub-pixels, only the PWM data voltage for the R sub-pixel among the time-division multiplexed PWM data voltages is selected and applied to the sub-pixel circuit 110 through a DeMUX circuit.

VPAM_R/G/B represents the constant current generator data voltages for each of the R, G, and B sub-pixels included in the display panel 100. As described above, the same constant current generator data voltage may be applied to the display panel 100.

However, here, the fact that the constant current generator data voltages are the same means that the same constant current generator data voltages are applied to the same type of sub-pixels included in the display panel 100, but does not mean that the same constant current generator data voltages need to be applied to different types of all sub-pixels such as R, G, and B. Since the R, G, and B sub-pixels may have different characteristics according to a type of sub-pixels, the constant current generator data voltages may be different a type of sub-pixels. Even in this case, the same constant current generator data voltage may be applied to the same type of sub-pixel regardless of the column line or the row line.

According to an embodiment of the present disclosure, the constant current generator data voltage may be directly applied to each sub-pixel type from the power IC instead of being applied from the data driver like the PWM data voltage.

That is, since the same constant current generator data voltage needs to be applied to the same type of sub-pixel regardless of the column line or the row line, the DC voltage may be used as the constant current generator data voltage. Therefore, for example, three types of DC voltages (e.g., +5.1[V], +4.8[V], and +5.0[V]) corresponding to each of the R, G, and B sub-pixels may be individually applied from the driving voltage circuit to each of the R, G, and B sub-pixel circuits of the display panel 100. In this case, in order to apply the constant current generator data voltage to the sub-pixel circuit 110, the data driver and the DeMUX circuit are not required.

According to the embodiments, when using the same constant current generator data voltage for different types of sub-pixels exhibits better characteristics, the same constant current generator data voltage may be applied to different types of sub-pixels.

FIG. 7C illustrates timing diagrams for gate signals described in FIG. 7B. VST(n) and SP(n) ① among the gate signals illustrated in FIG. 7C are related to the data setting operation of the sub-pixel circuit 110, and may be referred to as the scan signals to be distinguished from the emission signals. Also, Emi_PWM(n), SET(n), Emi_PAM(n), and Sweep(n) ② among the gate signals illustrated in FIG. 7C are related to the light emitting operation of the sub-pixel circuit 110, and therefore, may be referred to as the emission signals.

As described above, according to an embodiment of the present disclosure, for one image frame, the data setting period is performed once, and the light-emitting period is performed a plurality of times. Therefore, for one image frame, the drive unit 500 applies the scan signals ① to each row line of the display panel 100 once in the row line order, and displays the emission signals ② to each row line of the panel 100 plural times in the row line order.

Figure 7D:
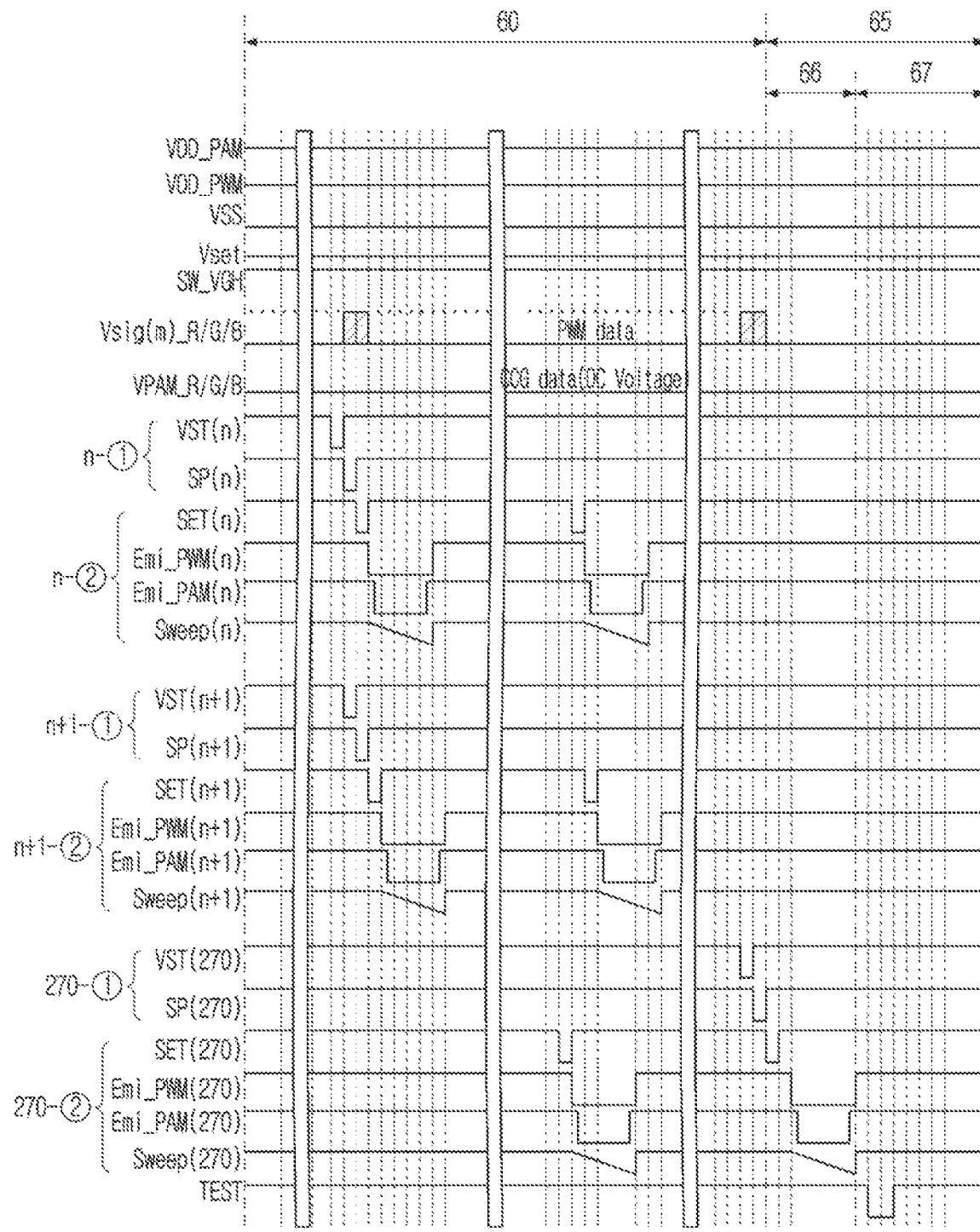
FIG. 7D is timing diagrams of various signals for driving a display panel including the sub-pixel circuit of FIG. 7B during one image frame interval.

FIG. 7D is timing diagrams of various signals for driving the display panel 100 including the sub-pixel circuit of FIG. 7B during one image frame interval. In FIG. 7D, the case in which the display panel 100 includes 270 row lines will be described as an example.

As illustrated in reference numbers n-①, n+1-① to 270-①, scan signals VST(n) and SP(n) for the data setting operation may be applied to each row once in the row line order during 1 frame time. In addition, as illustrated in reference numbers n-②, n+1-② to 270-②, the emission signals Emi_PWM(n), SET(n), Emi_PAM(n), and Sweep(n) for the light emitting operation may be applied to each row line plural times. Hereinafter, a detailed operation of the sub-pixel circuit 110 will be described with reference to FIGS. 7B and 7D together.

When the data setting period starts in each row line, the drive unit 500 first turns on the first driving transistor T16 included in the constant current source circuit 111 and the second driving transistor T6 included in the PWM circuit 112. To this end, the drive unit 500 applies a low voltage (e.g., −3[V]) to the sub-pixel circuit 110 through a VST(n) signal.

In FIG. 7B, when a low voltage is applied to the gate terminal (hereinafter, referred to as the node A) of the second driving transistor T6 through the transistor T2 turned on according to the VST(n) signal, the second driving transistor T6 is turned on. In addition, when a low voltage is applied to the gate terminal (hereinafter, referred to as the node B) of the first driving transistor T16 through the turned-on transistor T11 according to the VST(n) signal, the first driving transistor T16 is turned on.

When a low voltage (e.g., −3[V]) is applied to the sub-pixel circuit 110 through the VST(n) signal, the transistor T10 is also turned on, and a voltage of VDD_PWM (hereinafter, referred to as a second driving voltage (e.g., +10[V])) is applied to the other end of the capacitor C2, one end of which is connected to the node B, through the turned-on transistor T10. In this case, the second driving voltage becomes a reference potential for setting the constant current generator data voltage to be processed according to the SP(n) signal.

In the data setting period, when the first driving transistor T16 and the second driving transistor T6 are turned on through the VST(n) signal, the drive unit 500 inputs a data voltage to the node A and the node B, respectively. To this end, the drive unit 500 applies the low voltage to the sub-pixel circuit 110 through the SP(n) signal.

When the low voltage is applied to the sub-pixel circuit 110 through the SP(n) signal, the transistors T3 and T4 of the PWM circuit 112 are turned on. Accordingly, the PWM data voltage may be applied from the data signal line Vsig(m)_R/G/B to the node A through the turned-on transistor T3, the turned-on second driving transistor T6, and the turned-on transistor T4.

In this case, at the node A, the PWM data voltage applied from the drive unit 500 (specifically, the data driver) is not set as it is, but the PWM data voltage (that is, a voltage obtained by adding the PWM data voltage and the threshold voltage of the second driving transistor T6) in which the threshold voltage of the second driving transistor T6 is compensated is set.

Specifically, when the transistors T3 and T4 are turned on according to the SP(n) signal, the PWM data voltage applied to the source terminal of the transistor T3 is input to the internal compensation unit 12. In this case, since the second driving transistor T6 is in a fully turned-on state through the VST(n) signal, the input PWM data voltage starts to be input to the node A while passing through the transistor T3, the second driving transistor T6, and the transistor T4 in order. That is, the voltage of the node A starts to rise from the low voltage.

However, the voltage of the node A does not rise to the input PWM data voltage, but rises only to a voltage corresponding to the sum of the PWM data voltage and the threshold voltage of the second driving transistor T6. This is because, since the voltage of the node A is in a sufficiently low state (e.g., −3[V]) at the time when the PWM data voltage starts to be input to the internal compensation unit 12, and thus, the second driving transistor T6 is fully turned on, a sufficient current flows and the voltage of the node A rises smoothly, but as the voltage of the node A increases, the difference in the voltage between the gate terminal (node A) and the source terminal of the second driving transistor T6 decreases and the flow of current decreases. So, when the difference in the voltage between the gate terminal and the source terminal of the second driving transistor T6 reaches the threshold voltage of the second driving transistor T6, the second driving transistor T6 is turned off to stop the flow of current.

That is, since the PWM data voltage is applied to the source terminal of the second driving transistor T6 through the turned-on transistor T3, the voltage of the node A rises only up to the voltage obtained by adding the PWM data voltage and the threshold voltage of the second driving transistor T6.

When the low voltage is applied to the sub-pixel circuit 110 through the SP(n) signal line, the transistors T13 and T14 of the constant current source circuit 111 are also turned on. Accordingly, the constant current generator data voltage from the data signal line VPAM_R/G/B may be applied to the node B through the turned-on transistor T13, the turned-on first driving transistor T16, and the turned-on transistor T14.

In this case, at the node B, the constant current generator data voltage applied from the drive unit 500 (specifically, the power IC) is not set as it is. But, for the same reason as described above in the description of the node A, the constant current generator data voltage (i.e., voltage obtained by adding the constant current generator data voltage and the threshold voltage of the first driving transistor T16) in which the threshold voltage of the first driving transistor T16 is compensated is set.

When the low voltage is applied to the sub-pixel circuit 110 through the SP(n) signal line, the transistor T9 is also turned on. Since the second driving voltage VDD_PWM is applied to the other terminal of the capacitor C2 through the turned-on transistor T9, the reference potential for the constant current generator data voltage (specifically, the voltage obtained by adding the constant current generator data voltage and the threshold voltage of the first driving transistor (T16)) set at the node B is maintained as it is.

In the above, the PWM data voltage may be higher than the second driving voltage VDD_PWM. Accordingly, in the state where the PWM data voltage is set at the node A, the second driving transistor T6 is maintained in the turned-off state. Also, the constant current generator data voltage may be a voltage lower than the second driving voltage VDD_PWM. Accordingly, in the state where the constant current generator data voltage is set at the node B, the first driving transistor T16 is maintained in the turned-on state.

When the setting of each data voltage is completed in the constant current source circuit 111 and the PWM circuit 112, the drive unit 500 first turns on the first switching transistor T17 to cause the inorganic light-emitting element 120 to emit light. To this end, the drive unit 500 applies the low voltage to the reset unit 13 (specifically, the transistor T8 of the reset unit 13) through the SET(n) signal.

When the low voltage is applied to the transistor T8 along the SET(n) signal line, the Vset voltage is charged in a capacitor C3 through the turned-on transistor T8. As described above, since the Vset is a low voltage (e.g., −3[V]), when the Vset voltage is charged in the capacitor C3, the low voltage is applied to the gate terminal (hereinafter, referred to as node C) of the first switching transistor T17, so the first switching transistor T17 is turned on.

Since the reset unit 13 operates independently of the rest of the circuit components until the low voltage is applied through the Emi_PWM(n) signal line, the low voltage applied through the SET(n) signal line may be applied earlier than the time illustrated in FIG. 7C or FIG. 7D according to the embodiment.

When the first switching transistor T17 is turned on, the drive unit 500 causes the inorganic light-emitting element 120 to emit light based on the voltages set at the node A and the node B. To this end, the drive unit 500 applies the low voltage to the sub-pixel circuit 110 through the Emi_PWM (n) and Emi_PAM(n) signal lines, and applies the sweep voltage to the sub-pixel circuit 110 through a Sweep(n) signal line.

First, the operation of the constant current source circuit 111 according to the signals applied from the drive unit 500 during the light-emitting period will be described below. The constant current source circuit 111 provides the constant current to the inorganic light-emitting element 120 based on the voltage set at the node B.

Specifically, since the low voltage is applied to the gate terminal through the Emi_PWM(n) and Emi_PAM(n) signal lines during the light-emitting period, the transistor T15 and the second switching transistor T18 are turned on.

The first switching transistor T17 is turned on according to the SET(n) signal as described above. In addition, as described above, in the state in which the voltage obtained by adding the constant current generator data voltage (e.g., +5[V]) and the threshold voltage of the first driving transistor T16 is applied to the node B, since the VDD_PAM (hereinafter, referred to as the first driving voltage (e.g., +10[V])) is applied to the source terminal of the first driving transistor T16 through the turned-on transistor T15 according to the Emi_PWM(n) signal, a voltage less than the threshold voltage of the first driving transistor T16 is applied between the gate terminal and the source terminal of the first driving transistor T16, so the first driving transistor T16 is also turned on. (for reference, in the case of a PMOSFET, the threshold voltage has a negative value, and the PMOSFET is turned on when a voltage less than the threshold voltage is applied between the gate terminal and the source terminal, and is turned off when a voltage exceeding the threshold voltage is applied between the gate terminal and the source terminal)

Therefore, the first driving voltage is applied to the anode terminal of the inorganic light-emitting element 120 through the turned-on transistor T15, the first driving transistor T16, the first switching transistor T17, and the second switching transistor T18, and a potential difference exceeding a forward voltage Vf is generated across the inorganic light-emitting element 120. Accordingly, the driving current (i.e., constant current) flows in the inorganic light-emitting element 120, and the inorganic light-emitting element 120 starts to emit light. In this case, the magnitude of the driving current (that is, the constant current) that causes the inorganic light-emitting element 120 to emit light has the magnitude corresponding to the constant current generator data voltage.

Since the driving current needs to be provided to the inorganic light-emitting element 120 in the light-emitting period, the driving voltage applied to the constant current source circuit 111 changes from the second driving voltage VDD_PWM to the first driving voltage VDD_PAM. In FIG. 7B, when the low voltage is applied to the transistors T12 and T15 according to the Emi_PWM(n) signal, the first driving voltage VDD_PAM is applied to the other terminal of the capacitor C2 through the turned-on transistors T12 and T15.

In this case, as described above, a voltage drop may occur in the first driving voltage due to the IR drop occurring as driving current flows in the inorganic light-emitting element 120. However, even if the voltage drop occurs in the first driving voltage, the voltage between the gate terminal and the source terminal of the first driving transistor T16 is maintained to be equal to the voltage set in the data setting period regardless of the amount of voltage drop (i.e., the amount of IR drop) of the first driving voltage. This is because, even if the voltage applied to the other terminal of the capacitor C2 changes to any voltage, the amount of change is coupled through the capacitor C2 and the voltage of the node B also changes.

Therefore, according to the embodiments of the present disclosure, since the second driving voltage without the voltage drop is applied to the constant current source circuit 111 in the data setting period, the accurate constant current generator data voltage may be set to the constant current source circuit 111, regardless of the voltage drop of the first driving voltage.

In addition, the first driving voltage with the voltage drop is applied to the constant current source circuit 111 in the light-emitting period, but the constant current source circuit 111 operates normally in the light-emitting period regardless of the voltage drop of the first driving voltage for the reason described above.

Next, the operation of the PWM circuit 112 according to signals applied from the drive unit 500 during the light-emitting period will be described below. The PWM circuit 112 controls the light-emitting time of the inorganic light-emitting element 120 based on the voltage set at the node A. Specifically, the PWM circuit 112 controls the turn-off operation of the first switching transistor T17 based on the voltage set at the node A. So the constant current source circuit 111 may control the time when the constant current provided to the inorganic light-emitting element 120 flows in the inorganic light-emitting element 120.

As described above, when the constant current source circuit 111 provides the constant current to the inorganic light-emitting element 120, the inorganic light-emitting element 120 starts to emit light. In this case, in FIG. 7B, even if the transistors T5 and T7 are turned on according to the Emi_PWM(n) signal, since the second driving transistor T6 is turned off while the PWM data voltage is set as described above, the second driving voltage VDD_PWM is not applied to the node C. Accordingly, as described above, the first switching transistor T17 continuously is maintained in the turned-on state according to the SET(n) signal, and the constant current provided by the constant current source circuit 111 may flow in the inorganic light-emitting element 120.

Specifically, when the transistor T5 is turned on according to the Emi_PWM(n) signal, the second driving voltage VDD_PWM is applied to the source terminal of the second driving transistor T6 through the turned on transistor T5. For example, when a voltage between +10[V] (black) and +15 [V] (full white) is used as the PWM data voltage as described above, if the threshold voltage of the second driving transistor T6 is −1[V], the voltage between +9[V] (black) and +14[V] (full white) is set at the node A during the data setting period.

Thereafter, when the second driving voltage (e.g., +10 [V]) is applied to the source terminal of the second driving transistor T6 according to the Emi_PWM(n) signal, the voltage between the gate terminal and the source terminal of the second driving transistor T3 is higher than or equal to (−1[V] to +4[V]) the threshold voltage (−1 [V]) of the second driving transistor T3.

Therefore, unless the PWM data voltage corresponding to the black gradation is set at the node A, when the second driving voltage is applied to the source terminal of the second driving transistor T6 (i.e., when the low voltage is applied to the sub-pixel circuit 110 according to the Emi_PWM(n) signal), the second driving transistor T6 is maintained in the turned-off state, and since the first switching transistor T17 maintains the turned-on state as long as the second driving transistor T6 maintains the turned-off state, the inorganic light-emitting element 120 maintains the light emission. In the case where the PWM data voltage corresponding to the black gradation is set at the node A, when the second driving voltage is applied to the source terminal of the second driving transistor T6, the second driving transistor T6 is immediately turned on.

However, when the voltage of the node A changes according to the sweep signal Sweep(n), and thus, the voltage between the gate terminal and the source terminal of the second driving transistor T6 is less than or equal to the threshold voltage (−1 [V]) of the second driving transistor T6, the second driving transistor T6 is turned on, and the second driving voltage (VDD_PWM, e.g., +10[V]) is applied to the node C, so the first switching transistor T17 is turned off. Accordingly, the constant current no longer flows in the inorganic light-emitting element 120, and the inorganic light-emitting element 120 stops emitting light.

Specifically, in FIG. 7C or 7D, while the low voltage is applied to the sub-pixel circuit 110 according to the Emi_PWM(n) signal, the linearly changing sweep signal Sweep(n), that is, the sweep voltage that linearly decreases from a high voltage (e.g., +15[V]) to a low voltage (e.g., +10[V]) is applied to the sub-pixel circuit 110. Since the change in voltage of the sweep signal is coupled to the node A through the capacitor C1, the voltage of the node A also changes according to the sweep signal.

When the voltage of the node A decreases according to the sweep signal to become the voltage corresponding to the sum of the second driving voltage and the threshold voltage of the second driving transistor T6 (i.e., when the voltage between the gate terminal and the source of the second driving transistor T6 is less than or equal to the threshold voltage of the second driving transistor T6), the second driving transistor T3 is turned on.

Accordingly, the second driving voltage, which is the high voltage, is applied to the node C, that is, the gate terminal of the first switching transistor T17, through the turned-on transistor T5, the second driving transistor T6, and the transistor T7, so the switching transistor T17 is turned off.

As described above, the PWM circuit 112 may control the light-emitting time of the inorganic light-emitting element 120 based on the voltage set at the node A. When the application of the low voltage to the sub-pixel circuit 110 through the Emi_PWM(n) and Emi_PAM(n) signals is completed and the application of the sweep voltage according to the Sweep(n) signal is completed, the corresponding light-emitting period ends.

In this case, as shown by reference numeral 6 in FIG. 7C, when the light-emitting period ends (specifically, when the application of the low voltage through the Emi_PWM(n) signal is completed), the voltage of the sweep signal is restored to the voltage before the linear change.

As described above, since the change in voltage of the sweep signal is coupled to node A through the capacitor C1, when the voltage of the sweep signal is restored as described above, the voltage of node A is also restored.

Therefore, according to the embodiment of the present disclosure, the voltage of node A, which is linearly changed according to the sweep signal during the first light-emitting period among the plurality of light-emitting periods, is restored according to the voltage restoration of the sweep signal before the second light-emitting period, which is the next light-emitting period, starts.

Specifically, the voltage of node A is the value obtained by adding the PWM data voltage and the threshold voltage of the second driving transistor T6 during the data setting period, linearly changes according to the change in the voltage of the sweep signal during the light-emitting period, and is again restored to the voltage obtained by adding the PWM data voltage and the threshold voltage of the second driving transistor T6 according to the voltage restoration of the sweep signal when the light-emitting period ends. Accordingly, the same light-emitting operation is possible in the next light-emitting period.

Also, as described above, in order for the inorganic light-emitting element 120 to emit light during the light-emitting period, first the first switching transistor T17 needs to be turned on. However, as described above, as one of the plurality of light-emitting periods proceeds, the second driving voltage is applied to node C and the first switching transistor T17 is turned off. Therefore, in order for the next light-emitting period to proceed, the voltage of node C needs to be reset to a low voltage in order to turn on the first switching transistor T17.

To this end, when the next light-emitting period starts, the drive unit 500 applies a low voltage to the gate terminal of the transistor T8 again through the SET(n) signal. Accordingly, the Vset voltage, which is the low voltage, is applied to the node C, and thus, the first switching transistor T17 is turned on again.

After the first switching transistor T17 is turned on through the SET(n) signal, the drive unit 500 may apply the low voltage to the sub-pixel circuit 110 through the Emi_PWM(n) and Emi_PAM(n) signals and apply the sweep voltage to the sub-pixel circuit 110 through the Sweep(n) signal to control the light-emitting operation of the inorganic light-emitting element 120 in the next light-emitting period in the same manner as described above.

In the timing diagrams of FIGS. 7C and 7D, there is a difference between the time when the low voltage is applied to the Emi_PWM(n) signal and the time when the low voltage is applied to the Emi_PAM(n) signal. This is to implement the black gradation.

Specifically, when the PWM data voltage corresponding to the black gradation is set at the node A, the first switching transistor T17 should be turned off as soon as the light-emitting period starts. That is, theoretically, at the time when the low voltage is applied through the Emi_PWM(n) signal, the second driving voltage VDD_PWM is applied to the node C through the turned-on transistor T5, the second driving transistor T6, and the transistor T7, so the first switching transistor T17 needs to be immediately turned off. (When the first switching transistor T17 is immediately turned off, the driving current does not flow in the inorganic light-emitting element 120 at all and the black gradation is expressed.)

However, in reality, it takes time for the node C to be charged with the second driving voltage VDD_PWM, so the first switching transistor T17 is not immediately turned off. Specifically, until a voltage capable of turning off the first switching transistor T17 is charged at node C after the second driving voltage VDD_PWM is applied to the node C to start charging the capacitor C3, the first switching transistor T17 is maintained in the turned-on state, so the leakage of the driving current occurs from the first switching transistor T17 to the inorganic light-emitting element 120.

Consequently, when the first switching transistor T17 and the inorganic light-emitting element 120 are directly connected without the second switching transistor T18, even if the PWM data voltage corresponding to the black gradation is set at the node A, the driving current leaked from the first switching transistor T17 flows in the inorganic light-emitting element 120 for a certain period of time, so it is impossible to implement the accurate black gradation.

To solve this problem, according to the embodiment of the present disclosure, the second switching transistor T18 may be disposed between the first switching transistor T17 and the inorganic light-emitting element 120. In addition, the drive unit 500 may apply the Emi_PAM(n) signal such that the second switching transistor T18 is turned on after a predetermined time elapses from the time when the low voltage is applied to the Emi_PWM(n) signal. Here, the predetermined time may be a time longer than or equal to the time when the voltage of the node C is charged from the Vset voltage to the voltage capable of turning off the first switching transistor T17.

In this case, even if the PWM data voltage corresponding to the black gradation is set at the node A, the leakage current generated when the first switching transistor T17 is not immediately turned off may be blocked by the second switching transistor T18. Accordingly, it is possible to implement the accurate black gradation.

In FIG. 7B, when the low voltage is applied through the SP(n) signal line, the transistor T1 is turned on and the high voltage SW_VGH of the sweep signal is applied to node X. Through such an operation, it is possible to minimize the luminance non-uniformity and the horizontal crosstalk phenomenon that may occur due to the sweep rod.

Figure 8A:
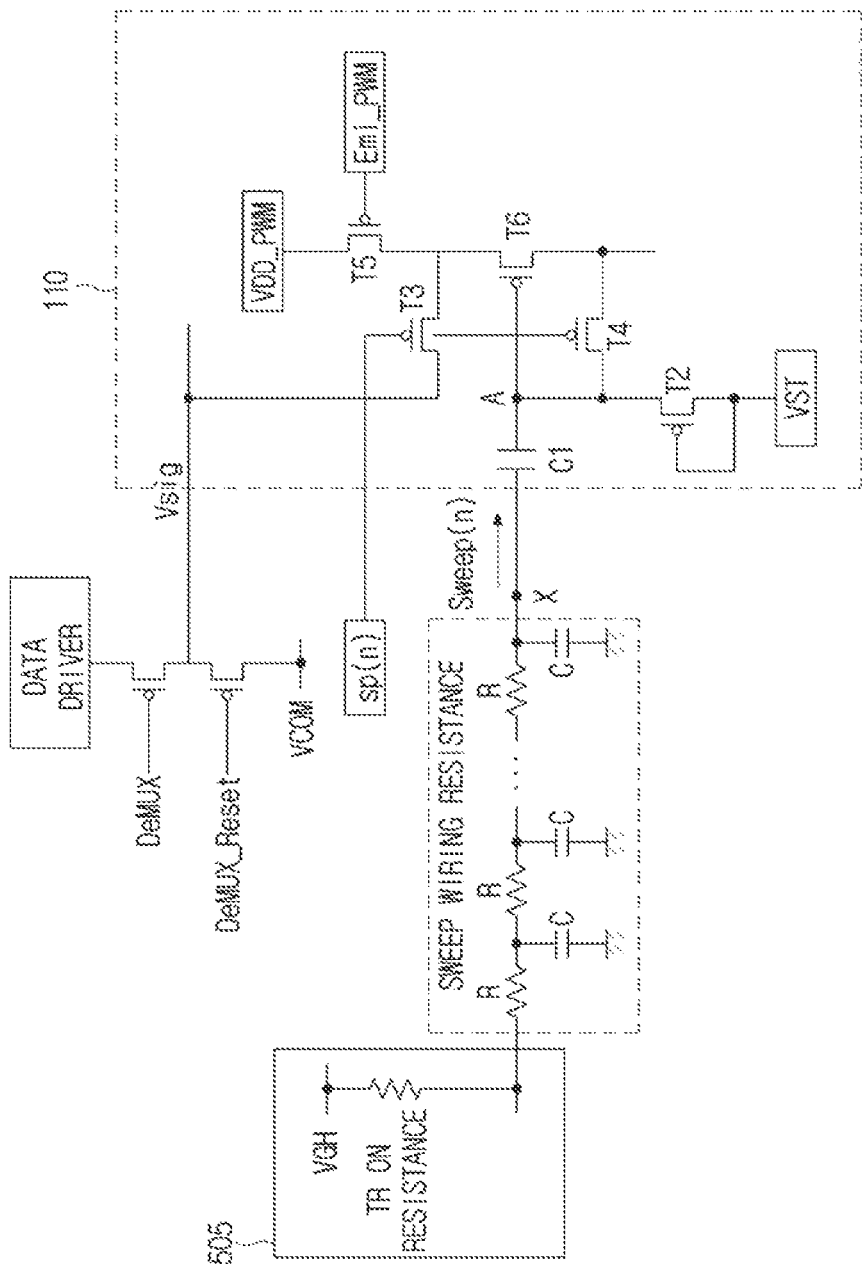
FIG. 8A is a diagram for describing luminance non-uniformity and a horizontal crosstalk phenomenon that may occur due to a sweep rod.
Figure 8B:
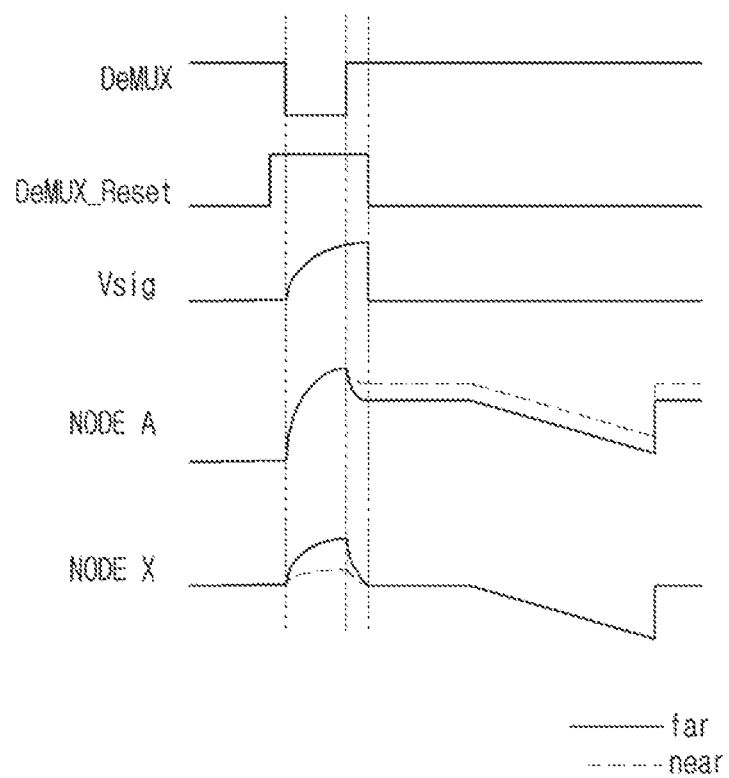
FIG. 8B is a diagram for describing the luminance non-uniformity and the horizontal crosstalk phenomenon that may occur due to the sweep rod.

Specifically, FIGS. 8A and 8B are diagrams for describing the luminance non-uniformity and the horizontal crosstalk phenomenon that may occur due to the sweep rod. As described above, in one or more embodiments of the present disclosure, the light-emitting period sequentially proceeds in the row line order of the display panel 100. Therefore, the emission signal may not be applied through a global signal, and the emission driver circuits for providing the emission signals corresponding to each row line are required for each row line.

In particular, the sweep signal Sweep(n) for the PWM driving of the display panel 100 is also sequentially provided to the display panel 100 in the row line order through the emission driver circuits corresponding to each row line. (Hereinafter, the emission driver circuit for providing the sweep signal Sweep(n) is referred to as a sweep driver circuit.)

In this case, in the process of setting the PWM data voltage to the gate terminal of the second driving transistor T6, that is, the node A, the change in voltage of the node A is coupled through the capacitor C1 to change the voltage of the sweep(n) signal line.

Thereafter, the change in voltage generated on the sweep (n) signal line is restored, and thus, the voltage set at the node A changes. In this case, the amount of change of the node A voltage varies according to the sweep load as will be described below, which is a cause of the occurrence of the luminance non-uniformity and horizontal crosstalk.

Specifically, FIG. 8A illustrates a configuration in which a sweep driver circuit 505 corresponding to one row line is connected to one sub-pixel circuit 110 through a wiring. In this case, FIG. 8A illustrates a case in which the transistor T1 is not present in the sub-pixel circuit 110 of FIG. 7B.

As illustrated in FIG. 8A, the sweep signal Sweep(n) is transmitted to the sub-pixel circuit 110 through the sweep driver circuit 505. In this case, there is a sweep wiring resistance, that is, an RC load, between the sweep driver circuit 505 and the sub-pixel circuit 110, and the magnitude of the sweep wiring resistance decreases as it is closer to the sweep driver circuit 505, and increases as it is far away from the sweep driver circuit 505.

FIG. 8B illustrates waveforms of various signals illustrated in FIG. 8A. In addition, far illustrated in FIG. 8B represents the changes in voltages of the node A and the X of the sub-pixel circuit 110 disposed relatively far away from the sweep driver circuit 505, respectively, and near illustrated in FIG. 8B represents the changes in voltages of the sub-pixel circuit 110 disposed relatively close to the sweep driver circuit 505, respectively.

When a low-level scan signal SP(n) is applied to the sub-pixel circuit 110 in the data setting period, the PWM data voltage applied from the data driver is applied to the node A through a Vsig wiring, the transistor T3, the second driving transistor T6, and the transistor T4. In this case, the PWM data voltage is the PWM data voltage corresponding to any one sub-pixel among the R, G, and B selected by the DeMUX circuit.

In this process, as illustrated in FIG. 8B, as the voltage of the node A changes, the change is coupled to the node X through the capacitor C1, so the voltage of the node X, that is, the voltage of the Sweep(n) signal line changes.

Thereafter, the voltage (voltage of the node X) of the Sweep(n) signal line is restored to the original voltage level again by the operation of the sweep driver circuit 505). The change in voltage of the node X generated in this process is coupled through the capacitor C1 and reversely brings about a voltage change of node A.

In particular, in the case of the sub-pixel circuit 110 where the node X is located far away from the sweep driver circuit 505, the change in voltage of the node A increases due to the influence of the sweep load.

Therefore, even if the same PWM data voltage is applied, the difference voltage is set in the sub-pixel circuit 110 according to the sweep load, which is a cause of the luminance non-uniformity. In addition, the problem of the luminance non-uniformity according to the sweep load is a cause of the occurrence of the horizontal crosstalk from the viewpoint of the entire display panel 100.

The problems of the luminance non-uniformity and horizontal crosstalk described above are caused by the fact that the voltage of the node X changes together when the PWM data voltage is applied to the node A. The problems may be solved by preventing the voltage of the node X from changing even if the PWM data voltage is applied to the node A during the data setting period.

Figure 8C:
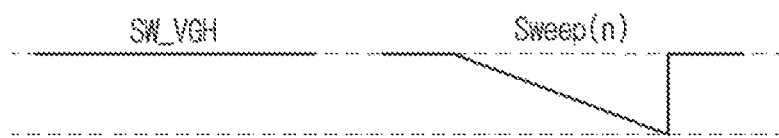
FIG. 8C is a diagram illustrating a high voltage (SW_VGH) of a sweep signal according to an embodiment of the present disclosure.

According to the embodiment of the present disclosure, while the PWM data voltage is set at the node A, the high voltage SW_VGH of the sweep signal as illustrated in FIG. 8C may be applied to the node X. In this case, the high voltage SW_VGH of the sweep signal may be a global signal equally applied to all the sub-pixel circuits 110 of the display panel 100 from the power IC.

More specifically, in FIG. 7B, the PWM circuit 112 includes the transistor T1 having a source terminal connected to the SW_VGH signal line, a gate terminal connected to the SP(n) signal line, and a drain terminal connected to the node X. In this case, the source terminal of the transistor T1 may be directly connected to a wiring to which the high voltage SW_VGH of the sweep signal is applied from the power IC.

Therefore, while the low voltage is applied through the SP(n) signal line to set the PWM data voltage to the node A, the high voltage SW_VGH of the sweep signal applied through the turned-on transistor T1 is forcibly applied to node X, the voltage of the node X may be maintained at the high voltage SW_VGH of the sweep signal regardless of the change in voltage of the node A. Through such an operation, it is possible to prevent or minimize the luminance non-uniformity and the horizontal crosstalk phenomenon that may occur due to the sweep rod.

Figure 9A:
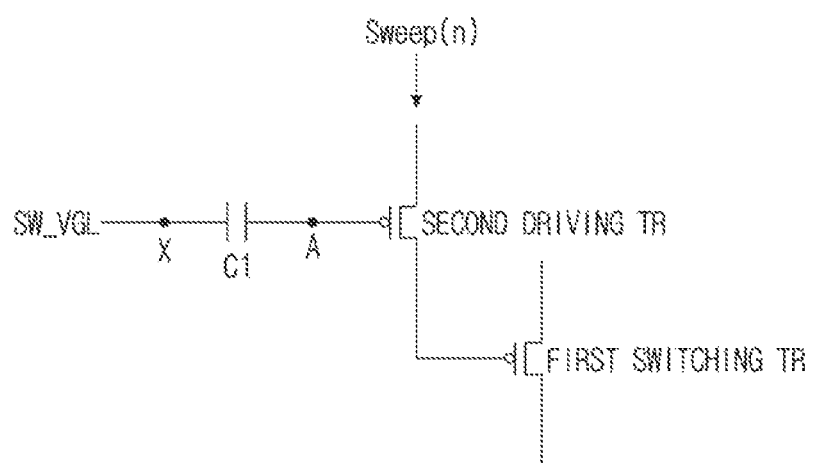
FIG. 9A is a diagram for describing an embodiment of the present disclosure in which a low voltage (SW_VGL) of a sweep signal is applied to an X node.
Figure 9B:
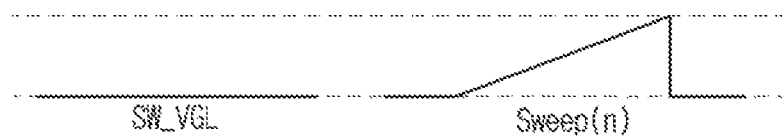
FIG. 9B is a diagram illustrating the low voltage (SW_VGH) of the sweep signal according to the embodiment of the present disclosure.

As another embodiment for solving the above-described problems of the luminance non-uniformity and horizontal crosstalk, a method of connecting a low voltage SW_VGL input of a sweep signal to node X may be considered. FIGS. 9A and 9B are diagrams for describing the embodiment in which the low voltage SW_VGL input of the sweep signal is connected to the X node.

As illustrated in FIG. 9A, the low voltage SW_VGL of the sweep signal may be applied to the node X. In this case, the low voltage SW_VGL of the sweep signal may be a global signal equally applied to all the sub-pixel circuits 110 of the display panel 100 from the power IC.

Specifically, the node X may be directly connected to the power IC through a wiring to which the low voltage SW_VGL of the sweep signal is applied. Therefore, even if the voltage of the node A changes due to the application of the PWM data voltage, the voltage of the node X may be maintained at the low voltage SW_VGL of the sweep signal without being affected by the coupling through the capacitor C1.

As illustrated in FIG. 9A, the sweep signal Sweep(n) for the PWM driving may be applied to the source terminal of the second driving transistor. In this case, as illustrated in FIG. 9B, the sweep signal Sweep(n) may be a voltage signal that linearly increases from the low voltage to the high voltage.

As described above, the PWM circuit controls the turn-on/off operation of the first switching transistor through the turn-on/off operation of the second driving transistor to control the time when the driving current flows in the inorganic light-emitting element 120, which goes the same for the embodiment of FIG. 9A.

Specifically, when the voltage of the source terminal of the second driving transistor increases according to the sweep signal Sweep(n) in the state where the PWM data voltage is set to the node A, the difference in the voltage between the gate terminal and the source terminal of the second driving transistor decreases.

When the decreasing difference in voltage between the gate terminal and the source terminal of the second driving transistor reaches the threshold voltage of the second driving transistor, the second driving transistor is turned on and the first switching transistor is turned off. This PWM drive mechanism is the same as the above-described embodiment (embodiment in which the sweep signal is applied to the node X).

According to the embodiment described above, the above-described problems of the luminance non-uniformity and horizontal crosstalk due to the sweep rod may be solved. In this case, there is no problem in the PWM driving of the display panel 100 even if the sweep signal is applied to the source terminal of the second driving transistor.

Figure 10A:
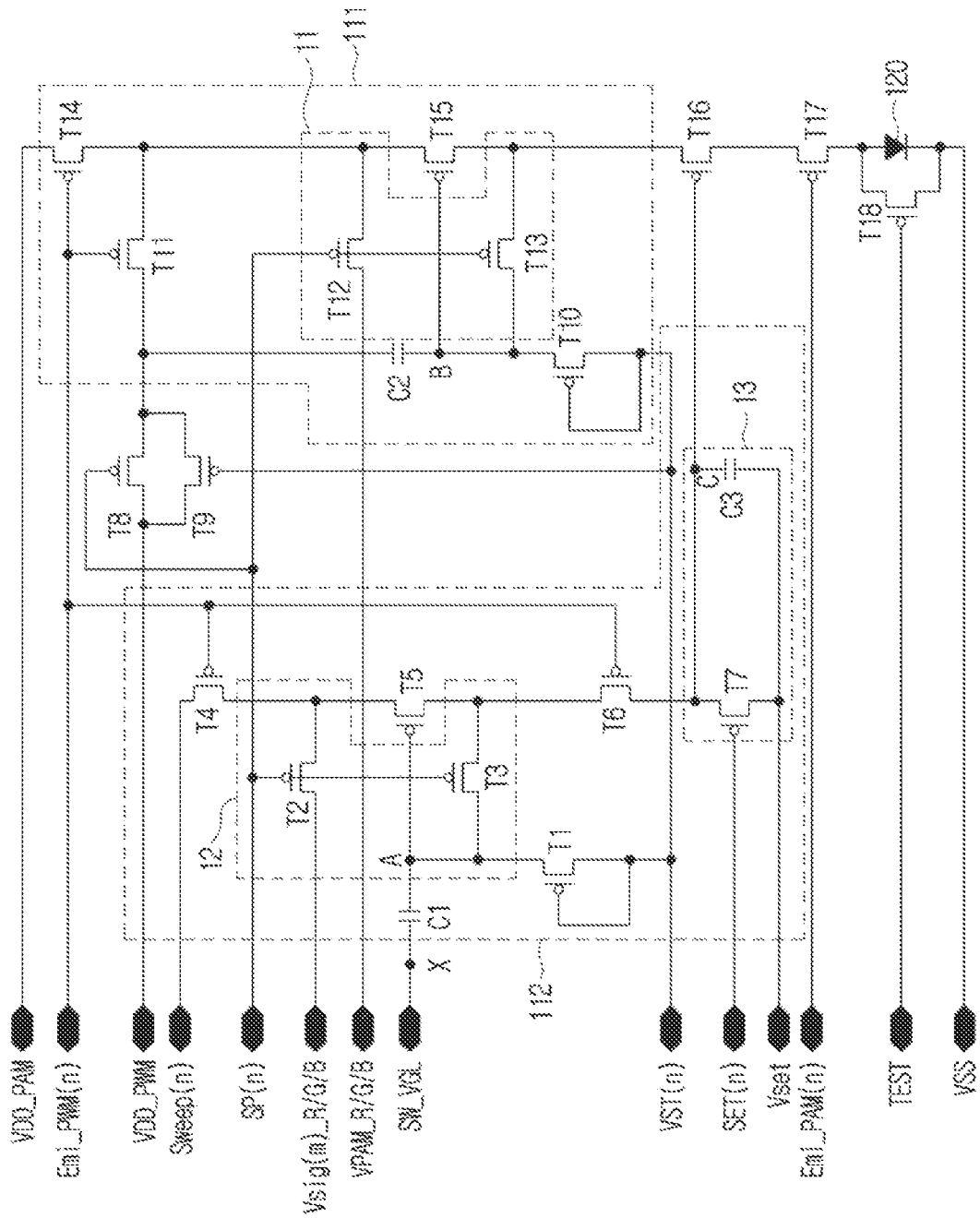
FIG. 10A is a detailed circuit diagram of the sub-pixel circuit according to the embodiment of the present disclosure.
Figure 10B:
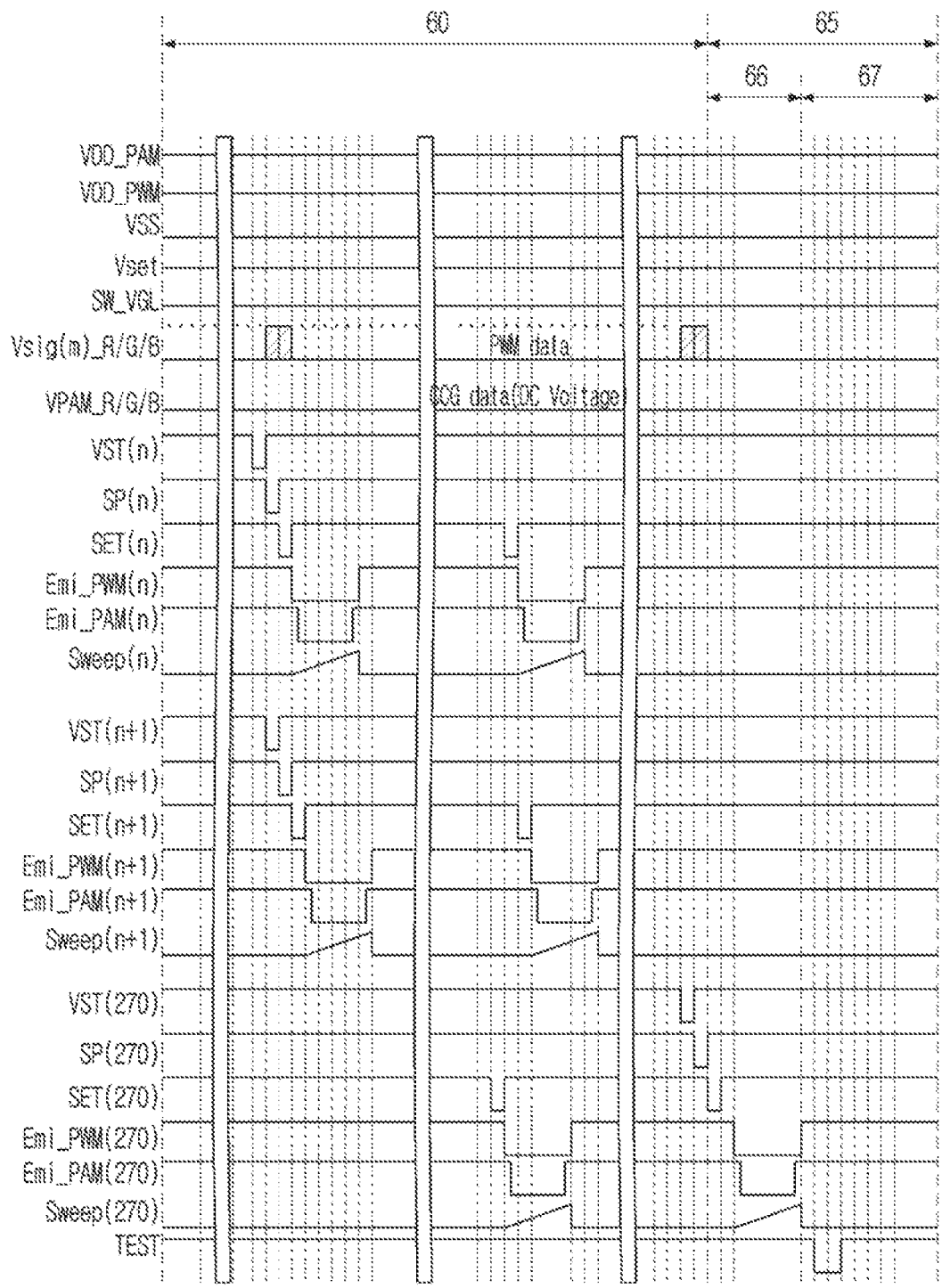
FIG. 10B is timing diagrams of various signals for driving the display panel including the sub-pixel circuit of FIG. 10A during one image frame interval.

FIG. 10A is a detailed circuit diagram of the sub-pixel circuit 110 according to the embodiment of the present disclosure to which the embodiment described above with reference to FIGS. 9A and 9B is applied, and FIG. 10B is a timing diagram of various signals for driving the display panel 100 including the sub-pixel circuit of FIG. 10A during one image frame interval.

Since the embodiments illustrated in FIGS. 10A and 10B are similar in the configuration and operating principle to those described above with reference to FIGS. 7A to 7D, redundant descriptions thereof will be omitted and differences therebetween will be mainly described.

In the sub-pixel circuit 110 of FIG. 10A, the SW_VGL signal line is directly connected to the node X. Therefore, unlike the sub-pixel circuit of FIG. 7B, the transistor T1 for applying the SW_VGH signal to the node X during the data setting period is not required. In FIG. 10A, there is no transistor at a position corresponding to the transistor T1 of FIG. 7B. Accordingly, when the reference numbers of the transistors in FIGS. 10A and 7B are compared, the reference numbers of the transistors at the same position are shown so that FIG. 10A precedes FIG. 7B by one.

In the sub-pixel circuit 110 of FIG. 7B, when a low-level Emi_PWM(n) signal is applied to the light-emitting period, the second driving voltage VDD_PWM is applied to the source terminal of the second driving transistor T6 through the turned-on transistor T5 and the sweep signal Sweep(n) is applied to the node X, but in the sub-pixel circuit 110 of FIG. 10A, when the low-level Emi_PWM(n) signal is applied to the light-emitting period, the sweep signal 'sweep(n)' (specifically, the sweep voltage that changes linearly from the low voltage to the high voltage) is applied to the source terminal of the second driving transistor T5 through the turned-on transistor T4.

In this case, the sweep signal Sweep(n) applied to the sub-pixel circuit 110 of FIG. 7B is linearly decreasing as illustrated in FIG. 7D, and the sweep signal Sweep(n) applied to the sub-pixel circuit 110 of FIG. 10A is linearly increasing as illustrated in FIG. 10B. Accordingly, there is a difference in the form of the sweep signal Sweep(n).

The operation of the PWM circuit 112, according to the sweep signal in the embodiment of FIG. 10A, will be described in detail by way of examples. For example, in a state in which a voltage (specifically, the PWM data voltage (+14[V])+the threshold voltage (−1[V]) of the second driving transistor T5) of +13[V] is set to the node A during the data setting period, when the sweep signal (e.g., voltage that linearly increases from +10[V] to +15[V]) is applied to the source terminal of the second driving transistor T5, the difference in the voltage between the gate terminal and the source terminal of the second driving transistor T5 decreases from +3[V] to −2[V].

In this case, when difference in the voltage between the gate terminal and the source terminal of the second driving transistor T5, which has decreased from +3[V], reaches the threshold voltage (−1[V]) of the second driving transistor T5, the second driving transistor T5 is turned on, and +14[V], which is a sweep voltage when the second driving transistor T5 is turned on, is applied to the first switching transistor T16, so the first switching transistor T16 is turned off.

The operating mechanism of the PWM circuit 112 of FIG. 10A is the same as the operating mechanism of the PWM circuit 112 described in FIGS. 7A to 7D except for the terminal to which the sweep signal is input. Since the remaining contents related to the sub-pixel circuit 110 and its driving in FIGS. 10A and 10B overlap with those described in FIGS. 7A to 7D, descriptions thereof will be omitted.

Hereinafter, one or more embodiments of the display apparatus in which the external compensation method is applied to the deviations in electrical characteristics of the driving transistor will be described with reference to FIGS. 11 to 31B. Among the descriptions of the above-described embodiments related to the internal compensation method, contents that are not inconsistent with the embodiments related to the external compensation method may be applied to the embodiments related to the external compensation method to be described below as they are.

Figure 11:
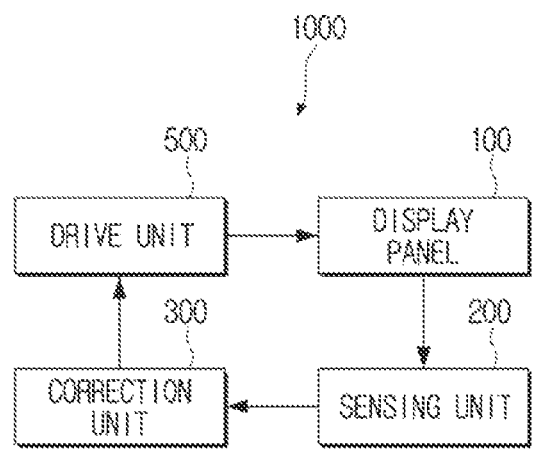
FIG. 11 is a block diagram illustrating a configuration of a display apparatus according to an embodiment of the present disclosure.

FIG. 11 is a block diagram illustrating a configuration of a display apparatus according to an embodiment of the present disclosure. In FIG. 11, a display apparatus 1000 includes a display panel 100, a sensing unit (or sensor) 200, a correction unit (or correction circuit) 300, and a drive unit (or driver) 500.

The drive unit 500 drives the display panel 100. Specifically, the drive unit 500 may drive the display panel 100 by providing various control signals, data signals, driving voltage signals, and the like to the display panel 100.

As described above, according to an embodiment of the present disclosure, the display panel 100 may be driven in the row line order. To this end, the drive unit 500 may include a gate driver for driving pixels on the pixel array in units of row lines.

In addition, the drive unit 500 includes a data driver for providing an image data voltage (specifically, constant current generator data voltage and PWM data voltage) and a specific voltage to be described below to each pixel (or each sub-pixel) on the pixel array.

In this case, the external compensation method is different from the above-described internal compensation method in that the constant current generator data voltage is provided from the data driver rather than from the power IC.

The drive unit 500 may include a DeMUX circuit for selecting each of the plurality of sub-pixels 20-1 to 20-3 constituting the pixel 10. In addition, the drive unit 500 may include a power IC (or driving voltage providing circuit) for providing various DC voltages (e.g., first driving voltage VDD_PAM, second driving voltage VDD_PWM, ground voltage VSS, Vset voltage, etc.) to each sub-pixel circuit included in the display panel 100.

In addition, the drive unit 500 may include a clock signal providing circuit for providing various clock signals for driving a gate driver or a data driver, and a sweep signal providing circuit (or sweep voltage) for providing a sweep signal (or sweep voltage).

Since one or more embodiments related to the arrangement of various drivers or circuits of the above-described drive unit 500 and the connection with the sub-pixel circuit formed on the TFT layer have been described in the description of the drive unit 500 of FIG. 4, redundant descriptions thereof will be omitted.

In particular, the drive unit 500 may drive the display panel 100 in the progressive driving method. Since a detailed description of the progressive driving method is the same as described above with reference to FIG. 5, redundant description thereof will be omitted.

In this case, in the embodiments of the external compensation method, the drive unit 500 may set the image data voltages to the sub-pixel circuits of the display panel 100 in the row line order during the data setting period 61. To this end, the drive unit 500 may apply the image data voltages (constant current generator data voltage and PWM data voltage) during the data setting period 61, and apply a control signal for setting the applied image data voltages (hereinafter, referred to as a scan signal. For example, SP(n), SPWM(n), and SCCG(n) to be described below) to the sub-pixel circuits of each row line in the row line order.

In addition, the drive unit 500 may drive the sub-pixel circuits to cause pixels of a pixel array to emit light in the row line order based on the sweep signal and the set image data voltage during the light-emitting periods 62-1 to 62-7. To this end, the drive unit 500 may apply a control signal (hereinafter, referred to as an emission signal. SET(n), Emi_PWM(n), Emi_PAM(n), and Sweep(n) to be described below) for controlling a driving current providing operation to the sub-pixel circuits in the row line order during a plurality of light-emitting periods 62-1 to 62-7.

As will be described below, in the embodiments of the external compensation method, the sensing unit 200 needs to sense a current flowing in the driving transistor based on a specific voltage. To this end, the drive unit 500 may apply control signals (hereinafter, referred to as sense signals. PWM_Sen(n) and CCG_Sen(n) to be described below) for sensing the current flowing in the driving transistor to the sub-pixel circuits of at least one row line per image frame. Details thereof will be described below.

The display panel 100 includes the pixel array as described above with reference to FIG. 2 and may display an image corresponding to the applied image data voltage. Each sub-pixel circuit included in the display panel 100 may provide a driving current whose magnitude and duration (or pulse width) are controlled to the corresponding inorganic light-emitting element based on the applied image data voltage.

The inorganic light-emitting elements constituting the pixel array emit light according to the driving current provided from the corresponding sub-pixel circuit, and thus, an image may be displayed on the display panel 100. The external compensation method is a method that senses the current flowing in the driving transistor and corrects the image data voltage based on the sensing result to reduce the deviations in the threshold voltage Vth and mobility p of the driving transistors between the sub-pixel circuits.

For this external compensation operation, the display apparatus 1000 of FIG. 11 further includes a sensing unit 200 and a correction unit 300 when compared to the display apparatus 1000 of FIG. 4. The sensing unit 200 is a component for sensing the current flowing in the driving transistor included in the sub-pixel circuit and outputting sensing data corresponding to the sensed current.

When the current based on the specific voltage flows in the driving transistor, the sensing unit 200 may sense the current flowing in the driving transistor, convert the sensed current into the sensing data, and output the converted sensing data to the correction unit 300. Here, the specific voltage is a voltage applied to the sub-pixel circuit separately from the image data voltage to sense the current flowing in the driving transistor, and may include a first specific voltage used to sense the current flowing in the driving transistor of the constant current source circuit and a second specific voltage for sensing the current flowing in the driving transistor of the PWM circuit as will be described below.

The correction unit 300 is a component for correcting the image data voltage to be applied to the sub-pixel circuit based on the sensing data output from the sensing unit 200. The correction unit 300 may acquire a compensation value for correcting image data based on reference data for each voltage and the sensing data output from the sensing unit 200, and correct the image data based on the acquired compensation value, thereby correcting the image data voltage.

Here, the reference data for each voltage is data related to the reference current value flowing in the driving transistor when the specific voltage is applied to the driving transistor, and may be calculated in advance theoretically or experimentally and pre-stored in the form of a lookup table, but is not limited thereto.

As will be described below, the reference data for each voltage may include first reference data corresponding to the first specific voltage and second reference data corresponding to the second specific voltage. The reference data for each voltage may be pre-stored in various memories inside or outside the correction unit 300, and the correction unit 300 may load and use the reference data for each voltage from the memory, if necessary.

A specific example in which the correction unit 300 acquires the compensation value by using the reference data and sensing data for each voltage and corrects the image data voltage will be described below with reference to FIG. 12. The drive unit 500 (specifically, the data driver) may apply the corrected image data voltage to the display panel 100 to compensate for the deviations in the threshold voltage Vth and mobility p of the driving transistors.

As described above in the description of the internal compensation method, the display panel 100 has a resistance component, and the resulting driving voltage drop problem also exists in the display panel 100 to which the external compensation method is applied. In order to solve this driving voltage drop problem, in the embodiments in which the external compensation method is applied to the deviation in the electrical characteristics of the driving transistor, the driving voltages used in the data setting period and the light-emitting period are different (i.e., internal compensation of the IR drop), and the image data voltage is corrected (i.e., external compensation of the IR drop). Details thereof will be described below.

Hereinafter, the configuration of the display apparatus 1000 according to the embodiment of the present disclosure and the external compensation method (for deviation in the electrical characteristics of the driving transistor) will be described in more detail with reference to FIG. 12. FIG. 12 is a detailed block diagram of the display apparatus according to the embodiment of the present disclosure. In describing FIG. 12, descriptions of overlapping contents with those described above will be omitted.

Figure 12:
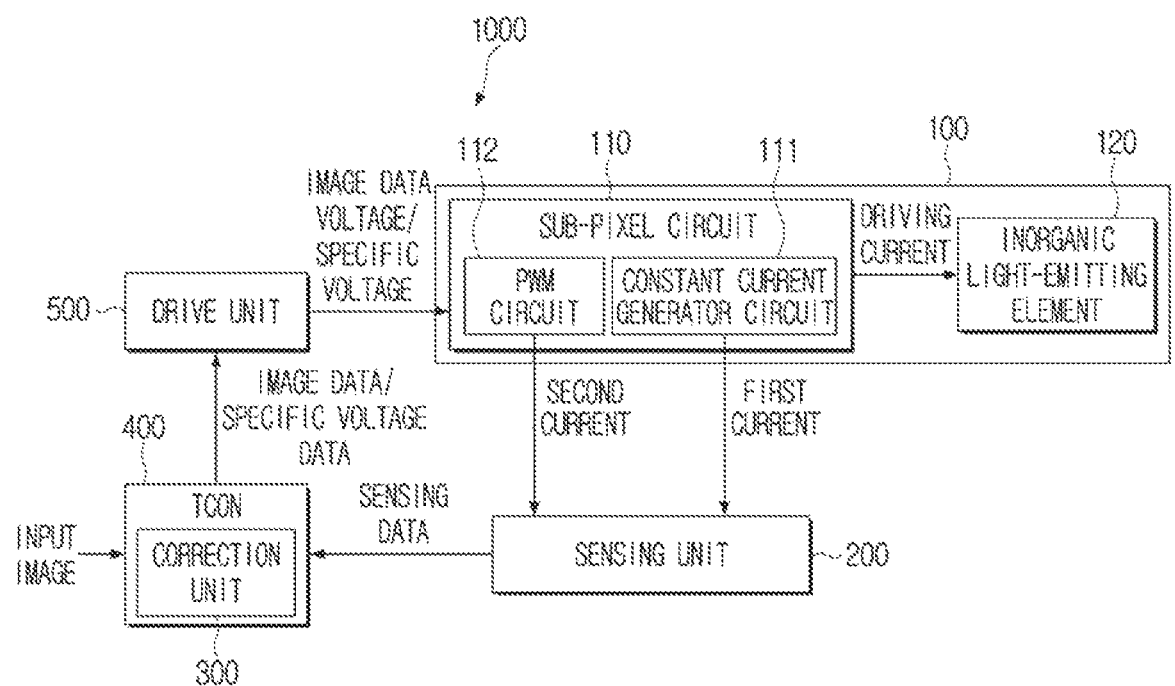
FIG. 12 is a detailed block diagram of the display apparatus according to the embodiment of the present disclosure.

In FIG. 12, the display apparatus 1000 includes the display panel 100, the sensing unit 200, the correction unit 300, a timing controller 400 (hereinafter, referred to as TCON 400), and the drive unit 500. The TCON 400 controls the overall operation of the display apparatus 1000. In particular, the TCON 400 may perform sensing driving of the display apparatus 1000. In addition, the TCON 400 may perform display driving of the display apparatus 1000.

Here, the sensing driving is driving that updates a compensation value to compensate for the deviations in the threshold voltage Vth and mobility p of the driving transistors included in the display panel 100, and the display driving is driving of displaying images on the display panel 100 based on the image data voltage to which the compensation value is reflected.

When the display driving is performed, the TCON 400 provides image data for an input image to the drive unit 500. In this case, the image data provided to the drive unit 500 may be image data corrected by the correction unit 300. The correction unit 300 may correct the image data for the input image based on the compensation value. In this case, the compensation value may be acquired by the correction unit 300 through a sensing drive to be described below.

As illustrated in FIG. 12, the correction unit 300 may be implemented as one functional module of the TCON 400 mounted in the TCON 400. However, the correction unit 300 is not limited thereto, and may be mounted on a separate processor different from the TCON 400, and may be implemented as a separate chip in an Application Specific Integrated Circuit (ASIC) or Field-Programmable Gate Array (FPGA) method.

The drive unit 500 may generate the image data voltage based on the image data provided from the TCON 400 and provide or apply the generated image data voltage to the display panel 100. Accordingly, the display panel 100 may display images based on the image data voltage provided from the drive unit 500. When the sensing driving is performed, the TCON 400 may provide specific voltage data for sensing the current flowing in the driving transistor included in the sub-pixel circuit 110 to the drive unit 500.

The drive unit 500 generates a specific voltage corresponding to the specific voltage data and provides the generated specific voltage to the display panel 100. Accordingly, a current based on the specific voltage may flow in the driving transistor included in the sub-pixel circuit 110 of the display panel 100. The sensing unit 200 may sense the current flowing in the driving transistor and output sensing data to the correction unit 300, and the correction unit 300 may acquire and update the compensation value for correcting the image data based on the sensing data output from the sensing unit 200.

Hereinafter, each component illustrated in FIG. 12 will be described in detail. The display panel 100 includes the inorganic light-emitting element 120 constituting a sub-pixel and the sub-pixel circuit 110 for providing the driving current to the inorganic light-emitting element 120. FIG. 12 illustrates one sub-pixel related component included in the display panel 100, but the sub-pixel circuit 110 and the inorganic light-emitting element 120 may be provided for each sub-pixel. Since the description of the inorganic light-emitting element 120 is the same as described above with reference to FIG. 6, redundant description thereof will be omitted.

The sub-pixel circuit 110 provides the driving current to the inorganic light-emitting element 120 during the driving of the display. Specifically, the sub-pixel circuit 110 may provide the driving current whose magnitude and duration are controlled based on the image data voltage (i.e., constant current generator data voltage and PWM data voltage) applied from the drive unit 500 to the inorganic light-emitting element 20.

That is, the sub-pixel circuit 110 may drive the inorganic light-emitting element 120 through the pulse amplitude modulation (PAM) and/or the pulse width modulation (PWM) to control the luminance of light emitted from the inorganic light-emitting element 120.

To this end, the sub-pixel circuit 110 may include the constant current source circuit 111 for providing a constant current having a certain magnitude based on the constant current generator data voltage to the inorganic light-emitting element 120, and the PWM circuit 112 for controlling the time when the constant current is provided to the inorganic light-emitting element 20 based on the PWM data voltage. Here, the constant current provided to the inorganic light-emitting element 120 becomes the driving current.

The constant current source circuit 111 and the PWM circuit 112 each include the driving transistor. Hereinafter, the driving transistor included in the constant current source circuit 111 is referred to as a first driving transistor, and the driving transistor included in the PWM circuit 112 is referred to as a second driving transistor.

When the sensing driving is performed, if the first specific voltage is applied to the constant current source circuit 111, a first current corresponding to the first specific voltage flows in the first driving transistor, and if the second specific voltage is applied to the PWM circuit 112, a second current corresponding to the second specific voltage flows in the second driving transistor.

Accordingly, the sensing unit 200 may sense the first and second currents, respectively, and output the first sensing data corresponding to the first current and the second sensing data corresponding to the second current to the correction unit 300, respectively. To this end, the sensing unit 200 may include a current detector and an Analog to Digital Converter (ADC). In this case, the current detector may be implemented using a current integrator including an Operational Amplifier (OP-AMP) and a capacitor, but is not limited thereto.

The correction unit 300 may correct the image data voltage applied to the sub-pixel circuit 110 based on the sensing data. Specifically, the correction unit 300 may identify a first reference data value corresponding to the first specific voltage in the reference data for each voltage, and may compare the identified first reference data value with the first sensing data value output from the sensing unit 200 to calculate or acquire a first compensation value for correcting the constant current generator data voltage.

In addition, the correction unit 300 may identify a second reference data value corresponding to the second specific voltage in the reference data for each voltage, and may compare the identified reference data value with the second sensing data value output from the sensing unit 200 to calculate or acquire a second compensation value for correcting the PWM data voltage.

The first and second compensation values thus obtained may be stored or updated in an internal or external memory of the correction unit 300 as described above, and then, when the display driving is performed, may be used for the correction of the image data voltage.

Specifically, the correction unit 300 uses the compensation value to correct the image data to be provided to the drive unit 500 (in particular, a data driver), thereby correcting the image data voltage applied to the sub-pixel circuit 110. Since the data driver provides the image data voltage to the sub-pixel circuit 110 based on the input image data, the correction unit 300 may correct the image data value to the sub-pixel circuit 110 to correct the image data voltage applied to the sub-pixel circuit 110.

That is, when the display driving is performed, the correction unit 300 may correct the constant current generator data value among the image data based on the first compensation value. Also, the correction unit 300 may correct the PWM data value among the image data based on the second compensation value. Accordingly, the correction unit 300 may provide the corrected constant current generator data voltage and PWM data voltage to the drive unit 500 to correct the constant current generator data voltage and PWM data voltage applied to the sub-pixel circuit 110, respectively.

The drive unit 500 may include a gate driver providing a scan signal and an emission signal to drive pixels on the pixel array in units of row lines. In this case, in some cases, the gate driver providing the scan signal may be referred to as a scan driver, and the gate driver providing the emission signal may be referred to as an emission driver.

In addition, the drive unit 500 may include a data driver for providing image data voltages (i.e., constant current generator data voltage and PWM data voltage) and specific voltages (i.e., first specific voltage and second specific voltage) to the sub-pixel circuits. In this case, the data driver may include a Digital to Analog Converter (DAC) for converting the image data and the specific voltage data provided from the TCON 400 into the image data voltage and the specific voltage, respectively.

Figure 13A:
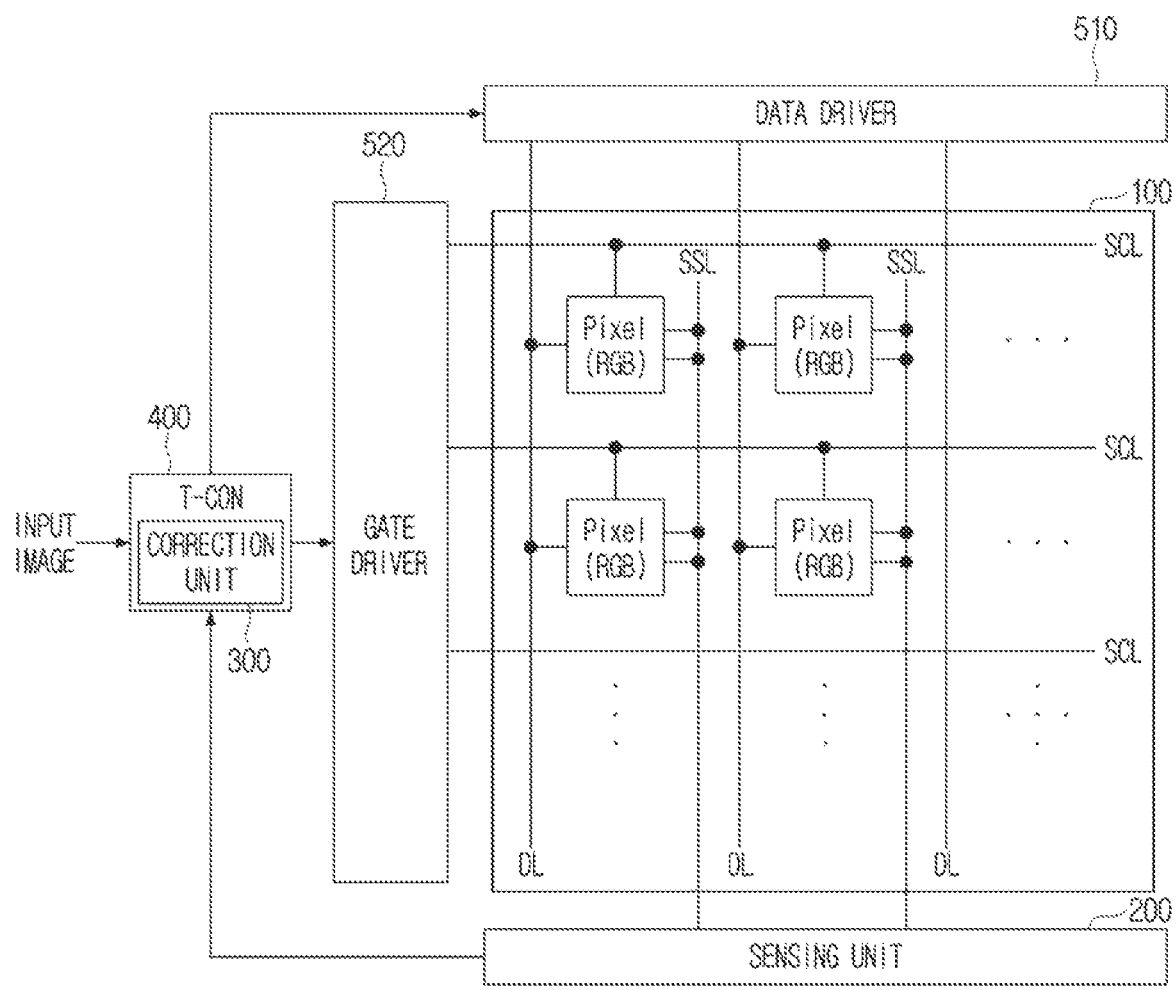
FIG. 13A is a diagram illustrating an implementation example of a sensing unit according to an embodiment of the present disclosure.
Figure 13B:
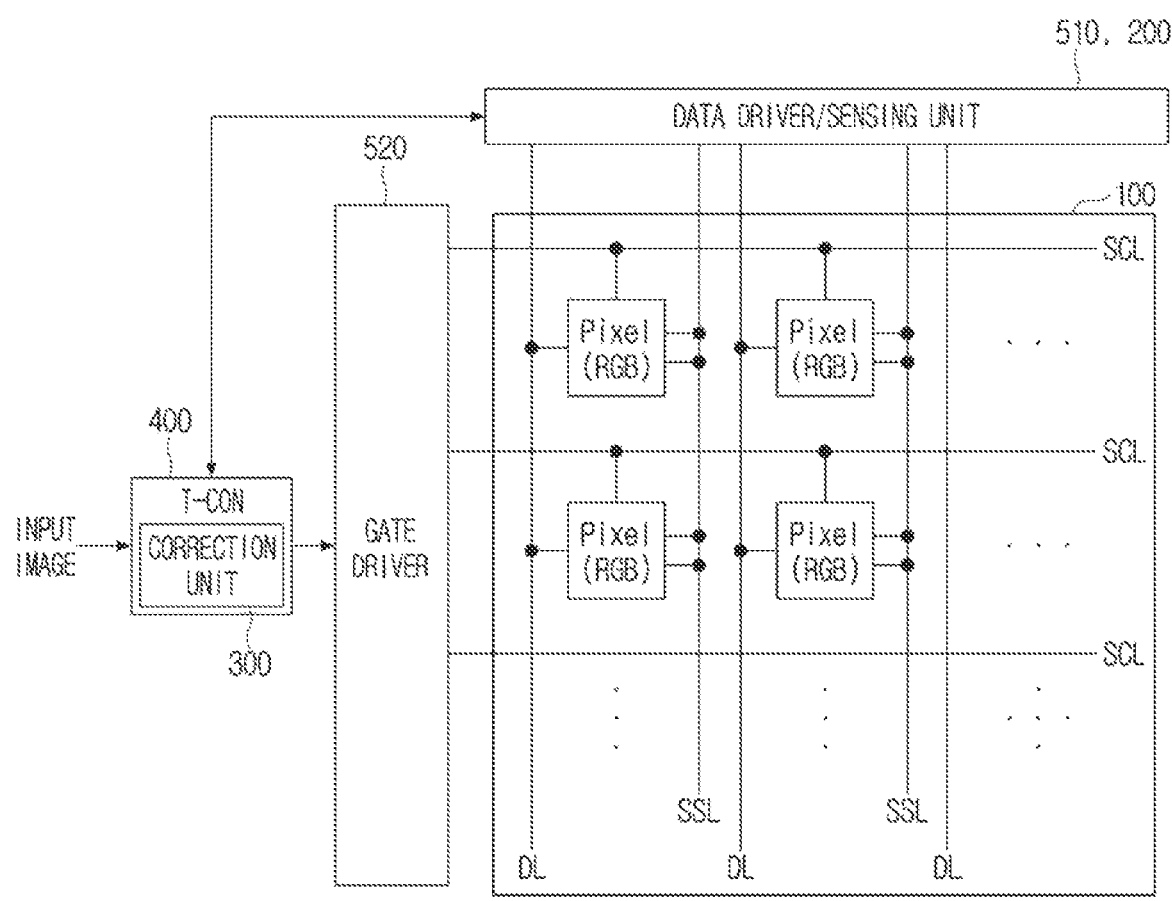
FIG. 13B is a diagram illustrating an implementation example of a sensing unit according to another embodiment of the present disclosure.

FIGS. 13A and 13B are diagrams illustrating implementation examples of the sensing unit 200. In FIGS. 13A and 13B, the display panel 100 includes a plurality of pixels disposed in each area where a plurality of data lines DL and a plurality of scan lines SCL intersect in a matrix form.

In this case, each pixel may include three sub-pixels such as R, G, and B. Also, as described above, the display panel 100 may include the inorganic light-emitting elements 120 having colors corresponding to sub-pixels and sub-pixel circuits 110 provided for each inorganic light-emitting element.

Here, a data line DL is a wiring line for applying an image data voltage (specifically, constant current generator data voltage and PWM data voltage) or a specific voltage (specifically, first specific voltage and second specific voltage) applied from the data driver 510 to each sub-pixel circuit 110 of the display panel 100, and a scan line SCL is a wiring line for driving the scan signal or the emission signal applied from the gate driver 520 to each sub-pixel circuit 110 of the display panel 100 to drive pixel (or sub-pixel) in units of row lines.

Therefore, the image data voltage or the specific voltage applied from the data driver 510 through the data line DL may be applied to the sub-pixel circuits of the row line selected through the scan signal (e.g., SPWM(n), SCCG(n), SP(n)) applied from the gate driver 520.

In this case, voltages (image data voltage and specific voltage) to be applied to each of the R, G, and B sub-pixels may be time-division multiplexed to be applied to each pixel of the display panel 100. The time-division multiplexed voltages may be applied to the corresponding sub-pixel circuits, respectively, through a DeMUX circuit.

According to the embodiment, unlike FIGS. 13A and 13B, separate data lines may be provided for each R, G, and B sub-pixel. In this case, voltages (image data voltage and specific voltage) to be applied to each of the R, G, and B sub-pixels may be simultaneously applied to the corresponding sub-pixels through the corresponding data lines. In this case, the DeMUX circuit will not be needed.

This also goes the same for a sensing line SSL. That is, according to the embodiment of the present disclosure, the sensing line SSL may be provided for each column line of a pixel, as illustrated in FIGS. 13A and 13B. In this case, the DeMUX circuit is required for the operation of the sensing unit 200 for each of the R, G, and B sub-pixels.

Also, unlike the examples illustrated in FIGS. 13A and 13B, when the sensing line SSL is provided in units of column lines of the sub-pixel, a separate DeMUX circuit is not required for the operation of the sensing unit 200 for each of the R, G, and B sub-pixels. However, compared to the embodiment illustrated in FIGS. 13A and 13B, the unit configuration of the sensing unit 200 to be described below will be required three times more.

In FIGS. 13A and 13B, one scan line SCL is shown for one row line. However, the actual number of scan lines may vary according to a driving method or implementation example of the pixel circuit 110 included in the display panel 100. For example, for each row line, the scan line for providing the above-described scan signals (SPWM(n), SCCG(n), and SP(n)) or emission signals (SET(n), Emi_PWM(n), Emi_PAM(n), and Sweep(n)) may be provided for each row line.

As described above, the first and second currents flowing in the first and second driving transistors based on the specific voltage may be transmitted to the sensing unit 200 through the sensing line SSL. Accordingly, the sensing unit 200 may sense the first and second currents, respectively, and output the first sensing data corresponding to the first current and the second sensing data corresponding to the second current to the correction unit 300, respectively.

In this case, according to the embodiment of the present disclosure, the sensing unit 200 may be implemented as a data driver 510 and a separate integrated circuit (IC) as illustrated in FIG. 13A, or as illustrated in FIG. 13B, may be implemented as a single IC together with the data driver 510. As described above, the correction unit 300 may correct the constant current generator data voltage based on the first sensing data output from the sensing unit 200 and correct the PWM data voltage based on the second sensing data.

In FIGS. 13A and 13B, the first and second currents may be transmitted to the sensing unit 200 through the sensing line SSL separate from the data line DL as an example. However, the embodiment is not limited thereto. For example, in an example in which the data driver 510 and the sensing unit 200 are implemented as a single IC as illustrated in FIG. 13B, an example in which the first and second currents are transmitted to the sensing unit 200 through the data line DL may also be possible.

Hereinafter, with reference to FIGS. 14A to 31B, one or more embodiments of the present disclosure related to the external compensation method for the deviation in electrical characteristics of the driving transistor will be described in detail.

In this case, the embodiments (i.e., internal compensation method for the IR drop) in which the driving voltages used in the data setting period and the light-emitting period in relation to the above-described IR drop problem are different will be described with reference to FIGS. 14A to 23B, and the embodiments (i.e., external compensation method for the IR drop) in which the image data voltage in relation to the above-described IR drop problem is corrected will be described with reference to FIGS. 24A to 31B.

Figure 14A:
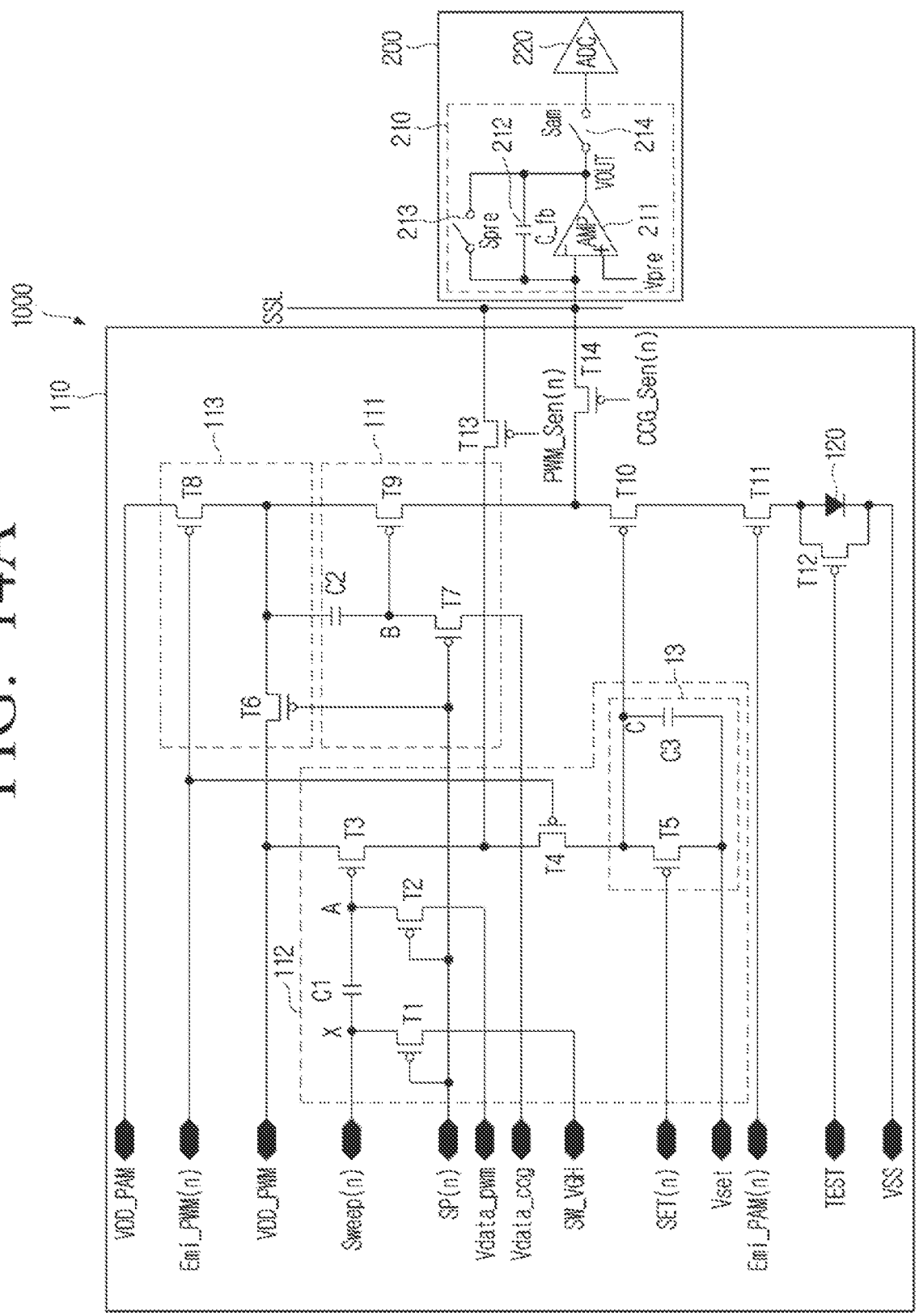
FIG. 14A is a detailed circuit diagram of the sub-pixel circuit and the sensing unit according to the embodiment of the present disclosure.

FIG. 14A is a detailed circuit diagram of the sub-pixel circuit 110 and the sensing unit 200 according to an embodiment of the present disclosure. FIG. 14A illustrates a circuit related to one sub-pixel, that is, one inorganic light-emitting element 120, the sub-pixel circuit 110 for driving the inorganic light-emitting element 120, and a unit configuration of the sensing unit 200 for sensing the current flowing in the driving transistors T3 and T9 included in the sub-pixel circuit 110. In FIG. 14A, the sub-pixel circuit 110 may include the constant current source circuit 111, the PWM circuit 112, a driving voltage change unit 113, the first switching transistor T10, the second switching transistor T11, the transistor T12, the transistor T13, and the transistor T14.

The constant current source circuit 111 turns on/off according to the first driving transistor T9, the capacitor C2 connected between the source terminal and the gate terminal of the first driving transistor T9, and the transistor T7 that is controlled to be turned on/off according to the scan signal SP(n) and applies the constant current generator data voltage applied through a data signal line Vdata_ccg to the gate terminal of the first driving transistor T9 while being turned on.

The driving voltage change unit 113 may change the driving voltage applied to the first driving transistor T9. Specifically, the driving voltage change unit 113 may apply the second driving voltage VDD_PWM to the source terminal of the first driving transistor T9 during the data setting period under the control of the drive unit 500, and apply the first driving voltage VDD_PAM to the source terminal of the first driving transistor T9 during the light-emitting period.

To this end, the driving voltage change unit 113 may include the transistor T6 that has a source terminal connected to the terminal to which the second driving voltage VDD_PWM is applied, a drain terminal connected to the source terminal of the first driving transistor T9, and a gate terminal receiving the scan signal SP(n). In addition, the driving voltage change unit 113 may include the transistor T8 that has a source terminal connected to the terminal to which the first driving voltage VDD_PWM is applied, a drain terminal connected to the source terminal of the first driving transistor T9, and a gate terminal receiving the emission signal Emi_PWM(n).

The first driving voltage VDD_PAM and the second driving voltage VDD_PWM may be applied to the sub-pixel circuit 110 from a power IC through a separate wiring. Therefore, they do not affect each other. Also, the first driving voltage VDD_PAM and the second driving voltage VDD_PWM may have the same magnitude of voltage, but are not limited thereto.

The PWM circuit 112 includes the second driving transistor T3 having a source terminal connected to a second driving voltage VDD_PWM terminal, the capacitor C1 for coupling a sweep signal, which is a voltage signal that sweeps between two different voltages SW_VGH and SW_VGL, to the gate terminal of the second driving transistor T3, and the transistor T2 that is controlled to be turned on/off according to the scan signal SP(n) and applies the PWM data voltage applied through a data signal line Vdata_pwm to the gate terminal of the second driving transistor T3 while being turned on.

The PWM circuit 112 includes the reset unit 13. The reset unit 13 is a component for forcibly turning on the first switching transistor T10 before each light-emitting period starts.

In order for the driving current to flow in the inorganic light-emitting element 120, the first switching transistor T10 needs to be turned on. However, as will be described below, when the light emission of the inorganic light-emitting element 120 in each light-emitting period ends, the first switching transistor T10 is turned off, and therefore, the first switching transistor T10 needs to be forcibly turned on before the next light-emitting period starts.

Therefore, according to the embodiment of the present disclosure, the first switching transistor T10 is turned on at the start time of each of the plurality of light-emitting periods through the operation of the reset unit 13, which will be described below, so that each light-emitting period is turned on, so each light-emitting period may operate normally.

In FIG. 14A, the drain terminal of the second driving transistor T3 is connected to the gate terminal of the first switching transistor T10 through the transistor T4 turned on according to the emission signal Emi_PWM(n).

Therefore, the PWM circuit 112 may control the turn on/off operation of the first switching transistor T10 through the operation of the reset unit 13 and the turn on/off operation of the second driving transistor T3, thereby controlling the time when the driving current flows in the inorganic light-emitting element 120 within the light-emitting period.

In addition, the PWM circuit 112 includes the transistor T1. When the transistor T1 is turned on according to the SP(n) signal, the high voltage SW_VGH of the sweep signal is applied to the node X. Through such an operation, it is possible to minimize the luminance non-uniformity and the horizontal crosstalk phenomenon that may occur due to the sweep rod. Details thereof will be described below.

The source terminal of the second switching transistor T11 is connected to the drain terminal of the first switching transistor T10, and the drain terminal of the second switching transistor T11 is connected to the anode terminal of the inorganic light-emitting element 120. The second switching transistor T11 may be turned on/off according to the control signal Emi_PAM(n) to electrically connect/disconnect the first switching transistor T10 and the inorganic light-emitting element 120. The turn on/off timing of the second switching transistor T11 is related to the implementation of black gradation, which will be described in detail below.

The transistor T12 is connected between the anode terminal and the cathode terminal of the inorganic light-emitting element 120. The transistor T12 may be used for different purposes before and after the inorganic light-emitting element 120 is mounted on a TFT layer to be described below and electrically connected to the sub-pixel circuit 110.

Figure 14B:
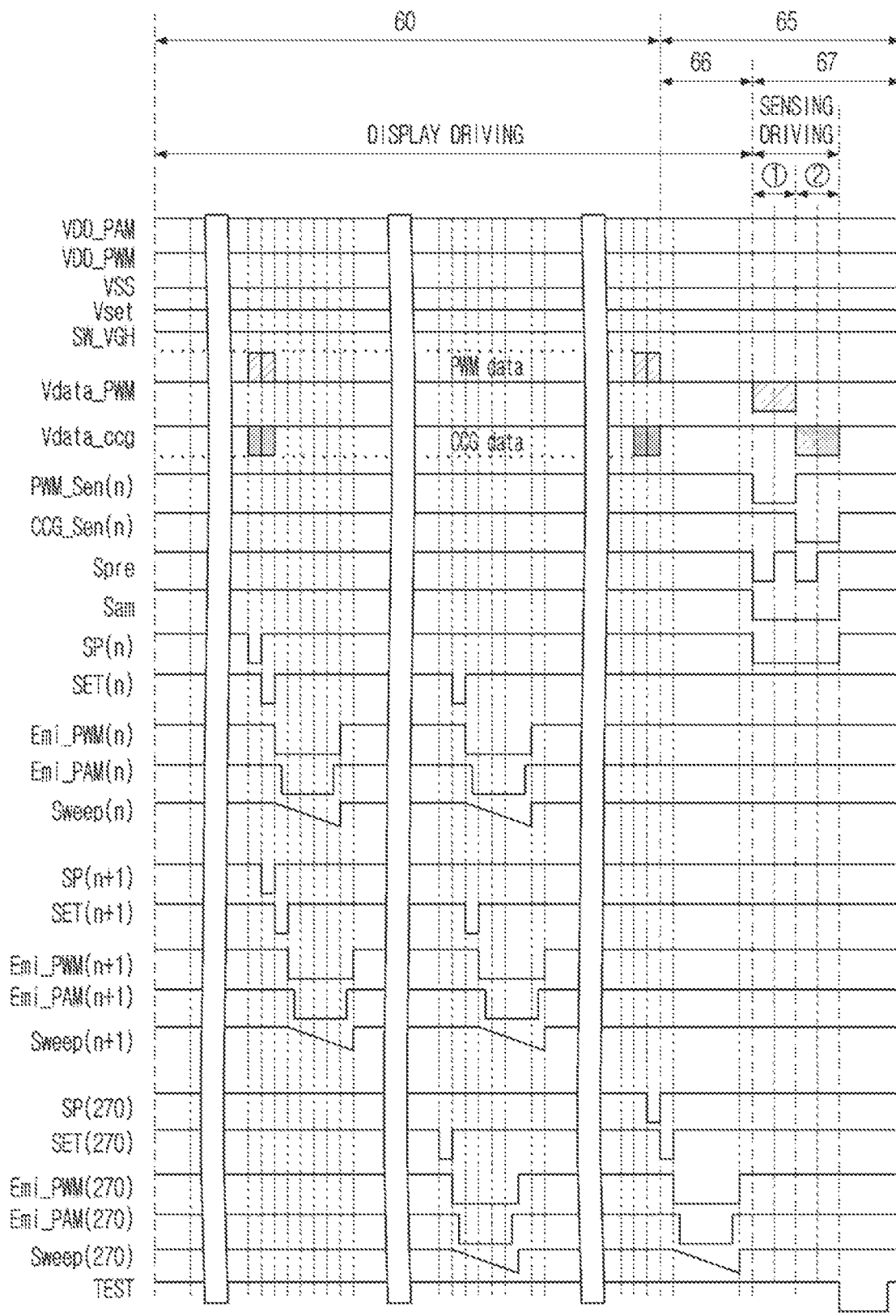
FIG. 14B is a driving timing diagram of the sub-pixel circuit illustrated in FIG. 14A.

For example, before the inorganic light-emitting element 120 and the sub-pixel circuit 110 are connected to each other, the transistor T12 may be turned on according to a control signal TEST to check whether the sub-pixel circuit 110 is abnormal. In addition, after the inorganic light-emitting element 120 and the sub-pixel circuit 110 are connected to each other, as illustrated in FIG. 14B, the transistor T12 may be turned on according to the control signal TEST to discharge the charge remaining in the inorganic light-emitting element 120.

The transistor T14 has a source terminal connected to the drain terminal of the first driving transistor T9 and a drain terminal connected to the sensing unit 200. The transistor T14 is turned on according to a control signal CCG_Sen(n) while sensing driving is being performed, and transmits the first current flowing in the first driving transistor T9 to the sensing unit 200 through the sensing line SSL.

The transistor T13 has a source terminal connected to the drain terminal of the second driving transistor T3 and a drain terminal connected to the sensing unit 200. The transistor T13 is turned on according to a control signal PWM_Sen(n) while sensing driving is being performed, and transmits the second current flowing in the second driving transistor T3 to the sensing unit 200 through the sensing line SSL.

The cathode terminal of the inorganic light-emitting element 120 is connected to the ground voltage VSS terminal. In FIG. 14A, the unit configuration of the sensing unit 200 includes a current integrator 210 and an ADC 220. The current integrator 210 may include an amplifier 211, an integrating capacitor 212, a first switch 213, and a second switch 214.

The amplifier 211 may include an inverting input terminal (−) connected to the sensing line SSL and receiving first and second currents flowing in the first and second driving transistors T9 and T3 of the sub-pixel circuit 110, a non-inverting input terminal (+) receiving a reference voltage Vpre, and an output terminal Vout.

The integrating capacitor 212 may be connected between the inverting input terminal (−) and the output terminal Vout of the amplifier 211, and the first switch 213 may be connected to both terminals of the integrating capacitor 212. Both terminals of the second switch 214 are connected to the output terminal Vout of the amplifier 211 and the input terminal of the ADC 220, respectively, and the second switch 214 may be switched according to a control signal Sam.

The unit configuration of the sensing unit 200 illustrated in FIG. 14A may be provided for each sensing line SSL. Therefore, for example, in the case where sensing lines are provided for each column line of a pixel in the display panel 100 including 480 pixel column lines, the sensing unit 200 may include 480 unit configurations. As another example, in the case where sensing lines are provided for each column line of R, G, and B sub-pixels in the display panel 100 including 480 pixel column lines, the sensing unit 200 may include 1440 (=480*3) unit configurations.

FIG. 14B is a driving timing diagram of the sub-pixel circuit 110 illustrated in FIG. 14A. Specifically, FIG. 14B illustrates various control signals, driving voltage signals, and data signals applied to the sub-pixel circuits 110 during one image frame interval and a blanking interval.

In FIG. 14B, the display panel 100 may be driven in order of display driving and sensing driving. As illustrated in FIG. 14B, the control signals SP, SET, Emi_PWM, Emi_PAM, and sweep are applied to the display panel 100 during the display driving period. For example, as illustrated in FIG. 14B, the control signals SP(n), SET(n), Emi_PWM(n), Emi_PAM(n), and Sweep(n) may be applied to the sub-pixel circuits 110 included in the n-th row line of the display panel 100 during the display driving period.

As described above, the sub-pixel circuits included in each row line of the display panel 100 may be in the order of the data setting period and the plurality of light-emitting periods. In addition, the sub-pixel circuits included in all the row lines of the display panel 100 may be driven in the row line order.

In FIG. 14B, when viewing one row line (e.g., n-th row line) as a reference, after the scan signal SP(n) related to the image data voltage setting operation is applied, the emission signals SET(n), Emi_PWM(n), Emi_PAM(n), and Sweep(n) related to the driving current providing operation are applied plural times.

In addition, looking at the relationship between the row lines, it may be checked that the scan signal SP(n) for the n-th row line and the scan signal SP(n+1) for the n+1-th row line are sequentially applied in the row line order. Accordingly, it may be checked that the emission signals SET(n), Emi_PWM(n), Emi_PAM(n), and Sweep(n) for the n-th row line and the emission signals SET(n+1), Emi_PWM (n+1), Emi_PAM (n+1), and Sweep (n+1) for the n+1-th row line are also sequentially applied in the row line order.

Hereinafter, a detailed operation of the sub-pixel circuit 110 will be described with reference to the control signals SP(n), SET(n), Emi_PWM(n), EMi_PAM(n), and Sweep (n)) related to the n-th row line of FIG. 14B and the circuit of FIG. 14A.

First, in the data setting period, when the low-level scan signal SP(n) is applied to the sub-pixel circuit 110, the transistor T2 of the PWM circuit 112, the transistor T7 of the constant current source circuit 111, and the transistor T6 of the driving voltage change unit 113 are turned on.

When the transistor T2 is turned on, the PWM data voltage PWM data applied from the second data driver is applied to the gate terminal (hereinafter, referred to as the node A) of the second driving transistor T3 through the data signal line Vdata_pwm.

Since the second driving voltage VDD_PWM is applied to the source terminal of the second driving transistor T3, a voltage corresponding to the difference between the PWM data voltage and the second driving voltage VDD_PWM is set between the gate terminal and the source terminal of the second driving transistor T3.

In this case, the PWM data voltage may be higher than the second driving voltage VDD_PWM when it is assumed that the threshold voltage of the second driving transistor T3 is 0[V]. Therefore, the second driving transistor T3 is maintained in a turned-off state while the PWM data voltage is set to the node A. (This is because PMOSFET is turned on when a voltage lower than the threshold voltage is applied between the gate terminal and the source terminal, and turned off when a voltage exceeding the threshold voltage is applied.)

When the transistor T7 is turned on, the constant current generator data voltage CCG data applied from the first data driver is applied to the gate terminal (hereinafter, referred to as the node B) of the first driving transistor T9 through a data signal line Vdata_ccg.

Since the transistor T6 of the driving voltage change unit 113 is also turned on according to the scan signal SP(n), the second driving voltage VDD_PWM is applied to the source terminal of the first driving transistor T9 during the data setting period. Accordingly, the voltage corresponding to the difference between the constant current generator data voltage and the second driving voltage VDD_PWM is set between the gate terminal and the source terminal of the first driving transistor T9.

In this case, the constant current generator data voltage may be lower than the second driving voltage VDD_PWM when it is assumed that the threshold voltage of the first driving transistor T9 is 0[V]. Therefore, the first driving transistor T8 is maintained in a turned-on state while the constant current generator data voltage is set to the node B. (This is because PMOSFET is turned on when the voltage lower than the threshold voltage is applied between the gate terminal and the source terminal, and turned off when the voltage exceeding the threshold voltage is applied.)

When the first light-emitting period for the n-th row line starts, the low-level emission signal SET(n) is applied to the transistor T5. Accordingly, Vset, which is a low voltage, is charged in the capacitor C3 through the turned-on transistor T5, and a low voltage is applied to the gate terminal (hereinafter, referred to as the node C) of the first switching transistor T10 to turn-on the first switching transistor T10.

Thereafter, as illustrated in FIG. 14B, the emission signals Emi_PWM(n), Emi_PAM(n), and Sweep(n) are applied to the sub-pixel circuit 110 during the first light-emitting period. Specifically, when the low-level emission signal Emi_PWM(n) is applied to the transistor T8 of the driving voltage change unit 113, the transistor T8 is turned on, and the first driving voltage VDD_PAM is applied to the source terminal of the first driving transistor T9.

In this case, even if the voltage applied to the source terminal of the first driving transistor T9 changes from the second driving voltage VDD_PWM to the first driving voltage VDD_PAM, the voltage between the source terminal and the gate terminal of the first driving transistor T9 is maintained as the voltage set in the data setting period by the capacitor C2. Accordingly, the first driving transistor T9 is still maintained in the turned-on state.

When the low-level emission signal Emi_PAM(n) is applied to the second switching transistor T11, the second switching transistor T11 is turned on. Consequently, through the transistor T8 turned on according to the Emi_PWM(n) signal, the first driving transistor T9 maintained in the turned-on state, the first switching transistor T10 turned on according to the SET(n) signal, and the second switching transistor T11 turned on according to the Emi_PAM(n) signal, the first driving voltage VDD_PAM is applied to the anode terminal of the light-emitting element 120 and the driving current flows in the inorganic light-emitting element 120.

In this case, the magnitude of the driving current is determined by the difference in the voltage between the gate terminal and the source terminal of the first driving transistor T9, in particular, the magnitude of the constant current generator data voltage set to the gate terminal of the first driving transistor T9.

When the emission signal Sweep(n) (e.g., sweep voltage that linearly decreases as illustrated in FIG. 14B) is applied to the capacitor C1, the applied sweep voltage is coupled to the node A, so the voltage of the node A also decreases linearly.

Accordingly, when the difference value between the voltage of the node A and the second driving voltage VDD_PWM reaches the threshold voltage value of the second driving transistor T3, the second driving transistor T3 is turned on, and the high-level second driving voltage VDD_PWM is applied to the gate terminal of the first switching transistor T10 through the turned-on second driving transistor T3. (In this case, the transistor T4 is also in the turned-on state according to the low-level emission signal Emi_PWM(n).)

Accordingly, the first switching transistor T10 is turned off, the driving current does not flow in the inorganic light-emitting element 120 any longer, and the inorganic light-emitting element 120 stops emitting light. In this case, the time for the driving current to flow in the inorganic light-emitting element 120 is determined by the difference in the voltage between the gate terminal and the source terminal of the second driving transistor T3, in particular, the magnitude of the PWM data voltage set to the gate terminal of the second driving transistor T3.

The emission signals SET(n), Emi_PWM(n), Emi_PAM (n), and Sweep(n) are equally applied to the second and subsequent light-emitting periods for the n-th row line, respectively. Accordingly, the inorganic light-emitting elements 120 of the n-th row line equally emit light in second and subsequent light-emitting periods, respectively, based on the image data voltage set in the data setting period.

Even though the light emission of the inorganic light-emitting element 120 ends, charge may remain in the inorganic light-emitting element 120 (specifically, in junction capacitance of the inorganic light-emitting element 120). This may cause a problem that the inorganic light-emitting element 20 finely emits light even if the light-emitting period is terminated, which may be particularly problematic when expressing low gradation (e.g., black).

Therefore, according to the embodiment of the present disclosure, as illustrated in FIG. 14B, the low-level TEST signal may be applied to the sub-pixel circuit 110 after the display driving and sensing driving are completed. In this case, the TEST signal may be a global signal applied simultaneously to all sub-pixel circuits 110 of the display panel 100. Accordingly, the charge remaining in the inorganic light-emitting element 120 is completely discharged to the ground voltage VSS terminal through the turned-on transistor T12, and the above-described problem may be solved.

Unlike illustrated in FIG. 14B according to the embodiment, the low-level emission signal TEST(n) is applied immediately after each light-emitting period ends (i.e., after the application of the low-level emission signal Emi_PWM (n) is completed), so an example of discharging the charge remaining in the inorganic light-emitting element 120 to the ground voltage VSS terminal may also be possible.

In the above, only operations related to the n-th row line have been described, but the operations for the remaining row lines will also be sufficiently understood through the above description.

Reviewing in detail the timing diagram of FIG. 14B, there is a difference between the time when the emission signal Emi_PWM(n) becomes the low level and the time when the emission signal Emi_PAM(n) is the low level. This is to implement the black gradation as described above.

Specifically, when the PWM data voltage corresponding to the black gradation is set at the node A, the first switching transistor T10 should be turned off as soon as the light-emitting period starts. That is, theoretically, at the time when the emission signal Emi_PWM(n) becomes low, the second driving voltage VDD_PWM is applied to the node C through the turned-on second driving transistor T3 and the turned-on transistor T4, so the first switching transistor T17 needs to be immediately turned off. (When the first switching transistor T10 is immediately turned off, the driving current does not flow in the inorganic light-emitting element 120 at all and the black gradation is expressed.)

However, in reality, it takes time for the node C to be charged with the second driving voltage VDD_PWM, so the first switching transistor T10 is not immediately turned off. Specifically, after the second driving voltage VDD_PWM is applied to the node C to start charging the capacitor C3, the transistor T10 is maintained in the turned-on state until the voltage capable of turning off the first switching transistor T10 is charged at the node C, so the leakage of the driving current occurs in the first switching transistor T10.

Consequently, when the first switching transistor T10 and the inorganic light-emitting element 120 are directly connected without the second switching transistor T11, even if the PWM data voltage corresponding to the black gradation is set at the node A, the driving current leaked from the first switching transistor T17 flows in the inorganic light-emitting element 120 for a certain period of time, so it is impossible to implement the accurate black gradation.

To solve this problem, according to the embodiment of the present disclosure, the second switching transistor T11 may be disposed between the first switching transistor T10 and the inorganic light-emitting element 120. In addition, the drive unit 500 may apply the emission signal Emi_PAM(n) so that the second switching transistor T11 is turned on after a predetermined time elapses from the time when the emission signal Emi_PWM(n) becomes low. Here, the predetermined time may be a time longer than or equal to the time when the voltage of the node C is charged from the Vset voltage to the voltage capable of turning off the first switching transistor T10.

In this case, even if the PWM data voltage corresponding to the black gradation is set at the node A, the leakage current generated when the first switching transistor T10 is not immediately turned off may be blocked by the second switching transistor T11. Accordingly, it is possible to implement the accurate black gradation.

In FIGS. 14A and 14B, different driving voltages are applied to the source terminal of the first driving transistor T9 of the constant current source circuit 111 through the driving voltage change unit 113 in the data setting period and the light-emitting period.

This is to set an accurate voltage between the gate terminal and the source terminal of the first driving transistor T9 by applying the second driving voltage VDD_PWM, which does not cause a voltage drop due to the driving current, to the constant current source circuit 111 during the data setting period.

Specifically, since the resistance component exists in the display panel 100 as described above, the IR drop occurs when the driving current flows, resulting in the drop in the first driving voltage VDD_PAM. In addition, since the display panel 100 is driven in the progressive driving method in one or more embodiments of the present disclosure, sub-pixel circuits of other row lines operate in the data setting period while sub-pixel circuits of some row lines operate in the light-emitting period.

Therefore, when the same first driving voltage VDD_PAM is applied to the constant current source circuits 111 in the data setting period and the light-emitting period, the first driving voltage VDD_PAM applied to the constant current source circuits 111 of the row line operating in the data setting period is affected by the drop in the first driving voltage VDD_PAM due to the constant current source circuits 111 of the row line operating in the light-emitting period. This prevents the accurate constant current generator data voltage from being set to the constant current source circuits 111 of the row line operating in the data setting period.

In addition, the resistance component present in the actual display panel 100 has a different value for each area of the display panel 100. Therefore, when the driving current flows, a difference occurs in the IR drop value, that is, the degree of drop in the first driving voltage VDD_PAM, for each area of the display panel 100, which may also need to be compensated.

In order to solve such an IR drop problem, according to the embodiment of the present disclosure, the drive unit 500 may control the driving voltage change unit 113 to apply the second driving voltage VDD_PWM without voltage drop according to the driving current in the data setting period to the constant current source circuit 111.

Accordingly, during the data setting period, the constant current generator data voltage is set to the constant current source circuit 111 based on the second driving voltage VDD_PWM. Thereafter, the driving voltage applied to the constant current source circuit 111 in the light-emitting period changes to the first driving voltage VDD_PAM, but since the voltage between the gate terminal and the source terminal of the first driving transistor T9 set in the data setting period is maintained as it is by the capacitor C2, the accurate constant current generator data voltage may be set to the constant current source circuit 111 regardless of whether the first driving voltage VDD_PAM drops or the degree of drop of the first driving voltage VDD-PAM.

The driving current does not flow in the second driving transistor T2 of the PWM circuit 112. Therefore, since the voltage drop does not occur in the second driving voltage VDD_PWM during the data setting period and the light-emitting period, or is negligible even if the voltage drop occurs, even in the case where the second driving voltage VDD_PWM is equally applied to the PWM circuit 112 in the data setting period and the light-emitting period is not a problem.

In this way, the driving voltage change unit 113 is included in the sub-pixel circuit 110, and the method of solving the above-described IR drop problem through the operation of the driving voltage change unit 113 is referred to as the internal compensation method for IR drop. On the other hand, as will be described below with reference to FIGS. 24A to 31B, the method of correcting the image data voltage to solve the above-described IR drop problem will be referred to as the IR drop external compensation method.

According to an embodiment of the present disclosure, the same constant current generator data voltage may be applied to all the constant current source circuits 111 of the display panel 100. Therefore, the driving current (i.e., constant current) having the same magnitude is provided to the inorganic light-emitting element 120 through the constant current source circuit 111, and accordingly, the wavelength change problem of the LED according to the change in magnitude of the driving current may be solved.

In addition, the PWM data voltages corresponding to the gradation values of each sub-pixel may be applied to each PWM circuit 112 of the display panel 100. Therefore, the gradation of each sub-pixel may be expressed by controlling the duration of the driving current through the PWM circuit 112.

The same constant current generator voltage is applied to one display panel 100, but different constant current generator voltages may be applied to another display panel. Therefore, the deviation in brightness or color between the display panels that may occur when a plurality of display panels are connected to constitute one large display apparatus may be compensated by adjusting the constant current generator voltage.

In the above, from the viewpoint of solving the problem of changing the wavelength of the LED and expressing the gradation of the image, it has been described that the same constant current generator data voltage is applied to the constant current source circuit 111. However, as described above, in one or more embodiments of the present disclosure, since the constant current generator data voltage is corrected to compensate for the deviation in the threshold voltage and mobility between the first driving transistors T9, actually, the constant current generator data voltage whose value is corrected through the sensing drive is applied to the constant current source circuit 111. Therefore, unlike the internal compensation method in which the constant current generator data voltage is applied from the power IC, the external compensation method receives the constant current generator data voltage from the data driver.

Referring back to FIG. 14B, the sensing driving period may include a sensing period ① of the PWM circuit 112 and a sensing period ② of the constant current source circuit 111. During the sensing period ① of the PWM circuit 112, the second current flowing in the second driving transistor T3 is transmitted to the sensing unit 200 based on the second specific voltage.

During the sensing period ② of the constant current source circuit 111, the first current flowing in the first driving transistor T9 is transmitted to the sensing unit 200 based on the first specific voltage. Accordingly, the sensing unit 200 may output first sensing data and second sensing data based on the first and second currents, respectively.

In this case, according to the embodiment of the present disclosure, the sensing driving may be performed within the blanking interval 65 as illustrated in FIG. 14B. The blanking interval 65 refers to a time interval in which valid image data is not input to the display panel 100. Describing a 120 Hz image as an example, the display driving period may occupy 7.3 ms and the blanking interval may occupy about 1 ms within one image frame time, but is not limited thereto. Therefore, the sensing unit 200 may sense the current flowing in the driving transistors T9 and T3 based on the specific voltage applied within the blanking interval 65 of one image frame, and output sensing data corresponding to the sensed current.

However, the embodiment is not limited thereto. For example, the sensing driving may be performed during a booting interval, a power-off interval, a screen-off interval, etc., of the display apparatus 1000. Here, the booting interval may refer to an interval from when system power is applied to before the screen is turned on, the power-off interval may refer to an interval from when the screen is turned off to before the system power is released, and the screen-off interval may refer to an interval in which the screen is turned off while the system power is being applied.

Hereinafter, the operation of the display apparatus 1000 in the sensing driving period will be described in more detail with reference to FIGS. 14A and 14B. Specifically, the second specific voltage is applied from the second data driver to the data signal line Vdata_pwm during the sensing period ① of the PWM circuit 112. The second specific voltage may be a predetermined any voltage for turning on the second driving transistor T3. In this case, the transistor T2 is turned on according to the scan signal SP(n), and the second specific voltage is input to the node A through the turned-on transistor T2.

In the sensing period ① of the PWM circuit 112, the transistor T13 is turned on according to the control signal PWM_Sen(n), and the second current flowing in the second driving transistor T3 through the turned-on transistor T13 is applied to the sensing unit 200. During the sensing period ① of the PWM circuit 112, the first switch 213 of the sensing unit 200 is turned on and off according to a control signal Spre. Hereinafter, the interval in which the first switch 213 is turned on in the sensing period ① of the PWM circuit 112 is referred to as a first initialization interval, and the interval in which the first switch 213 is turned off is referred to as a first sensing interval.

Since the first switch 213 is turned on during the first initialization interval, a reference voltage Vpre input to the non-inverting input terminal (+) of the amplifier 211 is maintained at the output terminal Vout of the amplifier 211. Since the first switch 213 is turned off in the first sensing interval, the amplifier 211 operates as a current integrator and integrates the second current. In this case, due to the second current flowing in the inverting input terminal (−) of the amplifier 211 in the first sensing interval, the voltage difference between both terminals of the integrating capacitor 212 increases as the sensing time elapses, that is, as the amount of accumulated charge increases.

However, due to the virtual ground characteristics of the amplifier 211, the voltage of the inverting input terminal (−) in the first sensing interval is maintained at the reference voltage Vpre regardless of the increase in the voltage difference of the integrating capacitor 212, so the voltage of the output terminal Vout of the amplifier 211 decreases in response to the difference in the voltage between both terminals of the integrating capacitor 212.

According to this principle, the second current flowing in the sensing unit 200 in the first sensing interval is accumulated as an integral value Vpsen, which is a voltage value, through the integrating capacitor 212. Since a falling slope of the voltage of the output terminal Vout of the amplifier 211 increases as the second current increases, the magnitude of the integral value Vpsen decreases as the second current increases.

The integral value Vpsen is input to the ADC 220 while the second switch 214 is maintained in the turned-on state in the first sensing interval, and is converted into second sensing data in the ADC 220 and then output to the correction unit 300.

During the sensing period ② of the constant current source circuit 111, the first specific voltage is applied from the first data driver to the data signal line Vdata_ccg. The first specific voltage is a predetermined any voltage for turning on the first driving transistor T9. In this case, the transistor T7 is turned on according to the scan signal SP(n), and the first specific voltage is input to the node B through the turned-on transistor T7.

In the sensing period ② of the constant current source circuit 111, the transistor T14 is turned on according to the control signal CCG_Sen(n), and the first current flowing in the first driving transistor T9 through the turned-on transistor T14 is transmitted to the sensing unit 200.

During the sensing period ② of the constant current source circuit 111, the first switch 213 of the sensing unit 200 is turned on and off according to the control signal Spre. Hereinafter, the interval in which the first switch 213 is turned on within the sensing period ② of the constant current source circuit 111 will be referred to as the second initialization interval and the interval in which the first switch 213 is turned off will be referred to as a second sensing interval.

Since the first switch 213 is turned on during the second initialization interval, a reference voltage Vpre input to the non-inverting input terminal (+) of the amplifier 211 is maintained at the output terminal Vout of the amplifier 211. Since the first switch 213 is turned off in the second sensing interval, the amplifier 211 operates as a current integrator and integrates the second current. In this case, due to the first current flowing in the inverting input terminal (−) of the amplifier 211 in the second sensing interval, the voltage difference between both terminals of the integrating capacitor 212 increases as the sensing time elapses, that is, as the amount of accumulated charge increases.

However, due to the virtual ground characteristics of the amplifier 211, the voltage of the inverting input terminal (−) in the second sensing interval is maintained at the reference voltage Vpre regardless of the increase in the voltage difference of the integrating capacitor 212, so the voltage of the output terminal Vout of the amplifier 211 decreases in response to the difference in the voltage between both terminals of the integrating capacitor 212.

According to this principle, the first current flowing in the sensing unit 200 in the second sensing interval is accumulated as an integral value Vcsen, which is a voltage value, through the integrating capacitor 212. Since the falling slope of the voltage of the output terminal Vout of the amplifier 211 increases as the first current increases, the magnitude of the integral value Vcsen decreases as the first current increases.

The integral value Vscen is input to the ADC 220 while the second switch 214 is maintained in the turned-on state in the second sensing interval, and is converted into first sensing data in the ADC 220 and then output to the correction unit 300. Accordingly, as described above, based on the reference data for each voltage stored in a memory and the first and second sensing data output from the sensing unit 200, the first and second compensation values may be obtained, respectively, and the obtained first and second compensation values may be stored or updated in a memory. Then, when the display driving is performed, the correction unit 300 may correct the constant current generator data voltage and the PWM data voltage to be applied to the sub-pixel circuit 110 based on the first and second compensation values, respectively.

According to the embodiment of the present disclosure, the first specific voltage and the second specific voltage may be applied to the sub-pixel circuits of one row line per image frame. That is, according to the embodiment of the present disclosure, the above-described sensing driving may be performed on one row line per image frame.

In this case, the above-described sensing driving may be sequentially performed in the row line order of the display panel 100. Therefore, for example, when the display panel 100 is composed of 270 row lines, sub-pixel circuits of a first row line may be sensed and driven after a first image frame is displayed, and sub-pixel circuits of a second row line may be sensed and driven after a second image frame is displayed In this way, after a 270-th image frame is displayed, sub-pixel circuits of a 270-th row line are sensed and driven, so one-time sensing driving of the sub-pixel circuits included in all the row lines included in the display panel 100 may be completed.

Alternatively, the above-described sensing driving may be performed in a random order of row lines. In this case, in the above example, while 270 consecutive image frames are displayed, all the row lines of the display panel 100 may be sensed and driven in random order.

According to another embodiment of the present disclosure, the first specific voltage and the second specific voltage may be applied to the sub-pixel circuits of a plurality of row lines per image frame. That is, the above-described sensing driving may be performed for a plurality of row lines per image frame. Even in this case, the above-described sensing driving may be performed sequentially or in a random order in units of a plurality of row lines.

In the above, it has been exemplified that the sensing driving is performed in the order of the sensing period ① of the PWM circuit 112 and the sensing period ② of the constant current source circuit 111, but the present disclosure is not limited thereto. According to the embodiment, of course, it is also possible that the sensing period ② of the constant current source circuit 111 proceeds first, and the sensing period ① of the PWM circuit 112 proceeds later.

Further, in the above, it has been exemplified that the sensing driving is performed after the display driving, but the present disclosure is not limited thereto. According to the embodiment, it is also possible that the sensing driving may be performed first and the display driving may be performed later.

Hereinafter, with respect to the transistor T1 of FIG. 14A, the problems of the luminance non-uniformity and horizontal crosstalk that may occur due to the sweep load will be described. It will be described that the problems may be solved by applying the high voltage SW_VGH of the sweep signal to the node X through the transistor T1 during the data setting period.

Figure 15A:
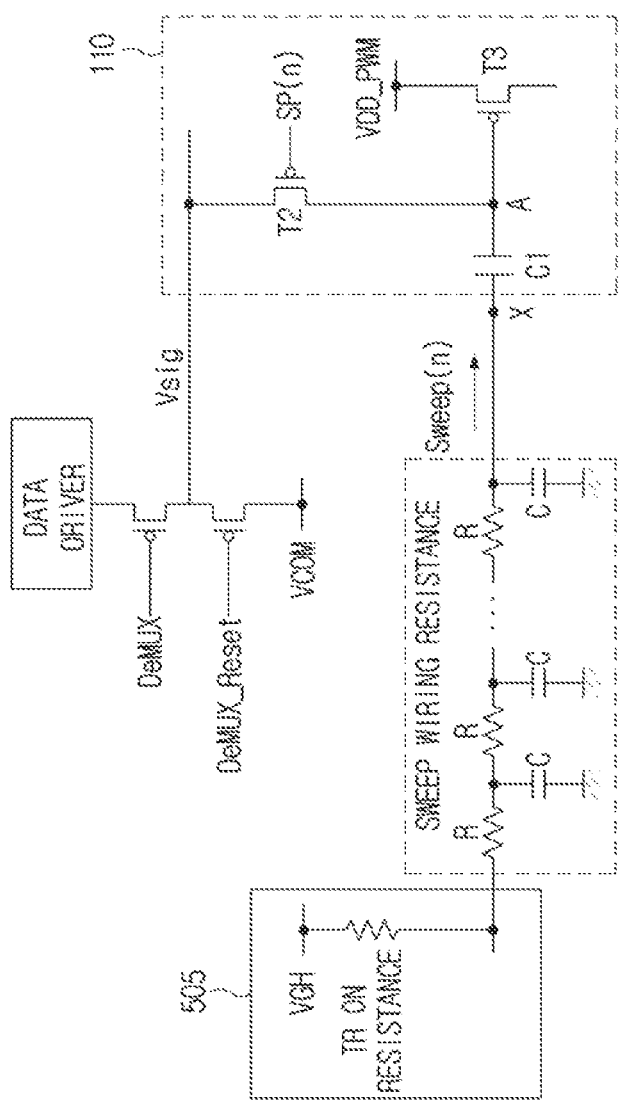
FIG. 15A is a diagram for describing the luminance non-uniformity and horizontal crosstalk phenomenon that may occur due to the sweep load in the sub-pixel circuit to which an external compensation method is applied.
Figure 15B:
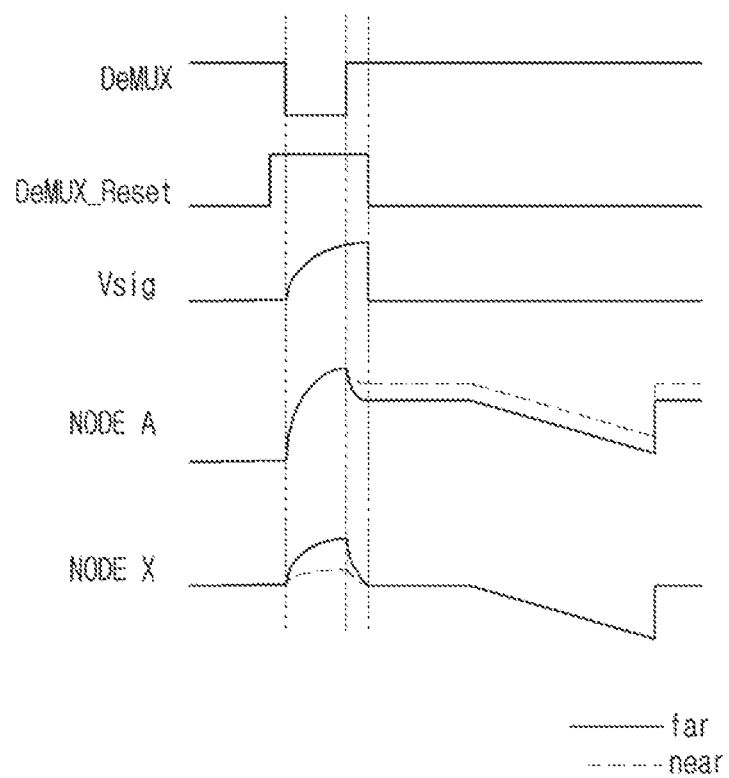
FIG. 15B is a diagram for describing the luminance non-uniformity and horizontal crosstalk phenomenon that may occur due to the sweep load in the sub-pixel circuit to which the external compensation method is applied.

FIGS. 15A and 15B are diagrams for describing the luminance non-uniformity and horizontal crosstalk that may occur due to the sweep load in the sub-pixel circuit to which the external compensation method for the deviation in the electrical characteristics of the driving transistor is applied.

As described above, in one or more embodiments of the present disclosure, the light-emitting period sequentially proceeds in the row line order of the display panel 100. Therefore, it is not possible to collectively apply the emission signal to the display panel 100 through the global signal, and the emission driver circuits for providing the emission signals corresponding to each row line are required for each row line.

In particular, the sweep signal Sweep(n) for the PWM driving of the display panel 100 is also sequentially provided to the display panel 100 in the row line order through the emission driver circuits corresponding to each row line. (Hereinafter, the emission driver circuit for providing the sweep signal Sweep(n) is referred to as a sweep driver circuit.)

In this case, in the process of setting the PWM data voltage to the gate terminal of the second driving transistor T3, that is, the node A, the change in voltage of the node A is coupled through the capacitor C1 to change the voltage of the sweep(n) signal line.

Thereafter, the change in voltage generated on the sweep (n) signal line is restored, and thus, the voltage set at the node A changes. In this case, the amount of change of the node A voltage varies according to the sweep load as will be described below, which is a cause of the occurrence of the luminance non-uniformity and horizontal crosstalk.

Specifically, FIG. 15A illustrates a configuration in which a sweep driver circuit 505 corresponding to one row line is connected to one sub-pixel circuit 110 through a wiring. In this case, FIG. 15A illustrates a case in which the transistor T1 is not present in the sub-pixel circuit 110 of FIG. 14A.

As illustrated in FIG. 15A, the sweep signal Sweep(n) is transmitted to the sub-pixel circuit 110 through the sweep driver circuit 505. In this case, there is a sweep wiring resistance, that is, an RC load, between the sweep driver circuit 505 and the sub-pixel circuit 110, and the magnitude of the sweep wiring resistance decreases as it is closer to the sweep driver circuit 505, and increases as it is far away from the sweep driver circuit 505.

FIG. 15B illustrates waveforms of various signals illustrated in FIG. 15A. In addition, far illustrated in FIG. 15B represents the changes in voltages of the node A and the X of the sub-pixel circuit 110 disposed relatively far away from the sweep driver circuit 505, respectively, and near illustrated in FIG. 8B represents the changes in voltages of the sub-pixel circuit 110 disposed relatively close to the sweep driver circuit 505, respectively.

When a low-level scan signal SP(n) is applied to the sub-pixel circuit 110 in the data setting period, the PWM data voltage applied from the data driver is applied to the node A through a Vsig wiring and the transistor T2. In this case, the PWM data voltage is the PWM data voltage corresponding to any one sub-pixel among the R, G, and B selected by the DeMUX circuit.

In this process, as illustrated in FIG. 15B, as the voltage of the node A changes, the change is coupled to the node X through the capacitor C1, so the voltage of the node X, that is, the voltage of the Sweep(n) signal line changes. Thereafter, the voltage (voltage of the node X) of the Sweep(n) signal line is restored to the original voltage level again by the operation of the sweep driver circuit 505). The change in voltage of the node X generated in this process is coupled through the capacitor C1 and reversely brings about a voltage change of node A.

In particular, in the case of the sub-pixel circuit 110 where the node X is located far away from the sweep driver circuit 505, the change in voltage of the node A increases due to the influence of the sweep load. Therefore, even if the same PWM data voltage is applied, the difference voltage is set in the sub-pixel circuit 110 according to the sweep load, which is a cause of the luminance non-uniformity. In addition, the problem of the luminance non-uniformity according to the sweep load is a cause of the occurrence of the horizontal crosstalk from the viewpoint of the entire display panel 100.

The problems of the luminance non-uniformity and horizontal crosstalk described above are caused by the fact that the voltage of the node X changes together when the PWM data voltage is applied to the node A. The problems may be solved by preventing the voltage of the node X from changing even if the PWM data voltage is applied to the node A during the data setting period.

Figure 15C:
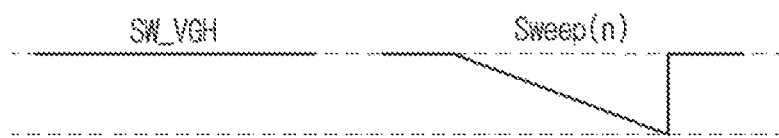
FIG. 15C is a diagram illustrating the high voltage (SW_VGH) of the sweep signal according to the embodiment of the present disclosure.

According to the embodiment of the present disclosure, while the PWM data voltage is set at the node A, the high voltage SW_VGH of the sweep signal as illustrated in FIG. 15C may be applied to the node X. In this case, the high voltage SW_VGH of the sweep signal may be a global signal equally applied to all the sub-pixel circuits 110 of the display panel 100 from the power IC.

More specifically, in FIG. 14A, the PWM circuit 112 includes the transistor T1 having a source terminal connected to the SW_VGH signal line, a gate terminal connected to the SP(n) signal line, and a drain terminal connected to the node X. In this case, the source terminal of the transistor T1 may be directly connected to a wiring to which the high voltage SW_VGH of the sweep signal is applied from the power IC.

Therefore, while the low voltage is applied through the SP(n) signal line to set the PWM data voltage to the node A, the high voltage SW_VGH of the sweep signal applied through the turned-on transistor T1 is forcibly applied to node X, the voltage of the node X may be maintained at the high voltage SW_VGH of the sweep signal regardless of the change in voltage of the node A. Through such an operation, it is possible to prevent or minimize the luminance non-uniformity and the horizontal crosstalk phenomenon that may occur due to the sweep rod.

Hereinafter, one or more embodiments of the present disclosure will be described with reference to FIGS. 16A to 18B. In this case, since the embodiments illustrated in FIGS. 16A to 18B are similar in the configuration and operating principle to those described above with reference to FIGS. 14A to 15B, redundant descriptions thereof will be omitted and differences therebetween will be mainly described.

Figure 16A:
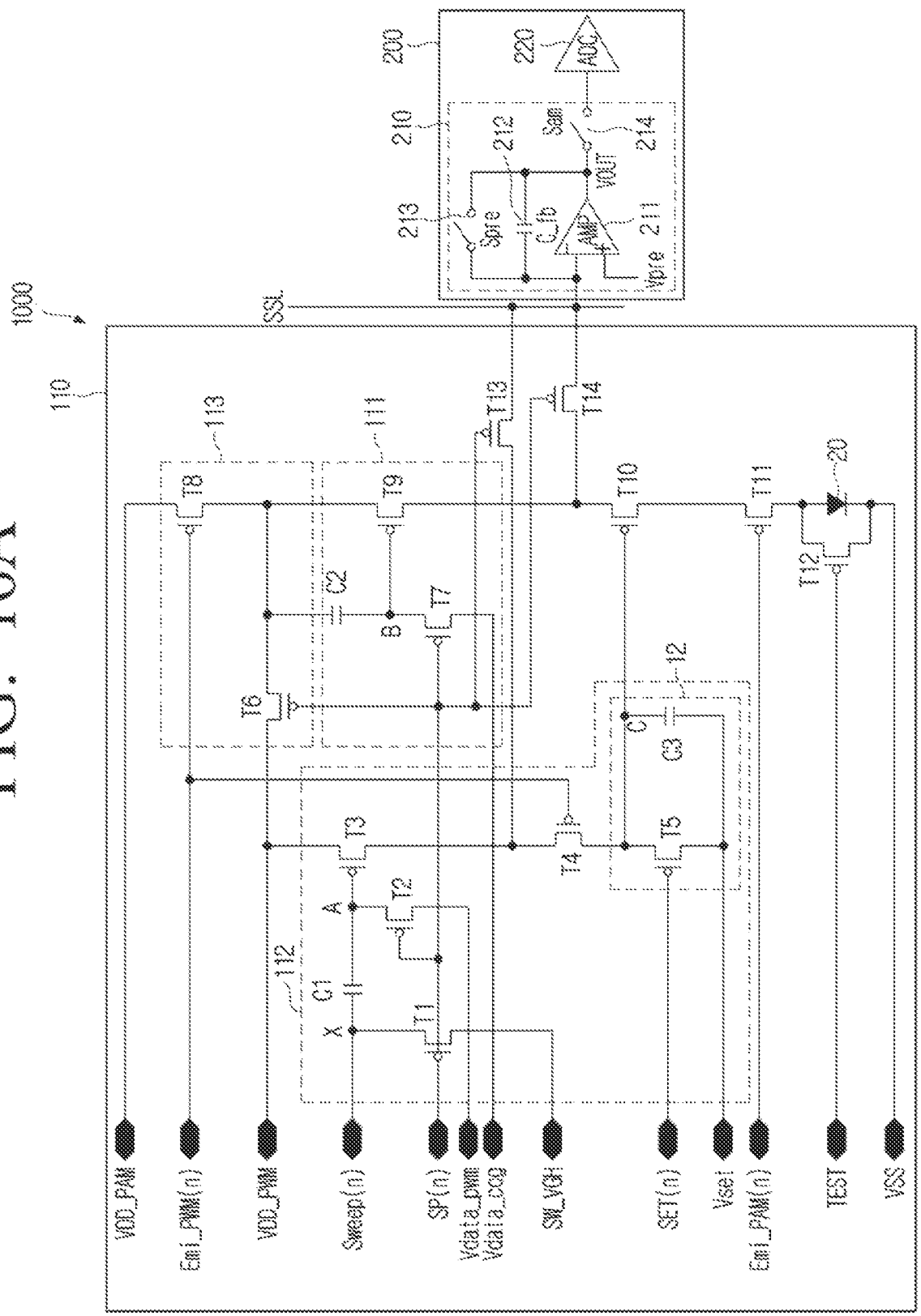
FIG. 16A is a detailed circuit diagram of a sub-pixel circuit and a sensing unit according to another embodiment of the present disclosure.
Figure 16B:
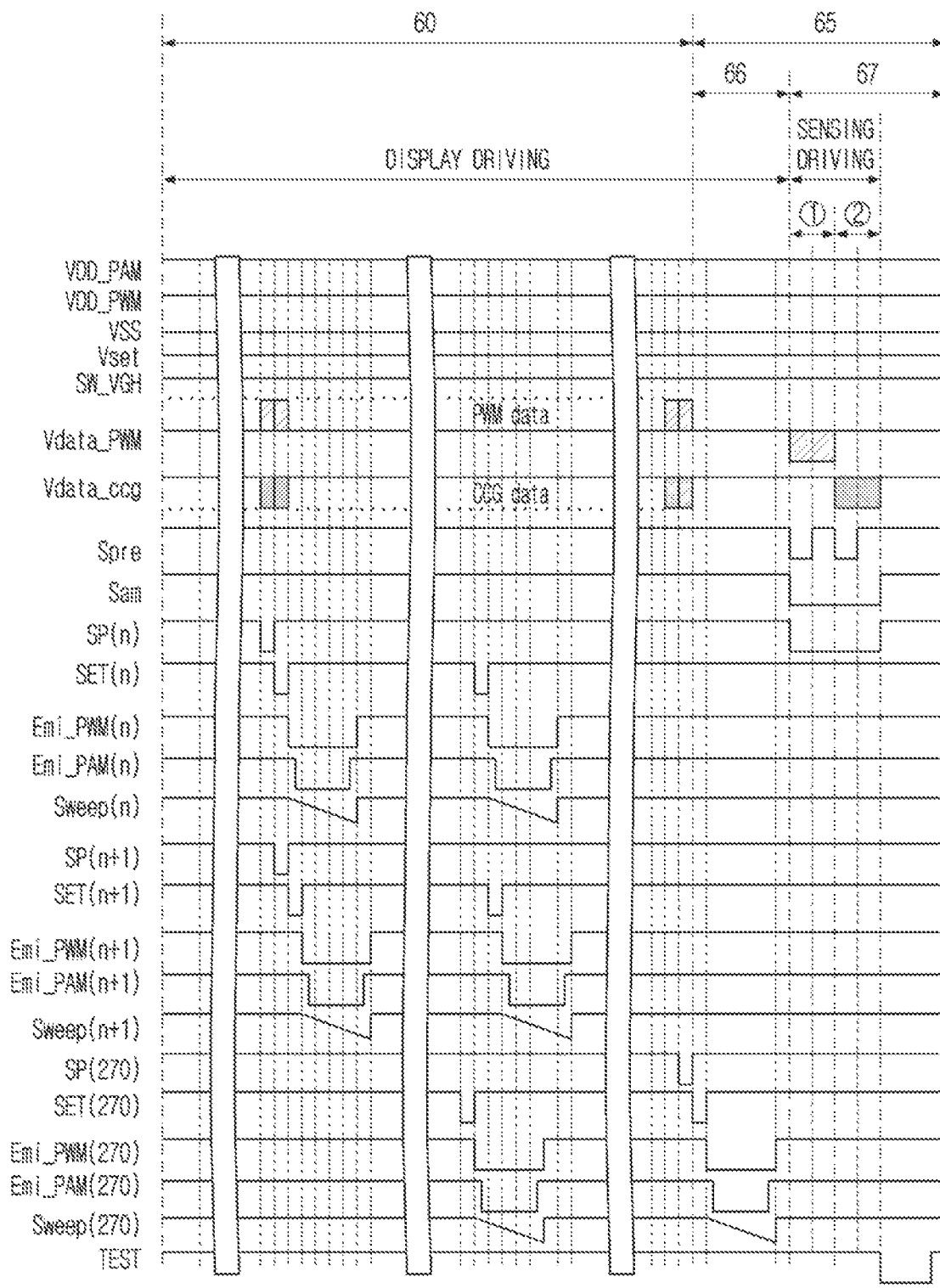
FIG. 16B is a driving timing diagram of the sub-pixel circuit illustrated in FIG. 16A.

FIG. 16A is a detailed circuit diagram of the sub-pixel circuit 110 and the sensing unit 200 according to another embodiment of the present disclosure, and FIG. 16B is a driving timing diagram of the sub-pixel circuit 110 illustrated in FIG. 16A.

The sub-pixel circuit 110 illustrated in FIG. 16A differs from FIG. 14A only in that it uses the scan signal SP(n) without using separate control signals (PWM_Sen(n) and CCG_Sen(n) in FIG. 14A) to control the turn on/off of the transistors T13 and T14, and the rest is the same as the sub-pixel circuit 110 illustrated in FIG. 14A. The drive timing illustrated in FIG. 14B is also the same as the drive timing diagram of FIG. 14B except that the control signals PWM_Sen(n) and CCG_Sen(n) are not present.

In FIGS. 16A and 16B, as the low-level scan signal SP(n) is applied in the data setting period, the transistors T1, T2, T6, T7, T13, and T14 are turned on together. However, in this case, the flow of current to the sensing unit 200 may be prevented by turning off a switch inside the amplifier 211. Therefore, the sensing driving operation is not performed in the data setting period, and only the data setting operation is performed.

The switch inside the above-described amplifier 211 may be turned on in the sensing driving period. Therefore, in the sensing driving period, the first current and the second current described above flow in the sensing unit 200, and thus, the above-described sensing driving may be performed.

In this case, the second specific voltage is applied to the gate terminal of the second driving transistor T3 during the sensing period ① of the PWM circuit 112, the first specific voltage is applied to the gate terminal of the first driving transistor T9 during the sensing period ② of the constant current source circuit 111, and the time when the second specific voltage is applied and the time when the first specific voltage is applied do not overlap each other. Accordingly, the sensing driving operation described with reference to FIGS. 14A and 14B may be performed in the same manner even without using the separate control signals PWM_Sen(n) and CCG_Sen(n).

In addition, the rest of the contents related to the display driving, the sensing driving, the prevention of the luminance non-uniformity and horizontal crosstalk phenomenon due to the sweep load, etc., of the sub-pixel circuit 110 may be fully understood through the above description in FIGS. 14A to 15C, and therefore, redundant descriptions thereof will be omitted.

Figure 17A:
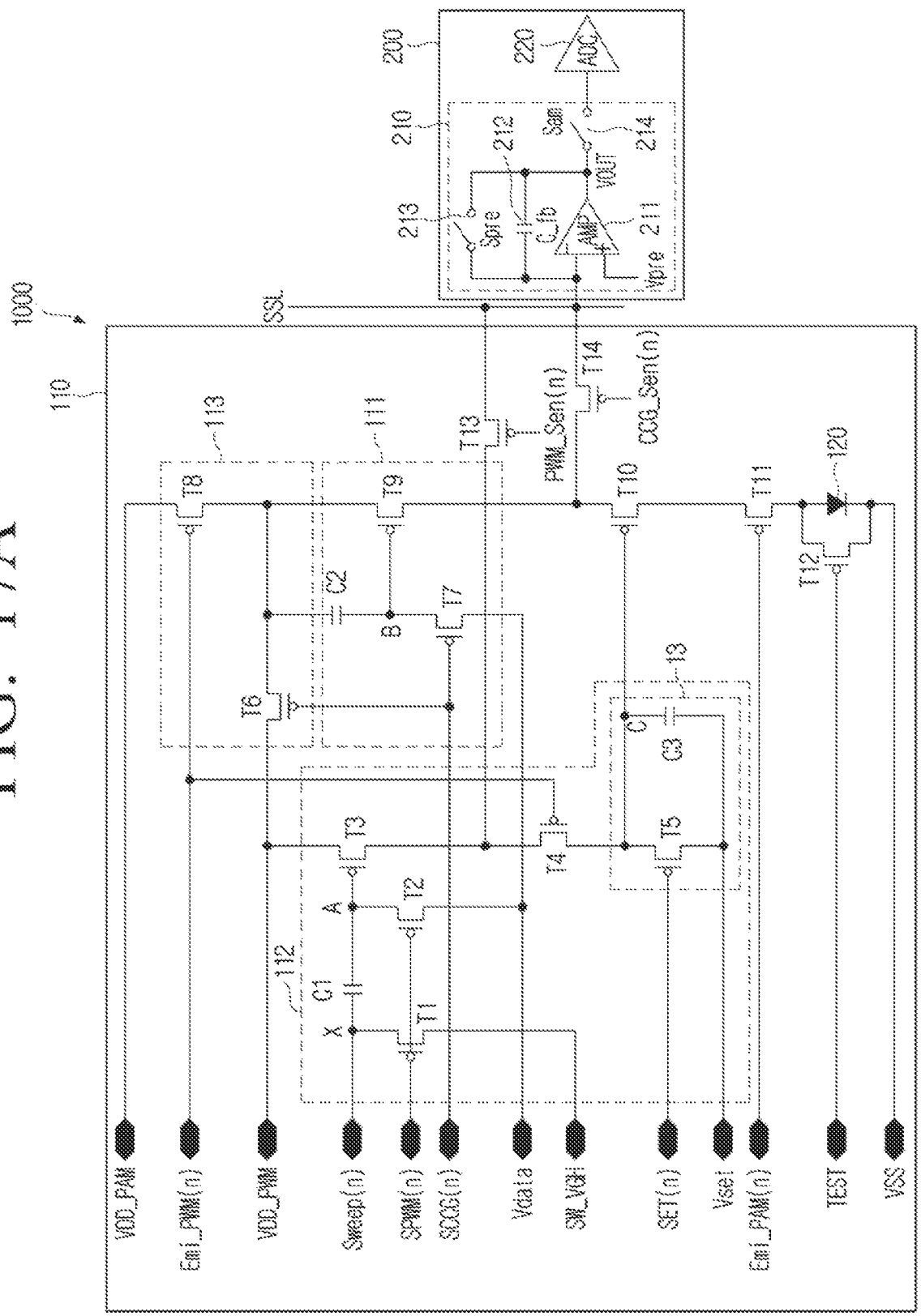
FIG. 17A is a detailed circuit diagram of a sub-pixel circuit and a sensing unit according to another embodiment of the present disclosure.
Figure 17B:
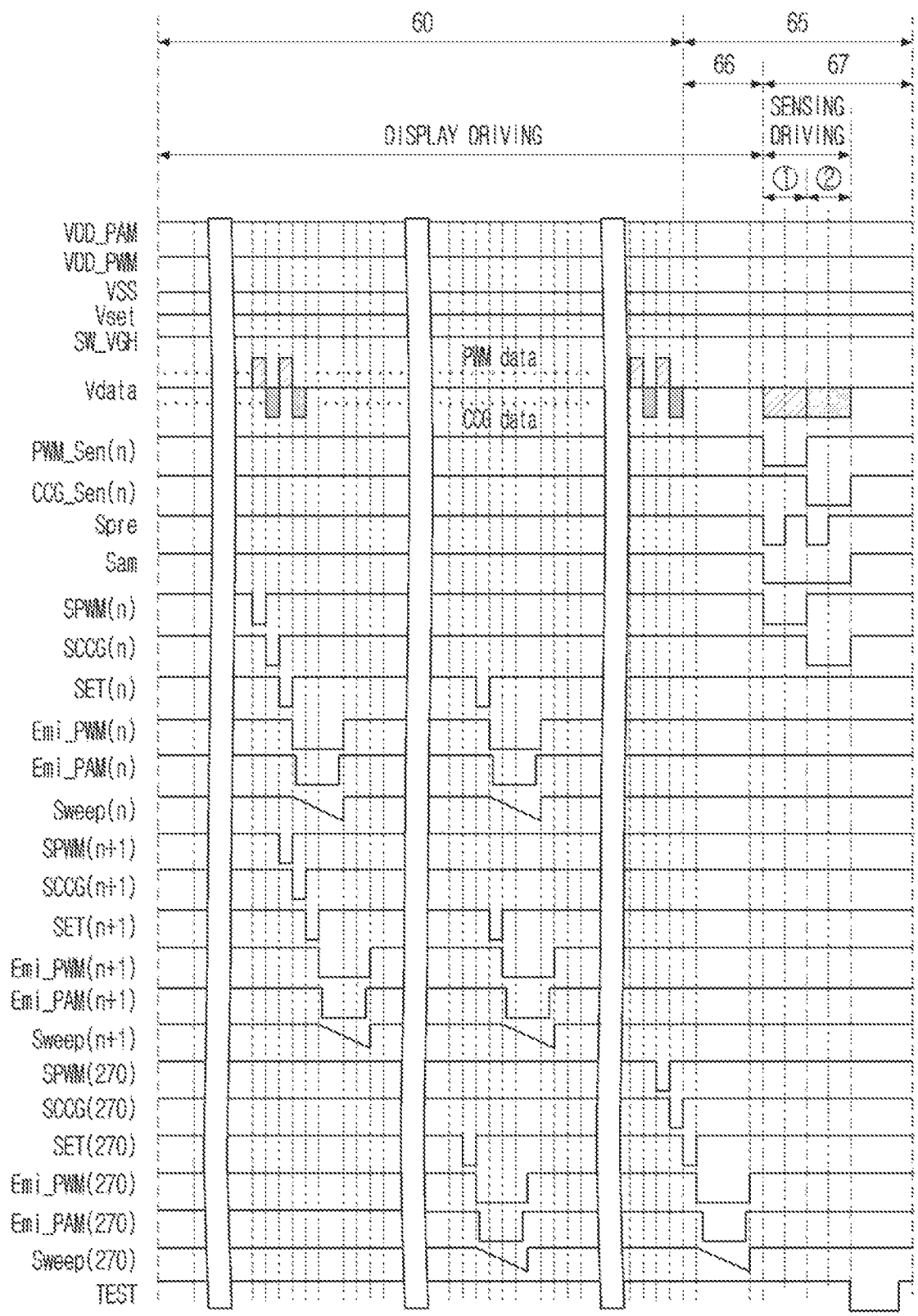
FIG. 17B is a driving timing diagram of the sub-pixel circuit illustrated in FIG. 17A.

FIG. 17A is a detailed circuit diagram of the sub-pixel circuit 110 and the sensing unit 200 according to another embodiment of the present disclosure, and FIG. 17B is a driving timing diagram of the sub-pixel circuit 110 illustrated in FIG. 17A.

The sub-pixel circuit 110 illustrated in FIG. 17A is the same as the sub-pixel circuit 110 illustrated in FIG. 14A except that the image data voltage and the specific voltage are applied through one data signal line Vdata.

In this case, the PWM data voltage and the constant current generator data voltage from one data driver are time-divided and applied to the sub-pixel circuit 110 through the data signal line Vdata during the data setting period. In addition, the second specific voltage and the first specific voltage from the one data driver are time-divided and applied to the sub-pixel circuit 110 through the data signal line Vdata during the sensing driving period.

Therefore, in order to apply the PWM data voltage and the constant current generator data voltage, which are time-divided and applied during the data setting period, to the node A and the node B, respectively, and apply the second specific voltage and the first specific voltage, which are time-divided and applied during the sensing driving period, to the node A and the node B, respectively, two scan signals are required, and a scan signal SPWM(n) and a scan signal SCCG(n) in FIGS. 17A and 17B represent these two scan signals.

In FIGS. 17A and 17B, in the data setting period, when the low-level scan signal SPWM(n) is applied to the sub-pixel circuit 110, the PWM data voltage PWM data is applied to the node A through the turned-on transistor T2. In addition, when the low-level scan signal SCCG(n) is applied to the sub-pixel circuit 110, the constant current generator data voltage (CCG data) is applied to the node B through the turned-on transistor T7.

During the sensing period ① of the PWM circuit 112 in the sensing driving period, when the low-level scan signal SPWM(n) is applied to the sub-pixel circuit 110, the second specific voltage is input to the node A through the turned-on transistor T2. In addition, when the low-level scan signal SCCG(n) is applied to the sub-pixel circuit 110, the first specific voltage is applied to the node B through the turned-on transistor T7.

In FIG. 17B, it is exemplified that the scan signals are applied in the order of the SPWM(n) and SCCG(n), but the present disclosure is not limited thereto. According to the embodiment, the SCCG(n) signal may be applied first and the SPWM(n) signal may be applied later.

In addition, the rest of the contents related to the display driving, the sensing driving, the prevention of the luminance non-uniformity and horizontal crosstalk phenomenon due to the sweep load, etc., of the sub-pixel circuit 110 may be fully understood through the above description in FIGS. 14A to 15C, and therefore, redundant descriptions thereof will be omitted.

Figure 18A:
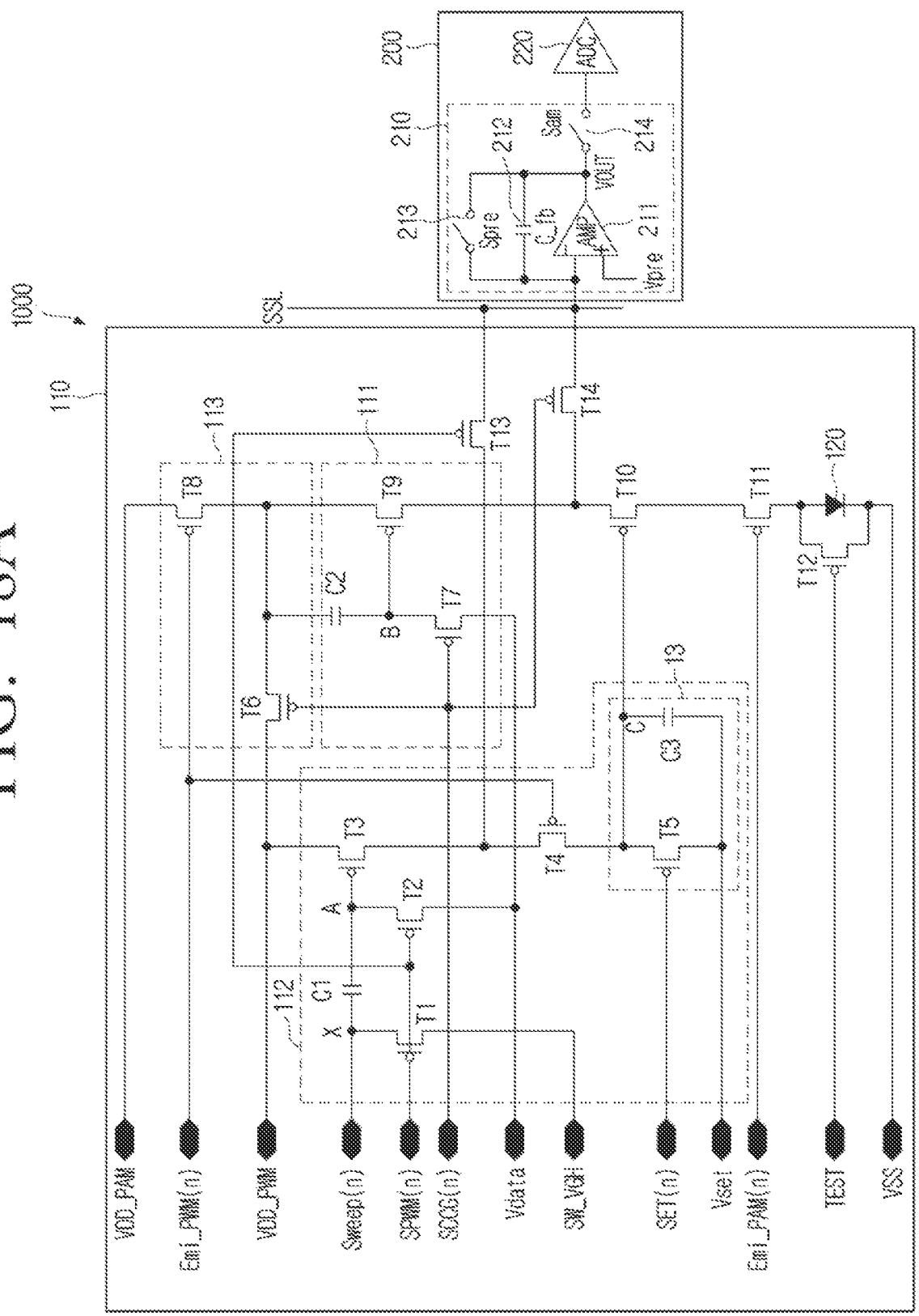
FIG. 18A is a detailed circuit diagram of a sub-pixel circuit and a sensing unit according to another embodiment of the present disclosure.
Figure 18B:
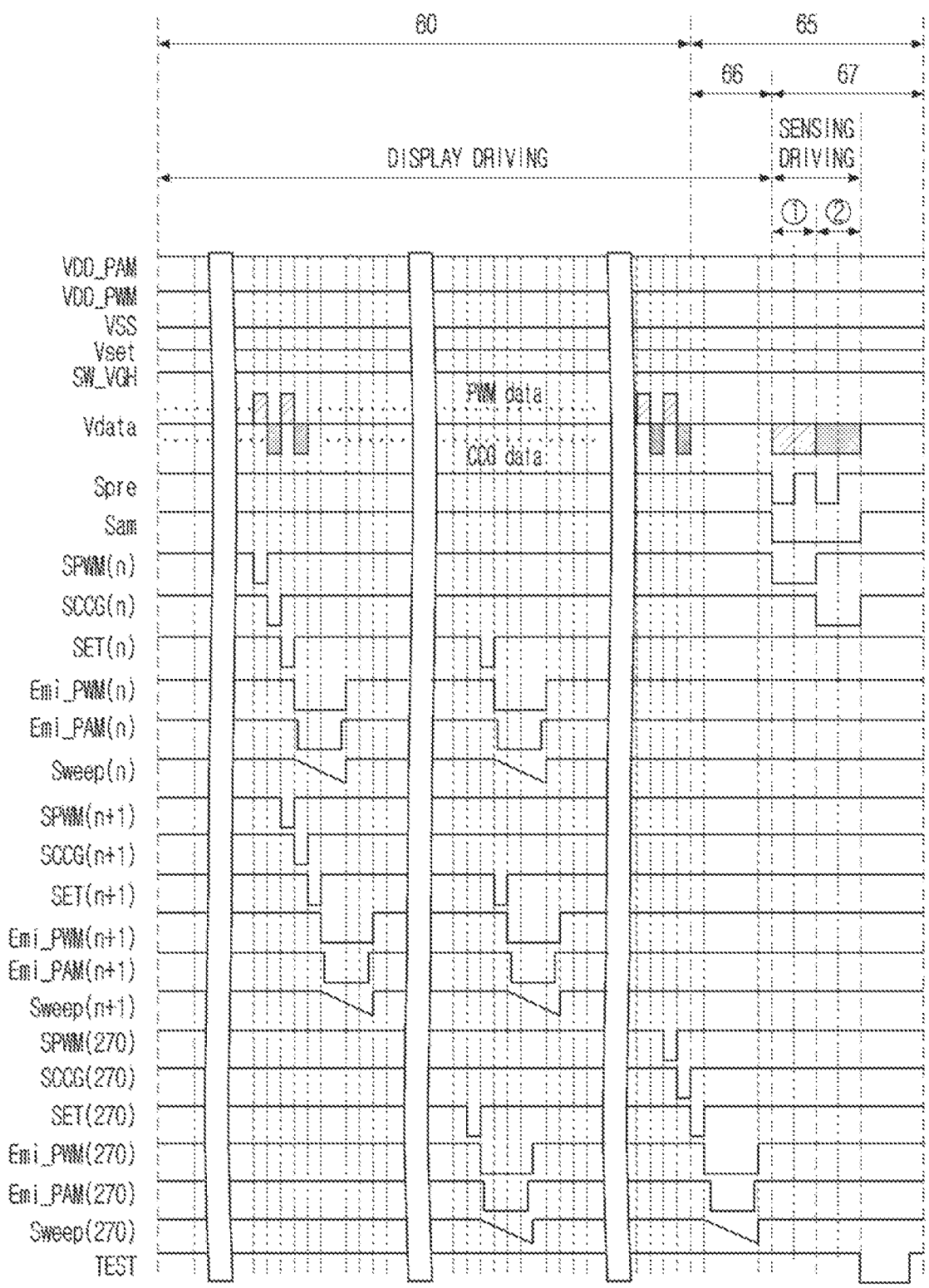
FIG. 18B is a driving timing diagram of the sub-pixel circuit illustrated in FIG. 18A.

FIG. 18A is a detailed circuit diagram of the sub-pixel circuit 110 and the sensing unit 200 according to another embodiment of the present disclosure, and FIG. 18B is a driving timing diagram of the sub-pixel circuit 110 illustrated in FIG. 18A.

The sub-pixel circuit 110 illustrated in FIG. 18A is similar to the sub-pixel circuit 110 of FIG. 17A in that the image data voltages (PWM data voltage and constant current generator data voltage) and the specific voltages (second specific voltage and first specific voltage) are applied through one data signal line Vdata.

Therefore, in FIGS. 18A and 18B, the image data voltage and the specific voltage are applied to the sub-pixel circuits 110 in the data setting period and the sensing driving period, respectively, using two scan signals (or scan signal lines) such as SPWM(n) and SCCG(n).

The sub-pixel circuit 110 illustrated in FIG. 18A is similar to the embodiment of FIG. 16A in that it uses the scan signal without using the separate control signals (PWM_Sen(n) and CCG_Sen(n) in FIG. 14A or 17A) to control the turn on/off of transistors T13 and T14.

In the case of the embodiment of FIG. 18A, since two scan signals such as SPWM(n) and SCCG(n) are used, as illustrated, the gate terminal of the transistor T13 is connected to the scan signal SPWM(n), and the gate terminal of the transistor T14 is connected to the scan signal SCCG(n).

Even in the case of the embodiments of FIGS. 18A and 18B, by turning off the switch inside the amplifier 211 in the data setting period and turning on the switch inside the amplifier 211 in the sensing driving period, the fact that a current may flow in the sensing unit 200 only in the sensing driving period is as described above with reference to FIGS. 16A and 16B.

In addition, the rest of the contents related to the display driving, the sensing driving, the prevention of the luminance non-uniformity and horizontal crosstalk phenomenon due to the sweep load, etc., of the sub-pixel circuit 110 may be fully understood through the above description in FIGS. 14A to 15C, and therefore, redundant descriptions thereof will be omitted. As another embodiment for solving the problems of the luminance non-uniformity and horizontal crosstalk described with reference to FIGS. 15A and 15B, a method of connecting a low voltage SW_VGL input of a sweep signal to node X may be considered.

Figure 19A:
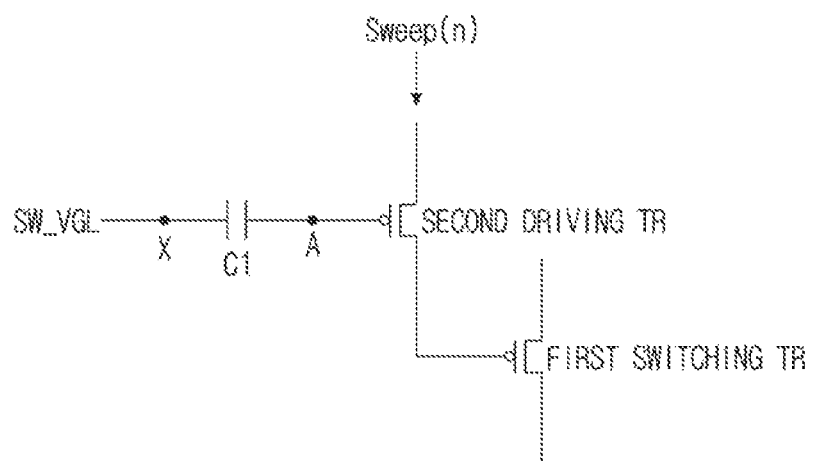
FIG. 19A is a diagram for describing the embodiment of connecting the low voltage (SW_VGL) input of the sweep signal to an X node.
Figure 19B:
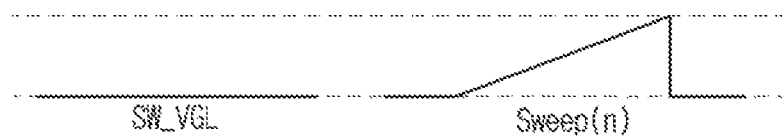
FIG. 19B is a diagram for describing the embodiment of connecting the low voltage (SW_VGL) input of the sweep signal to the X node.

FIGS. 19A and 19B are diagrams for describing the embodiment in which the low voltage SW_VGL input of the sweep signal is connected to the X node. According to the embodiment of the present disclosure, as illustrated in FIG. 19A, the low voltage SW_VGL of the sweep signal may be applied to the node X. In this case, the low voltage SW_VGL of the sweep signal may be a global signal equally applied to all the sub-pixel circuits 110 of the display panel 100 from the power IC.

Specifically, the node X may be directly connected to the power IC through a wiring to which the low voltage SW_VGL of the sweep signal is applied. Therefore, even if the voltage of the node A changes due to the application of the PWM data voltage, the voltage of the node X may be maintained at the low voltage SW_VGL of the sweep signal without being affected by the coupling through the capacitor C1.

As illustrated in FIG. 19A, the sweep signal Sweep(n) for the PWM driving may be applied to the source terminal of the second driving transistor. In this case, as illustrated in FIG. 19B, the sweep signal Sweep(n) may be a voltage signal that linearly increases from the low voltage to the high voltage.

As described above, the PWM circuit controls the turn-on/off operation of the first switching transistor through the turn-on/off operation of the second driving transistor to control the time when the driving current flows in the inorganic light-emitting element 120, which goes the same for the embodiment of FIG. 19A.

Specifically, when the voltage of the source terminal of the second driving transistor increases according to the sweep signal Sweep(n) in the state where the PWM data voltage is set to the node A, the difference in the voltage between the gate terminal and the source terminal of the second driving transistor decreases.

When the decreasing difference in voltage between the gate terminal and the source terminal of the second driving transistor reaches the threshold voltage of the second driving transistor, the second driving transistor is turned on and the first switching transistor is turned off. This PWM drive mechanism is the same as the above-described embodiment (embodiment in which the sweep signal Sweep(n) is applied to the node X).

According to the embodiment described above, the above-described problems of the luminance non-uniformity and horizontal crosstalk due to the sweep rod may be solved. In addition, there is no problem in the PWM driving of the display panel 100 even if the sweep signal is applied to the source terminal of the second driving transistor.

Figure 20A:
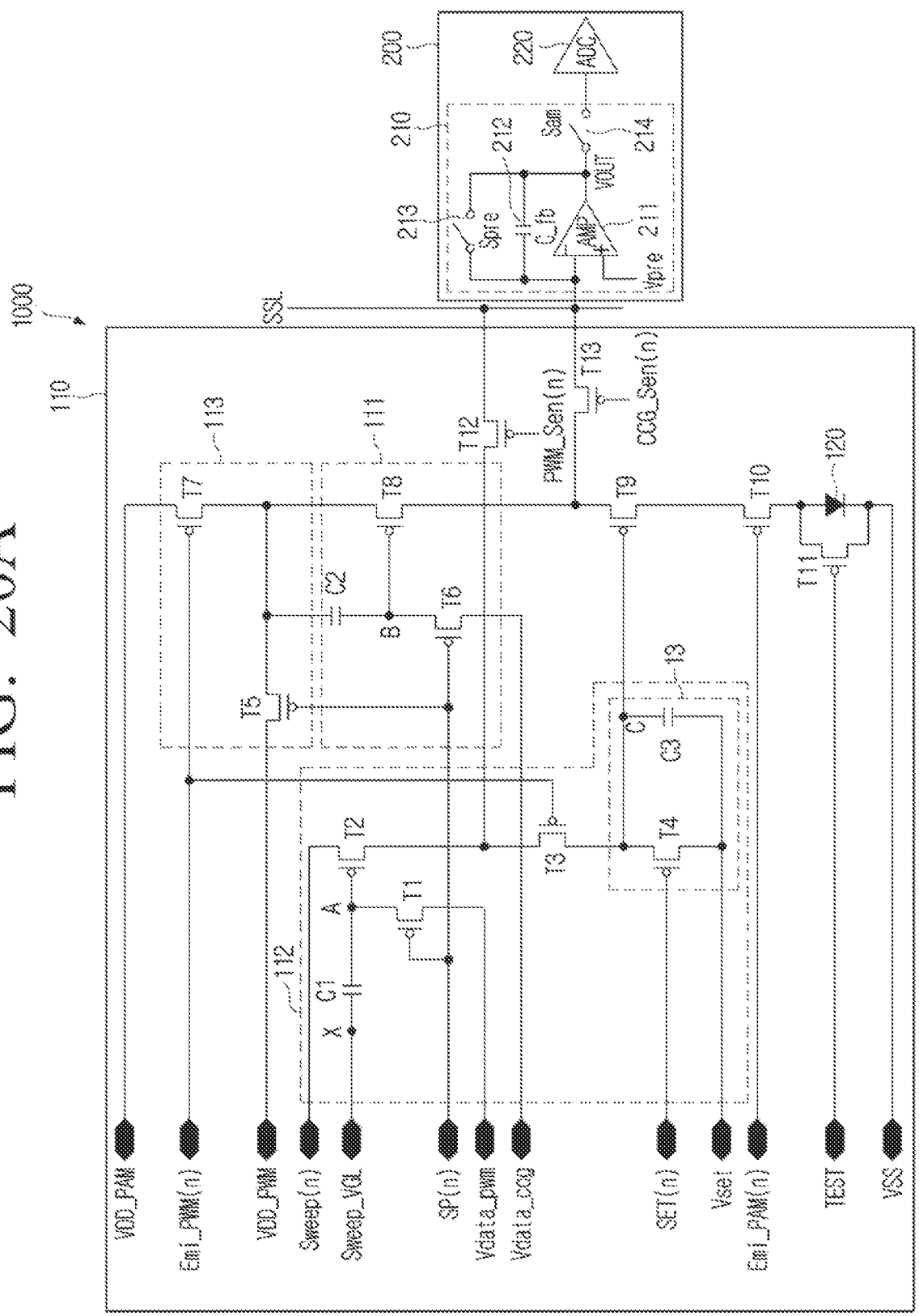
FIG. 20A is a detailed circuit diagram of the sub-pixel circuit and the sensing unit according to the embodiment of the present disclosure.
Figure 20B:
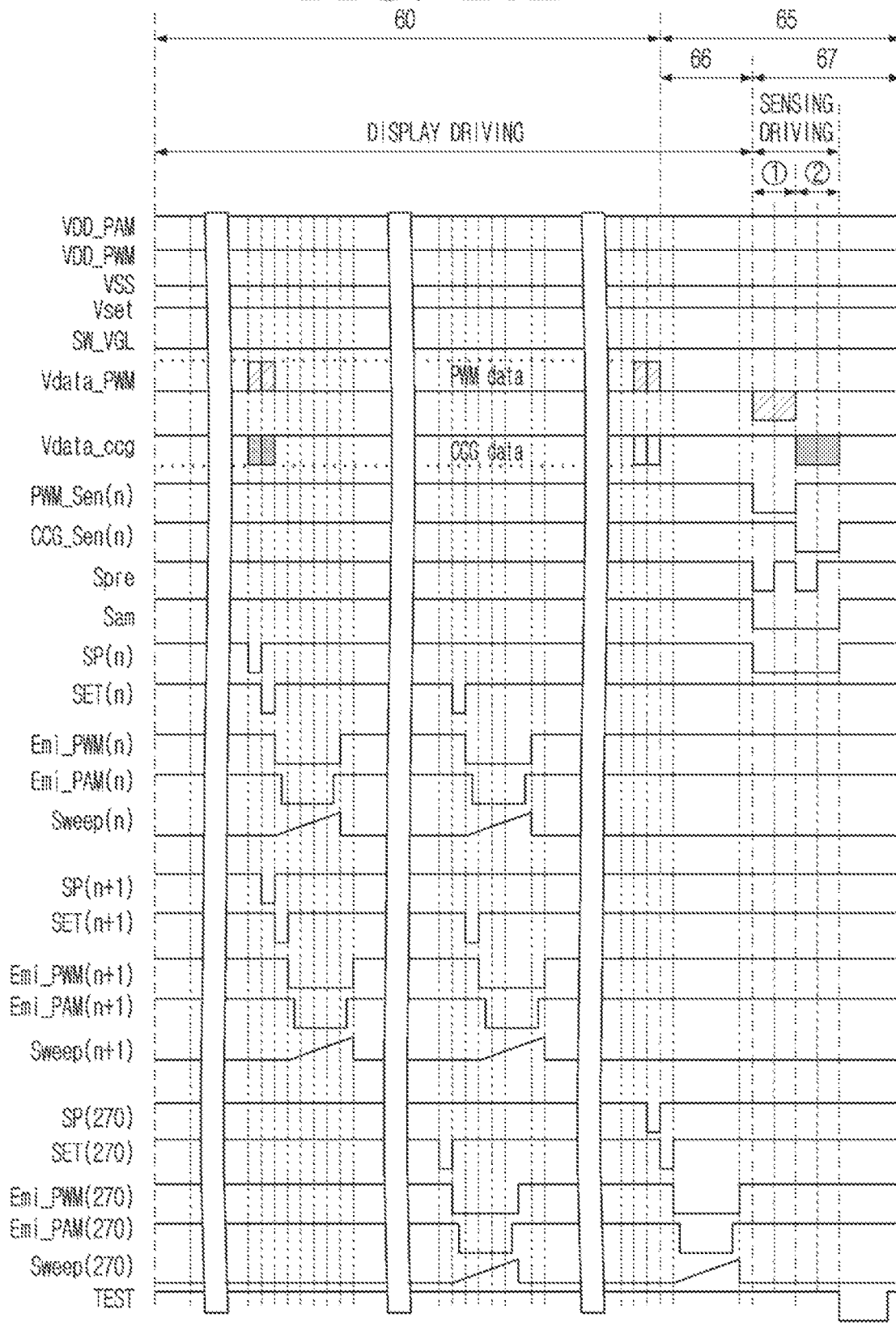
FIG. 20B is timing diagrams of various signals for driving the display panel including the sub-pixel circuit of FIG. 20A during one image frame interval.

FIG. 20A is a detailed circuit diagram of the sub-pixel circuit 110 and the sensing unit 200 according to the embodiment of the present disclosure to which the embodiment described above with reference to FIGS. 19A and 19B is applied, and FIG. 20B is a timing diagram of various signals for driving the display panel 100 including the sub-pixel circuit 110 of FIG. 20A during one image frame interval.

Since the embodiments illustrated in FIGS. 20A and 20B are similar in the configuration and operating principle to those described above with reference to FIGS. 14A and 14B, redundant descriptions thereof will be omitted and differences therebetween will be mainly described.

In the sub-pixel circuit 110 of FIG. 20A, the SW_VGL signal line is directly connected to the node X. Therefore, unlike the sub-pixel circuit 110 of FIG. 14A, the transistor T1 for applying the SW_VGH signal to the node X during the data setting period is not required.

In FIG. 20A, there is no transistor at a position corresponding to the transistor T1 of FIG. 14A. Accordingly, when the reference numbers of the transistors in FIGS. 20A and 14A are compared, the reference numbers of the transistors at the same position are shown so that FIG. 20A precedes FIG. 14A by one.

In the sub-pixel circuit 110 of FIG. 14A, as illustrated in FIG. 14B, the sweep voltage that linearly decreases from the high voltage SW_VGH of the sweep signal to the low voltage of the sweep signal is applied to the node X in the light-emitting period.

However, in the sub-pixel circuit 110 of FIG. 20A, as illustrated in FIG. 20B, the sweep voltage that linearly increases from the low voltage SW_VGL of the sweep signal to the high voltage of the sweep signal is applied to the source terminal of the second driving transistor T2 in the light-emitting period.

The operation of the PWM circuit 112 according to the sweep signal Sweep(n) in the embodiment of FIG. 20A will be described in detail by way of example.

For example, in a state in which a voltage (specifically, the PWM data voltage (+14[V])+the threshold voltage (−1[V]) of the second driving transistor T2) of +13[V] is set to the node A during the data setting period, when the sweep signal (e.g., voltage that linearly increases from +10[V] to +15[V]) is applied to the source terminal of the second driving transistor T2, the difference in the voltage between the gate terminal and the source terminal of the second driving transistor T2 decreases from +3[V] to −2[V].

In this case, when difference in the voltage between the gate terminal and the source terminal of the second driving transistor T2, which has decreased from +3[V], reaches the threshold voltage (−1[V]) of the second driving transistor T2, the second driving transistor T2 is turned on, and +14[V], which is a sweep voltage when the second driving transistor T2 is turned on, is applied to the first switching transistor T9, so the first switching transistor T9 is turned off.

The operating mechanism of the PWM circuit 112 of FIG. 20A is the same as the operating mechanism of the PWM circuit 112 described in FIGS. 7A to 7D except for the form of the sweep signal and the terminal to which the sweep signal is input.

Since the rest of the contents related to the configuration and operation of the sub-pixel circuit 110 illustrated in FIGS. 20A and 20B may be fully understood through the above-described information in FIGS. 14A and 14B, redundant descriptions thereof will be omitted.

FIGS. 21A to 23B illustrate other embodiments of the present disclosure to which the embodiment described with reference to FIGS. 19A and 19B is applied. Since the embodiments illustrated in FIGS. 21A to 23B are similar to the configuration and operation principle to those described above with reference to FIGS. 20A and 20B, duplicate descriptions thereof will be omitted.

Figure 21A:
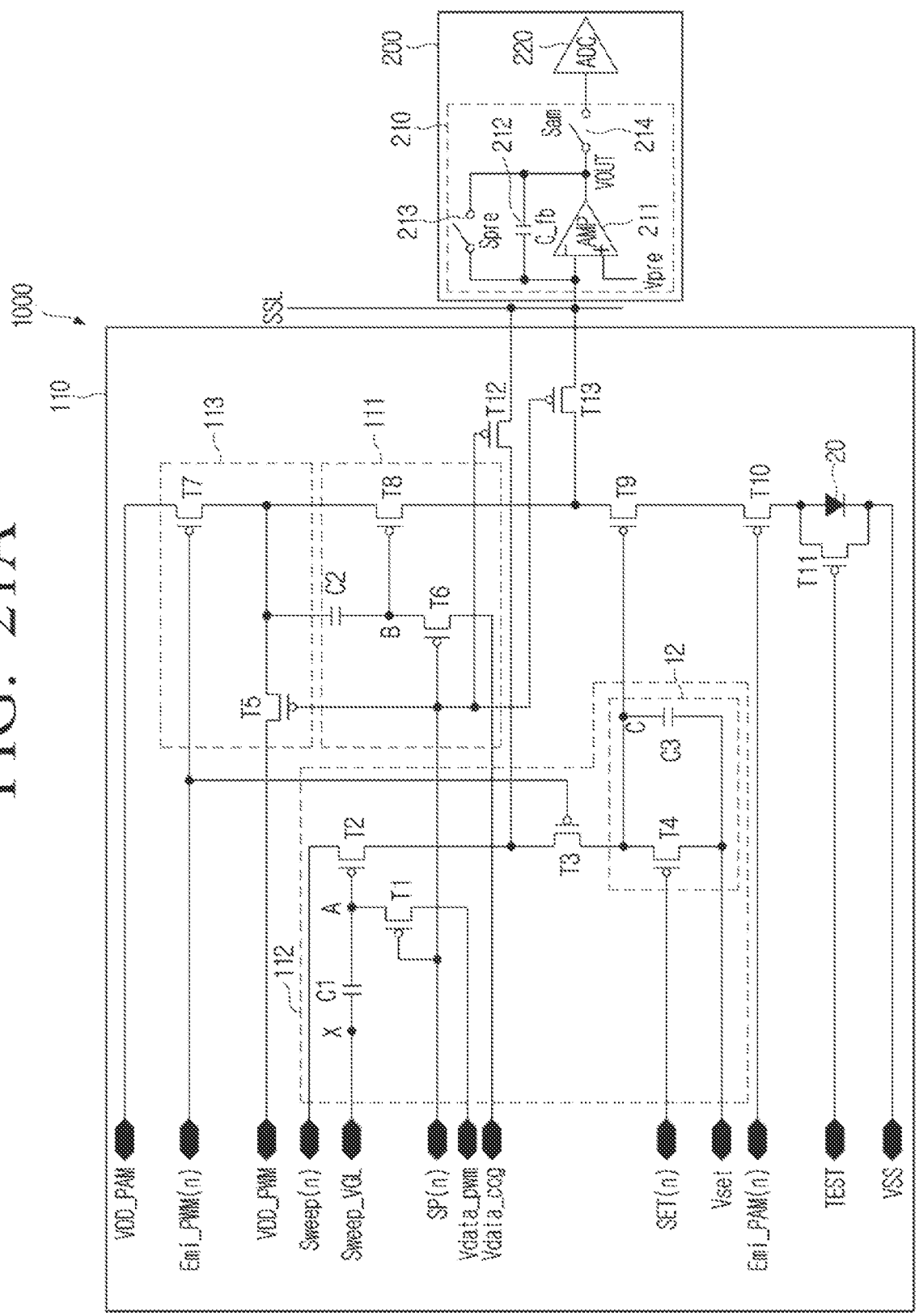
FIG. 21A is a detailed circuit diagram of a sub-pixel circuit and a sensing unit according to another embodiment of the present disclosure.
Figure 21B:
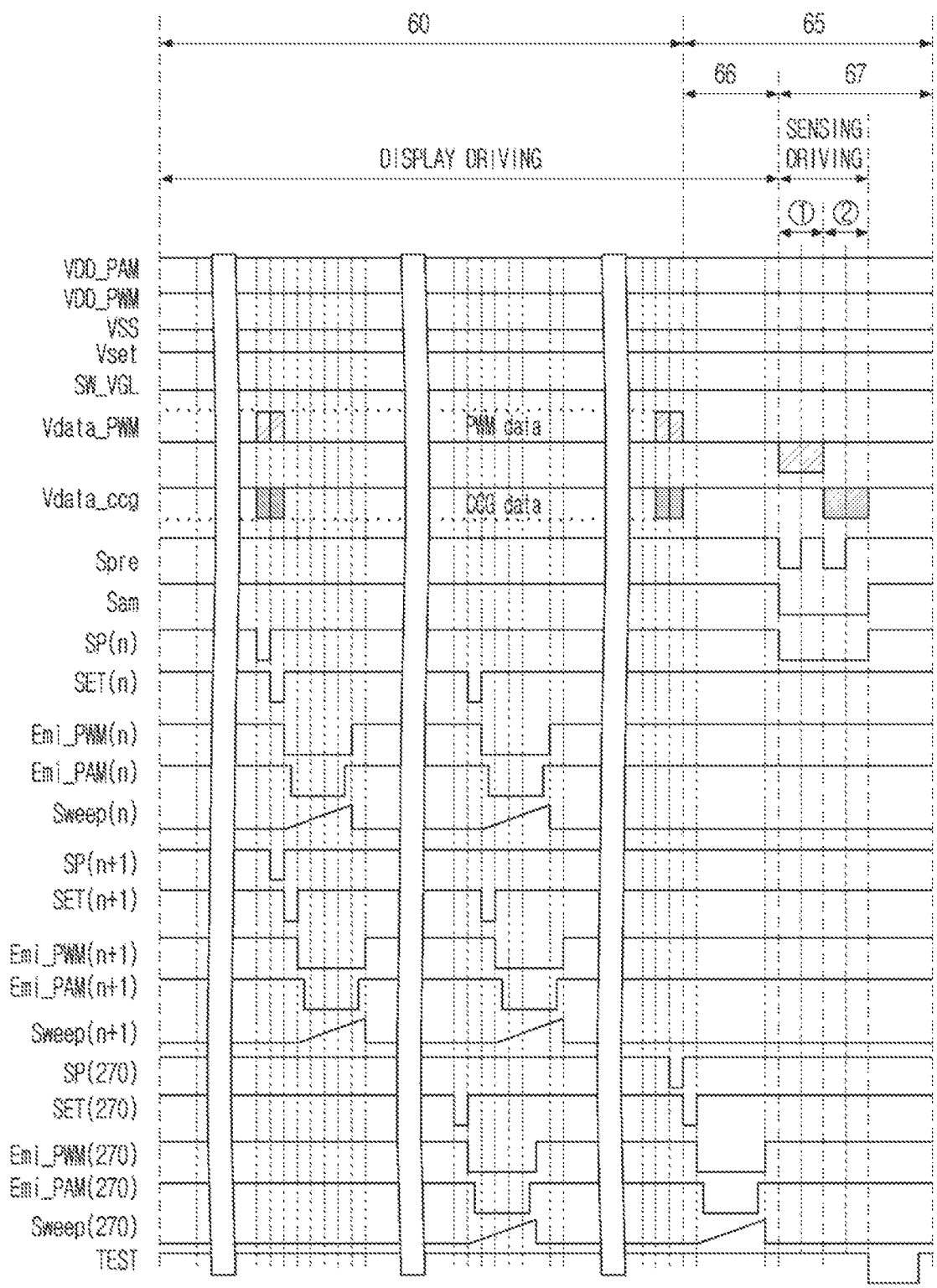
FIG. 21B is timing diagrams of various signals for driving the sub-pixel circuit of FIG. 21A.

FIG. 21A is a detailed circuit diagram of the sub-pixel circuit 110 and the sensing unit 200 according to another embodiment of the present disclosure, and FIG. 21B is a driving timing diagram of various signals for driving the sub-pixel circuit 110 illustrated in FIG. 21A.

The sub-pixel circuit 110 illustrated in FIG. 21A differs from FIG. 20A only in that it uses the scan signal SP(n) without using separate control signals (PWM_Sen(n) and CCG_Sen(n) in FIG. 20A) to control the turn on/off of the transistors T12 and T13, and the rest is the same as the sub-pixel circuit 110 illustrated in FIG. 20A. The drive timing illustrated in FIG. 20B is also the same as the drive timing diagram of FIG. 20B except that the control signals PWM_Sen(n) and CCG_Sen(n) are not present.

In FIGS. 21A and 21B, as the low-level scan signal SP(n) is applied in the data setting period, the transistors T1, T5, T6, T12, and T13 are turned on together. However, in this case, the flow of current to the sensing unit 200 may be prevented by turning off a switch inside the amplifier 211. Therefore, the sensing driving operation is not performed in the data setting period, and only the data setting operation is performed.

The switch inside the amplifier 211 may be turned on in the sensing driving period. Therefore, in the sensing driving period, the first current and the second current described above flow in the sensing unit 200, and thus, the above-described sensing driving may be performed.

In this case, the second specific voltage is applied to the gate terminal of the second driving transistor T2 during the sensing period ① of the PWM circuit 112, the first specific voltage is applied to the gate terminal of the first driving transistor T8 during the sensing period ② of the constant current source circuit 111, and the time when the second specific voltage is applied and the time when the first specific voltage is applied do not overlap each other. Therefore, the sensing driving may be performed without problems even without using the separate control signals PWM_Sen(n) and CCG_Sen(n).

In addition, since the rest of the contents related to the display driving and sensing driving of the sub-pixel circuit 110 may be sufficiently understood through the above-described contents in FIGS. 14A and 14B, and the contents related to the prevention of the luminance non-uniformity and horizontal crosstalk, etc., due to the sweep rod may be sufficiently understood through the above-described contents of FIGS. 19A to 20B, redundant descriptions thereof will be described.

Figure 22A:
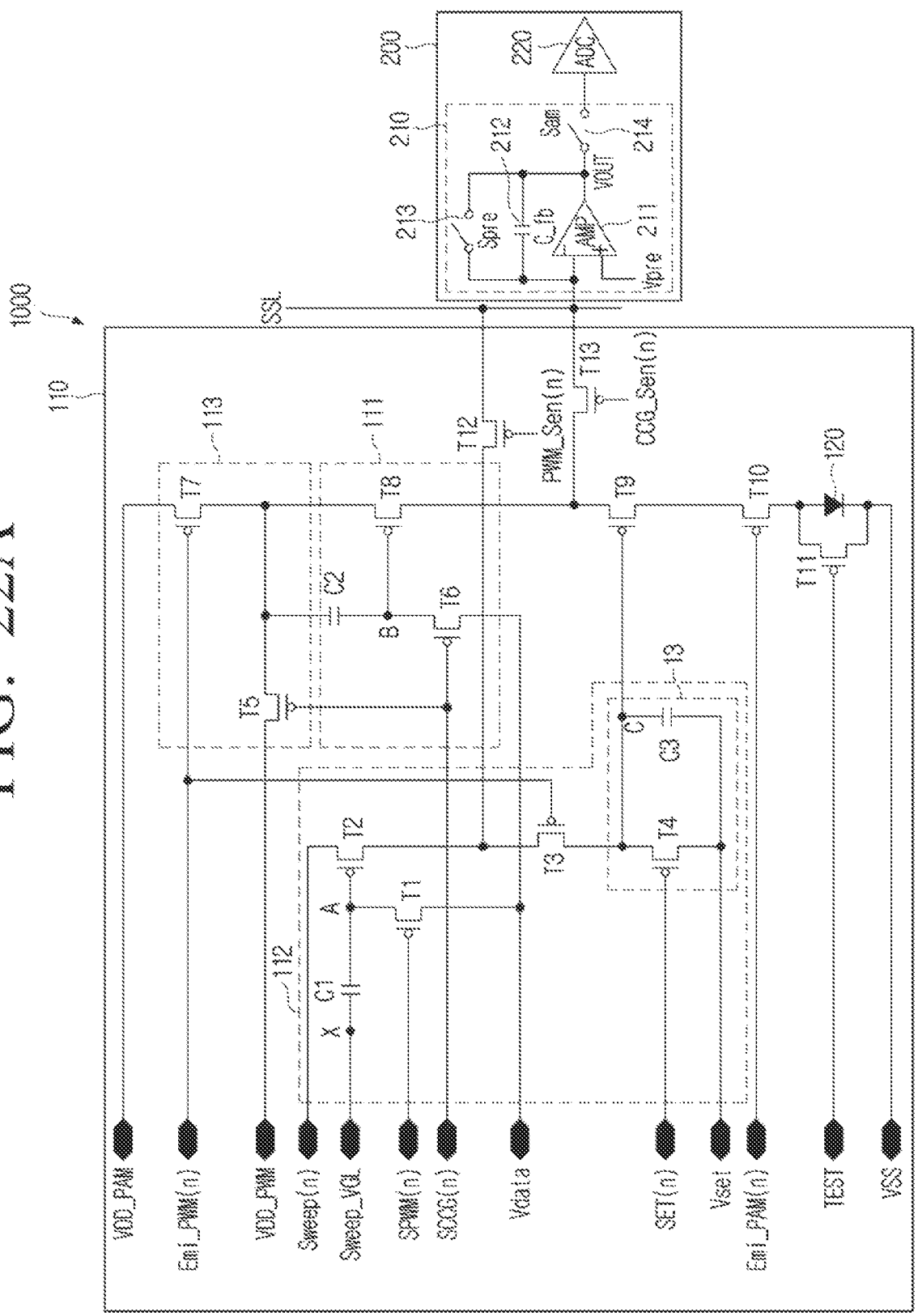
FIG. 22A is a detailed circuit diagram of a sub-pixel circuit and a sensing unit according to another embodiment of the present disclosure.
Figure 22B:
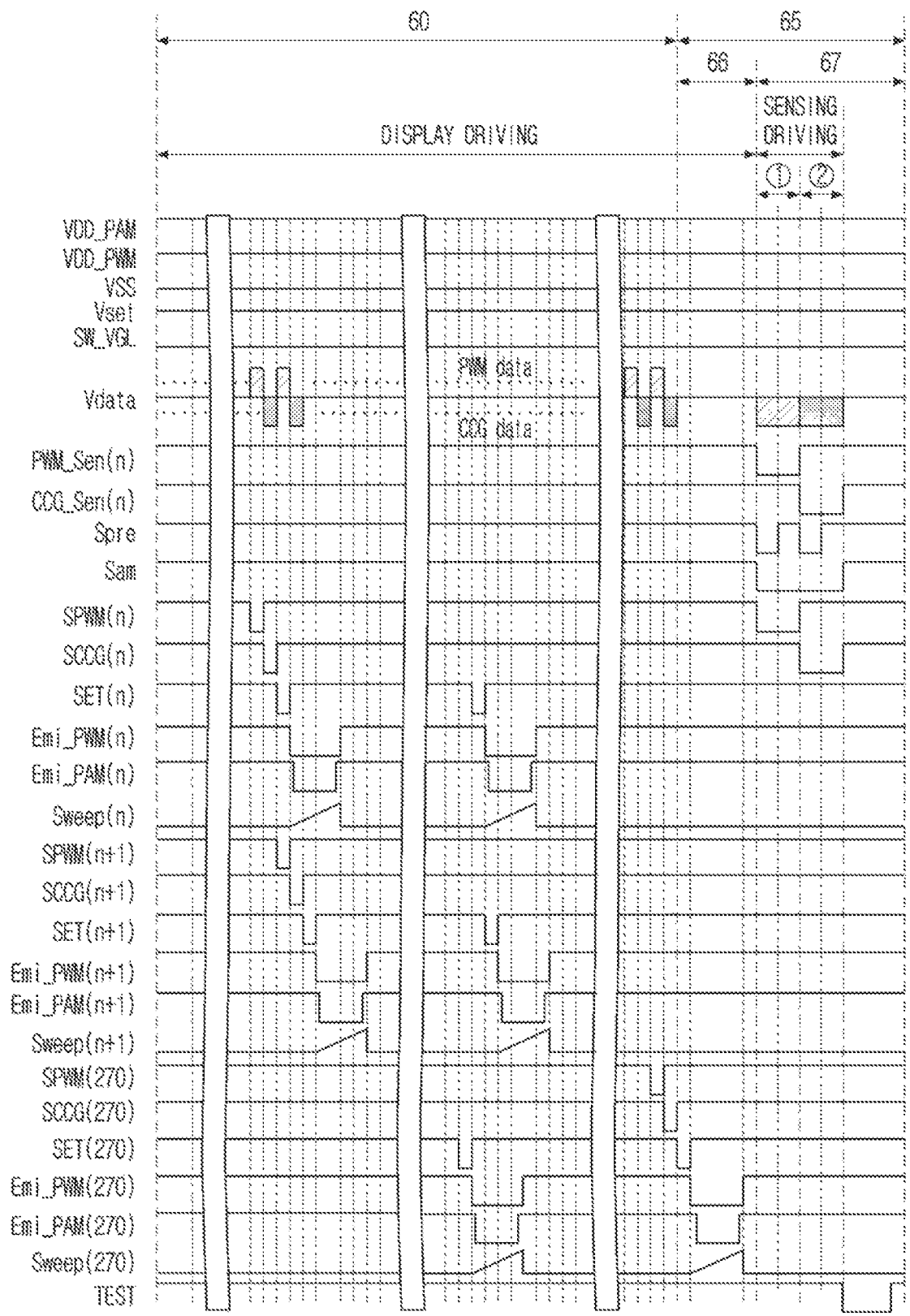
FIG. 22B is a driving timing diagram of the sub-pixel circuit illustrated in FIG. 22A.

FIG. 22A is a detailed circuit diagram of the sub-pixel circuit 110 and the sensing unit 200 according to another embodiment of the present disclosure, and FIG. 22B is a driving timing diagram of the sub-pixel circuit 110 illustrated in FIG. 22A.

The sub-pixel circuit 110 illustrated in FIG. 22A is the same as the sub-pixel circuit 110 illustrated in FIG. 20A except that the image data voltage and the specific voltage are applied through one data signal line Vdata. In this case, as described above, two scan signals are required in the description of FIGS. 17A and 17B, and the scan signal SPWM(n) and the scan signal SCCG(n) of FIGS. 22A and 22B represent these two scan signals.

In FIGS. 22A and 22B, in the data setting period, when the low-level scan signal SPWM(n) is applied to the sub-pixel circuit 110, the PWM data voltage PWM data is applied to the node A through the turned-on transistor T1. In addition, when the low-level scan signal SCCG(n) is applied to the sub-pixel circuit 110, the constant current generator data voltage (CCG data) is applied to the node B through the turned-on transistor T6.

During the sensing period ① of the PWM circuit 112 in the sensing driving period, when the low-level scan signal SPWM(n) is applied to the sub-pixel circuit 110, the second specific voltage is input to the node A through the turned-on transistor T1. In addition, when the low-level scan signal SCCG(n) is applied to the sub-pixel circuit 110, the first specific voltage is applied to the node B through the turned-on transistor T6.

In FIG. 22B, it is exemplified that the scan signals are applied in the order of the SPWM(n) and SCCG(n), but the present disclosure is not limited thereto. According to the embodiment, the SCCG(n) signal may be applied first and the SPWM(n) signal may be applied later.

In addition, since the rest of the contents related to the display driving and sensing driving of the sub-pixel circuit 110 may be sufficiently understood through the above-described contents in FIGS. 14A and 14B, and the contents related to the prevention of the luminance non-uniformity and horizontal crosstalk, etc., due to the sweep rod may be sufficiently understood through the above-described contents of FIGS. 19A to 20B, redundant descriptions thereof will be described.

Figure 23A:
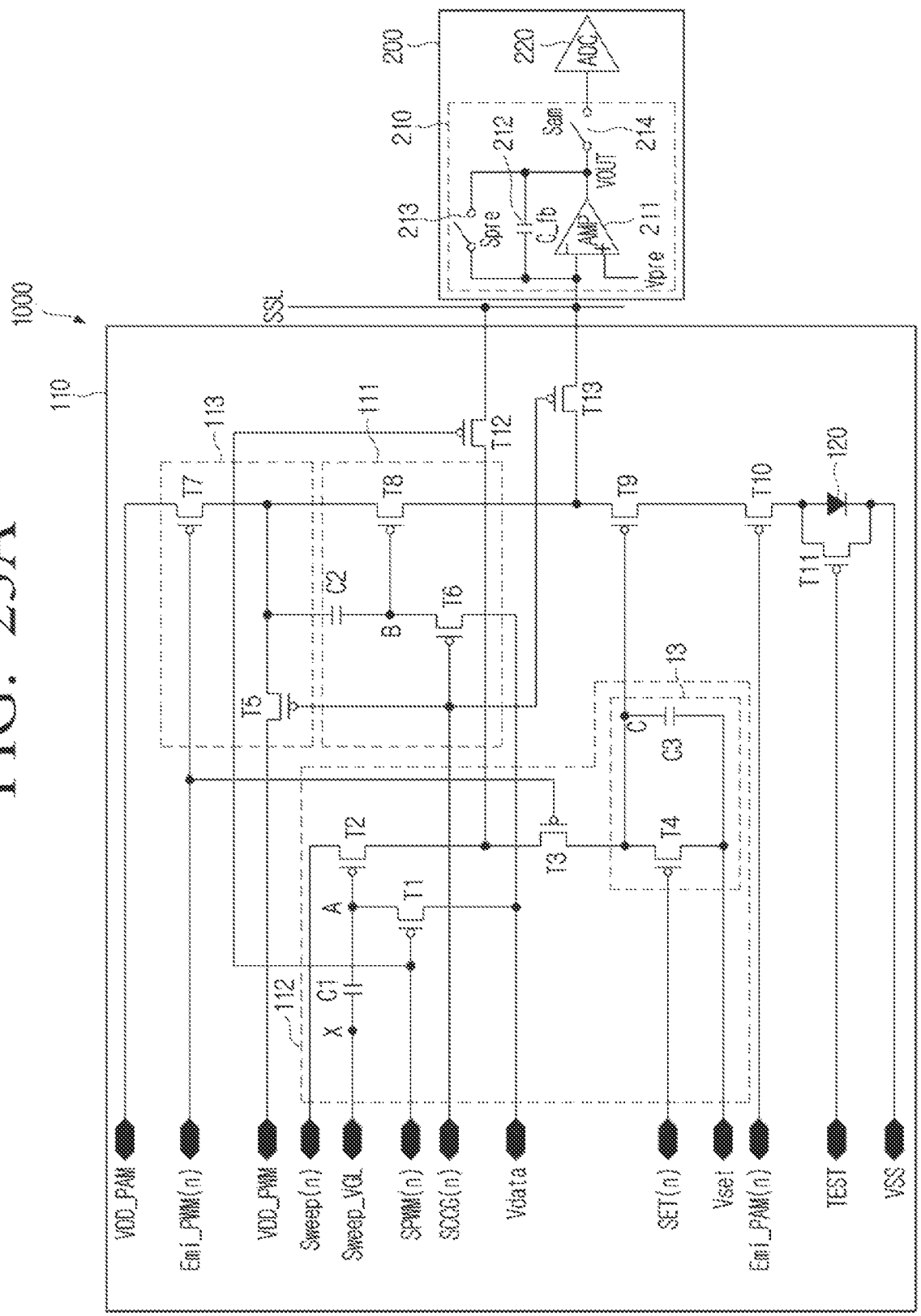
FIG. 23A is a detailed circuit diagram of a sub-pixel circuit and a sensing unit according to another embodiment of the present disclosure.
Figure 23B:
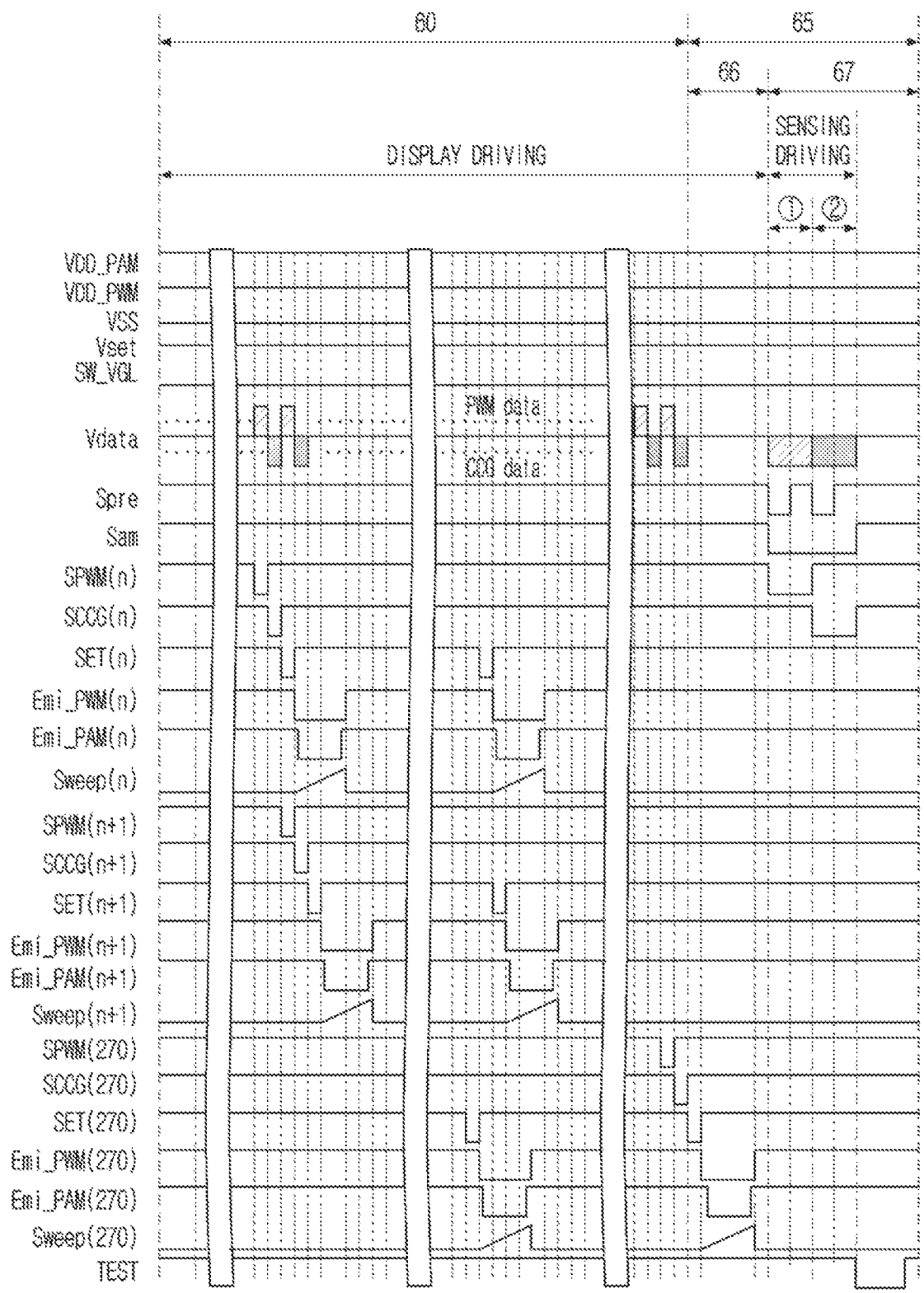
FIG. 23B is a driving timing diagram of the sub-pixel circuit illustrated in FIG. 23A.

FIG. 23A is a detailed circuit diagram of the sub-pixel circuit 110 and the sensing unit 200 according to another embodiment of the present disclosure, and FIG. 23B is a driving timing diagram of the sub-pixel circuit 110 illustrated in FIG. 23A.

The sub-pixel circuit 110 illustrated in FIG. 23A is similar to the sub-pixel circuit 110 of FIG. 22A in that the image data voltages (PWM data voltage and constant current generator data voltage) and the specific voltages (second specific voltage and first specific voltage) are applied through one data signal line Vdata.

Therefore, in FIGS. 23A and 23B, the image data voltage and the specific voltage are applied to the sub-pixel circuits 110 in the data setting period and the sensing driving period, respectively, using two scan signals (or scan signal lines) such as SPWM(n) and SCCG(n). The sub-pixel circuit 110 illustrated in FIG. 23A is similar to the embodiment of FIG. 21A in that it uses the scan signal without using the separate control signals (PWM_Sen(n) and CCG_Sen(n) in FIG. 22A) to control the turn on/off of transistors T12 and T13.

In the case of the embodiment of FIG. 23A, since two scan signals such as SPWM(n) and SCCG(n) are used, as illustrated, the gate terminal of the transistor T12 is connected to the scan signal SPWM(n), and the gate terminal of the transistor T13 is connected to the scan signal SCCG(n).

Even in the case of the embodiments of FIGS. 23A and 23B, by turning off the switch inside the amplifier 211 in the data setting period and turning on the switch inside the amplifier 211 in the sensing driving period, the fact that a current may flow in the sensing unit 200 only in the sensing driving period is as described above with reference to FIGS. 21A and 21B.

In addition, since the rest of the contents related to the display driving and sensing driving of the sub-pixel circuit 110 may be sufficiently understood through the above-described contents in FIGS. 14A and 14B, and the contents related to the prevention of the luminance non-uniformity and horizontal crosstalk, etc., due to the sweep rod may be sufficiently understood through the above-described contents of FIGS. 19A to 20B, redundant descriptions thereof will be described.

Hereinafter, one or more embodiments of the present disclosure to which the external compensation method for the IR drop is applied will be described with reference to FIGS. 24A to 31B. In this case, FIGS. 24A to 27B illustrate the embodiments in which the method of applying the high voltage SW_VGH of the sweep signal to the node X, to which the sweep signal is applied, during the data setting period in relation to the problems of the luminance non-uniformity and horizontal crosstalk due to the sweep load.

FIGS. 28A to 31B illustrate the embodiments in which the method of applying the low voltage SW_VGL of the sweep signal to the node X and applying the sweep signal to the source terminal of the second driving transistor is applied in relation to the problems of the luminance non-uniformity and horizontal crosstalk due to the sweep load.

Even if the contents, which may be equally applied to the description of FIGS. 24A to 31B, among the above contents have a minor difference (e.g., a case where only the reference number of the transistor is different), redundant descriptions thereof may be omitted or will be briefly described.

Figure 24A:
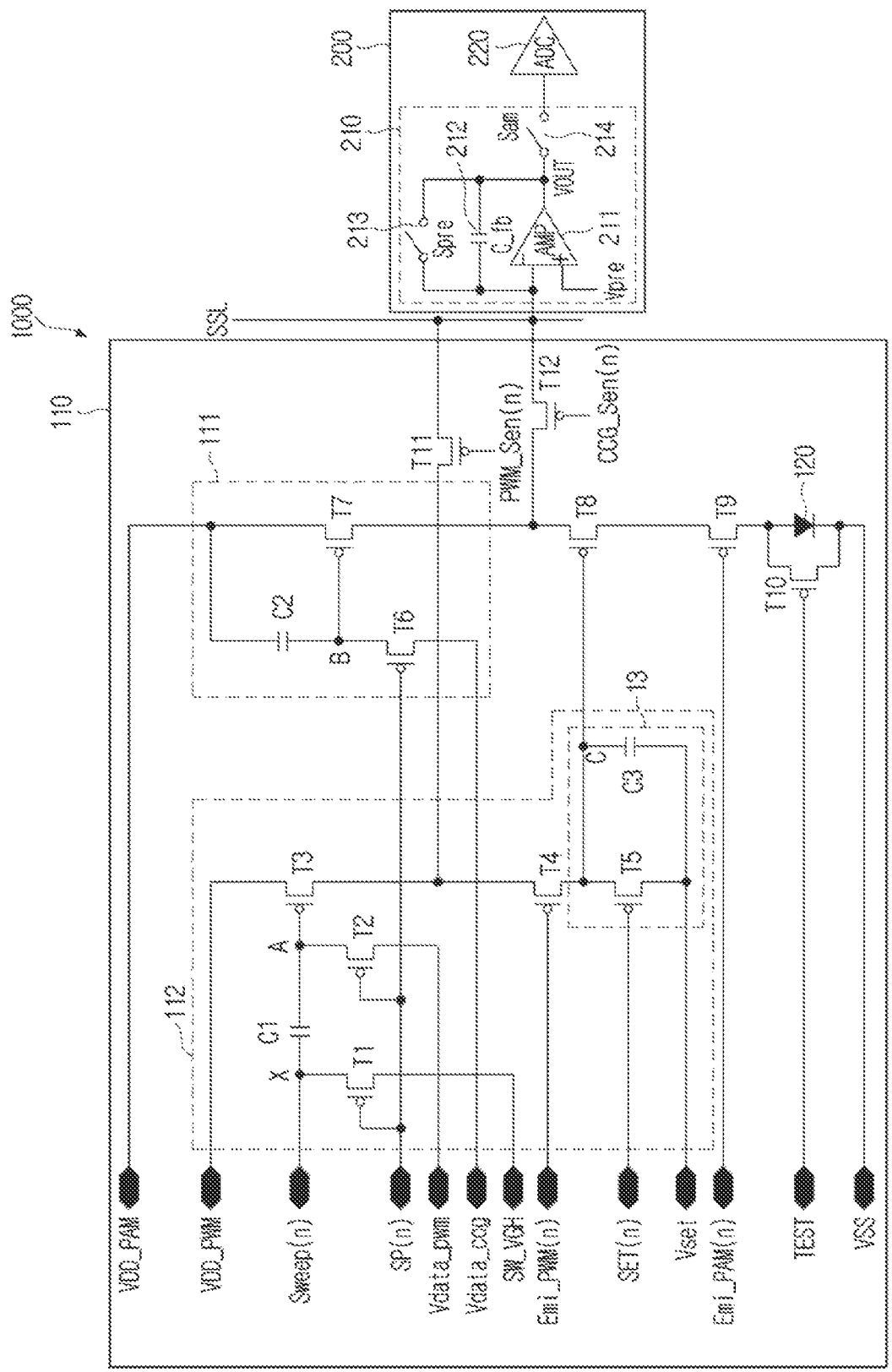
FIG. 24A is a detailed circuit diagram of the sub-pixel circuit and the sensing unit according to the embodiment of the present disclosure.

FIG. 24A is a detailed circuit diagram of the sub-pixel circuit 110 and the sensing unit 200 according to an embodiment of the present disclosure. In FIG. 24A, the sub-pixel circuit 110 includes the constant current source circuit 111, the PWM circuit 112, the first switching transistor T8, the second switching transistor T9, the transistor T10, the transistor T11, and the transistor T12.

The constant current source circuit 111 turns on/off according to the first driving transistor T7, the capacitor C2 connected between the source terminal and the gate terminal of the first driving transistor T7, and the transistor T6 that is controlled to be turned on/off according to the scan signal SP(n) and applies the constant current generator data voltage applied through a data signal line Vdata_ccg to the gate terminal of the first driving transistor T7 while being turned on.

The PWM circuit 112 includes the second driving transistor T3 having a source terminal connected to a second driving voltage VDD_PWM terminal, the capacitor C1 for coupling a sweep signal that sweeps between two different voltages, to the gate terminal of the second driving transistor T3, and the transistor T2 that is controlled to be turned on/off according to the scan signal SP(n) and applies the PWM data voltage applied through a data signal line Vdata_pwm to the gate terminal of the second driving transistor T3 while being turned on.

In addition, the PWM circuit 112 includes the reset unit 13. The reset unit 13 is a component for forcibly turning on the first switching transistor T8 before each light-emitting period starts. Since the contents of the reset unit 13 are the same as described above in the description of FIG. 14A, redundant descriptions thereof will be omitted.

In addition, the PWM circuit 112 includes the transistor T1 having a source terminal connected to the SW_VGH signal line, a gate terminal connected to the SP(n) signal line, and a drain terminal connected to the node X. In this case, the source terminal of the transistor T1 may be directly connected to a wiring to which the high voltage SW_VGH of the sweep signal is applied from the power IC.

Therefore, while the low voltage is applied through the SP(n) signal line to set the PWM data voltage to the node A, the high voltage SW_VGH of the sweep signal applied through the turned-on transistor T1 is forcibly applied to node X, the voltage of the node X may be maintained at the high voltage SW_VGH of the sweep signal regardless of the change in voltage of the node A. Accordingly, it is possible to prevent or minimize the luminance non-uniformity and horizontal crosstalk, which may occur due to the sweep rod, as described above.

In FIG. 24A, the drain terminal of the second driving transistor T3 is connected to the gate terminal of the first switching transistor T8 through the transistor T4 turned on according to the emission signal Emi_PWM(n).

Therefore, the PWM circuit 112 may control the turn on/off operation of the first switching transistor T8 through the operation of the reset unit 13 and the turn on/off operation of the second driving transistor T3, thereby controlling the time when the driving current flows in the inorganic light-emitting element 120 within the light-emitting period.

The source terminal of the second switching transistor T9 is connected to the drain terminal of the first switching transistor T8, and the drain terminal of the second switching transistor T9 is connected to the anode terminal of the inorganic light-emitting element 120. The second switching transistor T9 may be turned on/off according to the control signal Emi_PAM(n) to electrically connect/disconnect the first switching transistor T8 and the inorganic light-emitting element 120. The turn on/off timing of the second switching transistor T9 is related to the implementation of the black gradation.

The transistor T10 is connected between the anode terminal and the cathode terminal of the inorganic light-emitting element 120. Since the transistor T10 operates in the same way as the transistor T12 of FIG. 14A and performs the same function, redundant descriptions thereof will be omitted.

The transistor T12 has a source terminal connected to the drain terminal of the first driving transistor T7 and a drain terminal connected to the sensing unit 200. Since the transistor T12 operates in the same way as the transistor T14 of FIG. 14A and performs the same function, redundant descriptions thereof will be omitted.

The transistor T11 has a source terminal connected to the drain terminal of the second driving transistor T3 and a drain terminal connected to the sensing unit 200. Since the transistor T11 operates in the same way as the transistor T13 of FIG. 14A and performs the same function, redundant descriptions thereof will be omitted.

The cathode terminal of the inorganic light-emitting element 120 is connected to the ground voltage VSS terminal. Since the unit configuration of the sensing unit 200 is the same as that of the sensing unit 200 of FIG. 14A, redundant descriptions thereof will be omitted.

Figure 24B:
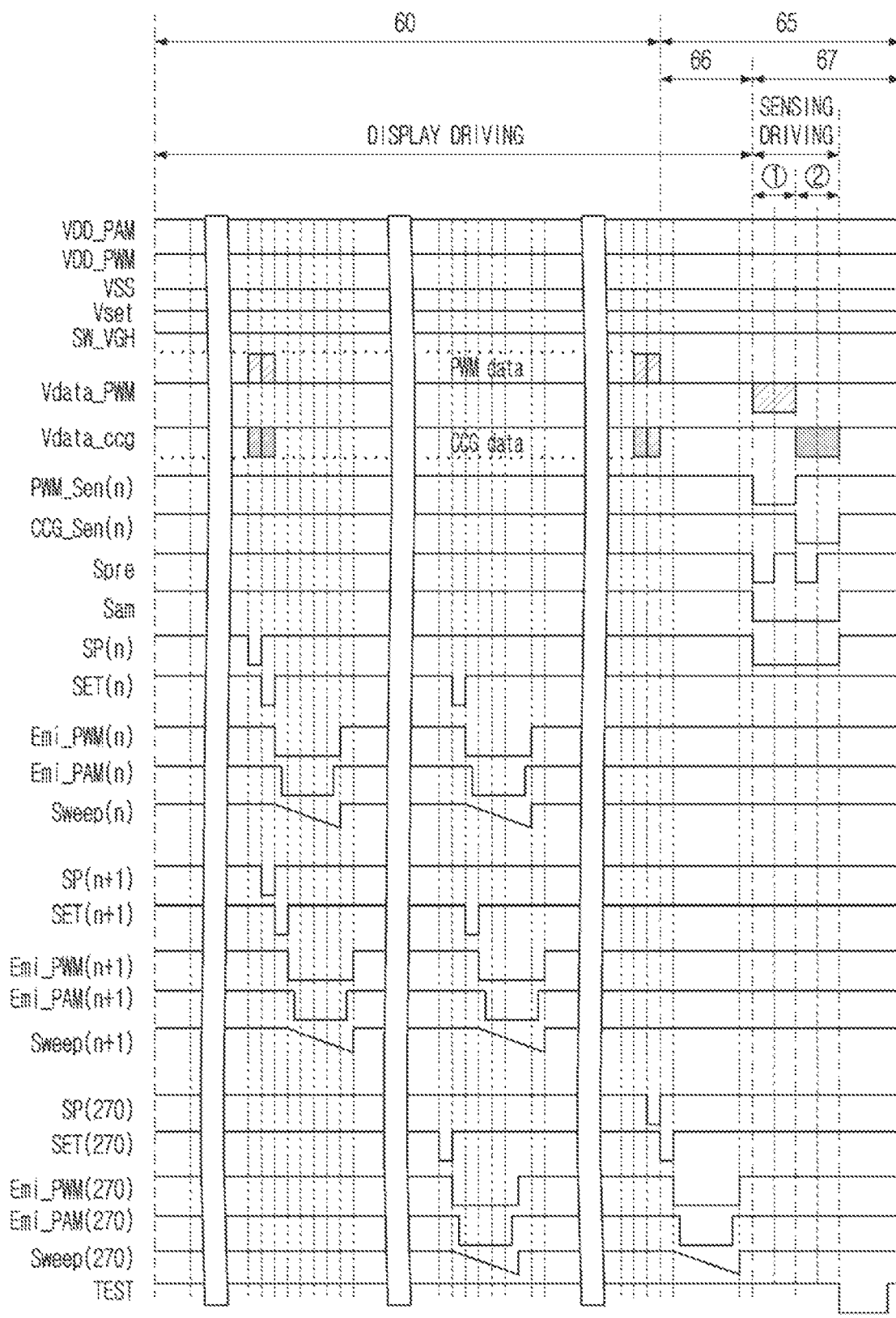
FIG. 24B is a driving timing diagram of the sub-pixel circuit illustrated in FIG. 24A.

FIG. 24B is a driving timing diagram of the sub-pixel circuit 110 illustrated in FIG. 24A. Specifically, FIG. 24B illustrates various control signals, driving voltage signals, and data signals applied to the sub-pixel circuits 110 during one image frame interval and a blanking interval. In FIG. 24B, the display panel 100 may be driven in order of display driving and sensing driving.

As illustrated in FIG. 24B, the control signals SP, SET, Emi_PWM, Emi_PAM, and sweep are applied to the display panel 100 during the display driving period. For example, as illustrated in FIG. 24B, the control signals SP(n), SET(n), Emi_PWM(n), Emi_PAM(n), and Sweep(n) may be applied to the sub-pixel circuits 110 included in the n-th row line of the display panel 100 during the display driving period.

The sub-pixel circuits included in each row line of the display panel 100 may be in the order of the data setting period and the plurality of light-emitting periods. In addition, the sub-pixel circuits included in all the row lines of the display panel 100 may be driven in the row line order.

Hereinafter, a detailed operation of the sub-pixel circuit 110 will be described with reference to the control signals SP(n), SET(n), Emi_PWM(n), EMi_PAM(n), and Sweep (n)) related to the n-th row line of FIG. 24B and the circuit of FIG. 24A.

First, in the data setting period, when the low-level scan signal SP(n) is applied to the sub-pixel circuit 110, the transistor T2 of the PWM circuit 112 and the transistor T6 of the constant current source circuit 111 are turned on. When the transistor T2 is turned on, the PWM data voltage PWM data applied from the second data driver is applied to the gate terminal (hereinafter, referred to as the node A) of the second driving transistor T3 through the data signal line Vdata_pwm.

In this case, the PWM data voltage may be higher than the second driving voltage VDD_PWM. Accordingly, in the state where the PWM data voltage is set at the node A, the second driving transistor T3 is maintained in the turned-off state. When the transistor T6 is turned on, the constant current generator data voltage CCG data applied from the first data driver is applied to the gate terminal (hereinafter, referred to as the node B) of the first driving transistor T7 through a data signal line Vdata_ccg.

The sub-pixel circuit 110 of FIG. 24A does not include the driving voltage change unit 113 unlike the above-described embodiments of FIGS. 14A to 23B. Instead, the source terminal of the first driving transistor T7 is directly connected to the terminal (or line) of the first driving voltage VDD_PAM. Accordingly, the voltage corresponding to the difference between the first driving voltage VDD_PAM and the constant current generator data voltage is set between the source terminal and the gate terminal of the first driving transistor T7.

In this case, the constant current generator data voltage may be a voltage lower than the first driving voltage VDD_PWM. Accordingly, in the state where the constant current generator data voltage is set at the node B, the first driving transistor T7 is maintained in the turned-on state.

When the first light-emitting period for the n-th row line starts, the low-level emission signal SET(n) is applied to the transistor T5. Accordingly, Vset, which is a low voltage, is charged in the capacitor C3 through the turned-on transistor T5, and a low voltage is applied to the gate terminal (hereinafter, referred to as the node C) of the first switching transistor T8 to turn-on the first switching transistor T8. Thereafter, as illustrated in FIG. 24B, the emission signals Emi(n) and Sweep(n) are applied to the sub-pixel circuit 110 during the first light-emitting period.

Specifically, when the low-level emission signal Emi_PAM(n) is applied to the second switching transistor T9, the second switching transistor T9 is turned on. Therefore, through the first driving transistor T7 maintained in the turned-on state, the first switching transistor T8 turned on according to the SET(n) signal, and the second switching transistor T9 turned on according to the Emi_PAM(n) signal, the driving current flows in the inorganic light-emitting element 120.

In this case, the magnitude of the driving current is determined by the difference in the voltage between the gate terminal and the source terminal of the first driving transistor T7, in particular, the magnitude of the constant current generator data voltage set to the gate terminal of the first driving transistor T7. When the emission signal Sweep(n) (e.g., sweep voltage that linearly decreases as illustrated in FIG. 24B) is applied to the capacitor C1, the applied sweep voltage is coupled to the node A, so the voltage of the node A also decreases linearly.

Accordingly, when the difference value between the voltage of the node A and the second driving voltage VDD_PWM reaches the threshold voltage value of the second driving transistor T3, the second driving transistor T3 is turned on, and the high-level second driving voltage VDD_PWM is applied to the gate terminal of the first switching transistor T8 through the turned-on second driving transistor T3. (In this case, the transistor T4 is also in the turned-on state according to the low-level emission signal Emi_PWM(n).)

Accordingly, the first switching transistor T8 is turned off, the driving current does not flow in the inorganic light-emitting element 120 any longer, and the inorganic light-emitting element 120 stops emitting light. In this case, the time for the driving current to be provided to the inorganic light-emitting element 120 is determined by the difference in the voltage between the source terminal and the gate terminal of the second driving transistor T3, in particular, the magnitude of the PWM data voltage set to the gate terminal of the second driving transistor T3. (For example, the higher the PWM data voltage, the longer the time required for the difference value between the voltage of the node A and the second driving voltage VDD_PWM to reach the threshold voltage of the second driving transistor T3.)

The emission signals SET(n), Emi_PWM(n), Emi_PAM (n), and Sweep(n) are equally applied to the second and subsequent light-emitting periods for the n-th row line, respectively. Accordingly, the inorganic light-emitting elements 120 of the n-th row line equally emit light in second and subsequent light-emitting periods, respectively, based on the image data voltage set in the data setting period.

In FIG. 24B, after the display driving and the sensing driving are completed, the low-level TEST signal is subsequently applied to the sub-pixel circuit 110. Accordingly, it is possible to completely discharge the charge remaining in the inorganic light-emitting element 120 to the ground voltage VSS terminal through the turned-on transistor T10 as described above.

In the above, only operations related to the n-th row line have been described, but the operations for the remaining row lines will also be sufficiently understood through the above description. Reviewing in detail the timing diagram of FIG. 24B, there is the difference in the time when the emission signal Emi_PWM(n) becomes the low level and the time when the emission signal Emi_PAM(n) becomes the low level. This is to implement the black gradation as described above in FIG. 14B. The related contents differs only in the reference number of the transistor, and the above-described in FIG. 14B may be applied as it is, and therefore, additional redundant descriptions thereof will be omitted.

Referring back to FIG. 24B, the sensing driving period may include the sensing period ① of the PWM circuit 112 and the sensing period ② of the constant current source circuit 111. In this case, according to the embodiment of the present disclosure, the sensing driving may be performed within the blanking interval 65 as illustrated in FIG. 24B. Therefore, the sensing unit 200 may sense the current flowing in the driving transistors T7 and T3 based on the specific voltage applied within the blanking interval 65 of one image frame, and output sensing data corresponding to the sensed current.

However, according to the embodiment, the sensing driving may be performed during a booting interval, a power-off interval, a screen-off interval, etc., of the display apparatus 1000. Specifically, during the sensing period ① of the PWM circuit 112, the second specific voltage applied through the data signal line Vdata_pwm is input to the node A. In addition, in the sensing period ① of the PWM circuit 112, the transistor T11 is turned on according to the control signal PWM_Sen(n), and the second current flowing in the second driving transistor T3 through the turned-on transistor T11 is applied to the sensing unit 200. Accordingly, the sensing unit 200 may output the second sensing data corresponding to the second current to the correction unit 300.

During the sensing period ② of the constant current source circuit 111, the first specific voltage applied through the data signal line Vdata_ccg is input to the node B. In addition, in the sensing period ② of the constant current source circuit 111, the transistor T12 is turned on according to the control signal CCG_Sen(n), and the first current flowing in the first driving transistor T7 through the turned-on transistor T12 is transmitted to the sensing unit 200. Accordingly, the sensing unit 200 may output the first sensing data corresponding to the first current to the correction unit 300.

Since the detailed operation of the sensing unit 200 in the first initialization interval and the first sensing interval of the sensing period ① of the PWM circuit 112, and the second initialization interval and the second sensing interval of the sensing period ② of the constant current source circuit 111 is the same as described above with reference to FIG. 14B, redundant descriptions thereof will be omitted.

The correction unit 300 may acquire the first and second compensation values based on the first and second sensing data output from the sensing unit 200, respectively, and store and update the acquired first and second compensation values in a memory. Then, when the display driving is performed, the correction unit 300 may correct the constant current generator data voltage and the PWM data voltage to be applied to the sub-pixel circuit 110 based on the first and second compensation values, respectively.

The above-described sensing driving may be performed on one row line per image frame or for a plurality of row lines per image frame. In this case, the above-described sensing driving may be sequentially performed in the row line order or may be performed in the random order as described above.

In addition, the above-described sensing driving may proceed in the order of the sensing period ① of the PWM circuit 112 and the sensing period ② of the constant current source circuit 111, as illustrated, but is not limited thereto. According to the embodiment, the sensing period ② of the constant current source circuit 111 may proceed first, and the sensing period ① of the PWM circuit 112 may proceed later.

Further, in the above, it has been exemplified that the sensing driving is performed after the display driving. According to the embodiment, the sensing driving may be performed first and the display driving may be performed later. The sub-pixel circuit 110 of FIG. 24A does not separately include the driving voltage change unit 113, and the first driving voltage VDD_PAM is applied to the source terminal of the first driving transistor T7 in both the data setting period and each light-emitting period.

Therefore, in the sub-pixel circuit 110 of FIG. 24A, the first driving voltage VDD_PAM applied to the sub-pixel circuits operating in the data setting period is affected by the drop of the first driving voltage VDD_PAM by the sub-pixel circuits operating in the light-emitting period. As described above, this prevents the accurate constant current generator data voltages from being set in the constant current source circuits 111 belonging to the row line operating in the data setting period.

In order to solve the IR drop problem of the first driving voltage VDD_PAM, in the embodiments of FIGS. 24A to 31B, the external compensation method for the IR drop (i.e., the method of correcting the constant current generator data voltage) may be used.

That is, in the embodiments of FIGS. 14A to 23B, when the IR drop problem of the first driving voltage VDD_PAM is solved by controlling the driving voltage applied to the source terminal of the first driving transistor T9 or T8 through the driving voltage change unit 113, in the embodiment of FIGS. 23A to 31B, the IR drop problem of the first driving voltage VDD_PAM is solved by correcting the constant current generator data voltage applied to the gate terminal of the first driving transistor T7 or T6. Specifically, according to the embodiment of the present disclosure, data (or information) about IR drop values for each area of the display panel 100 according to the magnitude of the driving current may be stored in a storage unit (e.g., memory, etc.)

Here, the magnitude of the driving current refers to an average current value provided by a driving voltage providing unit (e.g., power IC) to the display panel 100 to display the image frame on the display panel 100, and the values of the driving current may vary depending on the image represented by the image frame. In addition, the driving current and the corresponding IR drop values for each area may be sensed and calculated in advance in the operation of manufacturing the display apparatus 1000 and stored in a storage unit. In addition, the driving current and the corresponding IR drop values for each area may be sensed and calculated in advance before the image is displayed in the operation of using the display apparatus 1000 and updated.

Therefore, the correction unit 300 may correct the constant current generator data to be applied to the display panel 100 based on the IR drop values for each area of the display panel 100 corresponding to the magnitude of the driving current required to display the current image frame.

Accordingly, the data driver may generate the constant current generator data voltage based on the corrected constant current generator data and apply the generated constant current generator data voltage to the display panel 100, thereby compensating for the IR drop of the first driving voltage VDD_PAM by the driving current required to display the corresponding image frame.

In the above, the IR drop values for each area of the display panel 100 may be the IR drop values for each row line of the display panel 100, but are not limited thereto. Hereinafter, one or more embodiments of the present disclosure will be described with reference to FIGS. 25A to 27B. In this case, since the embodiments illustrated in FIGS. 25A to 27B are similar in the configuration and operating principle to those described above with reference to FIGS. 24A and 24B, redundant descriptions thereof will be omitted and differences therebetween will be mainly described.

Figure 25A:
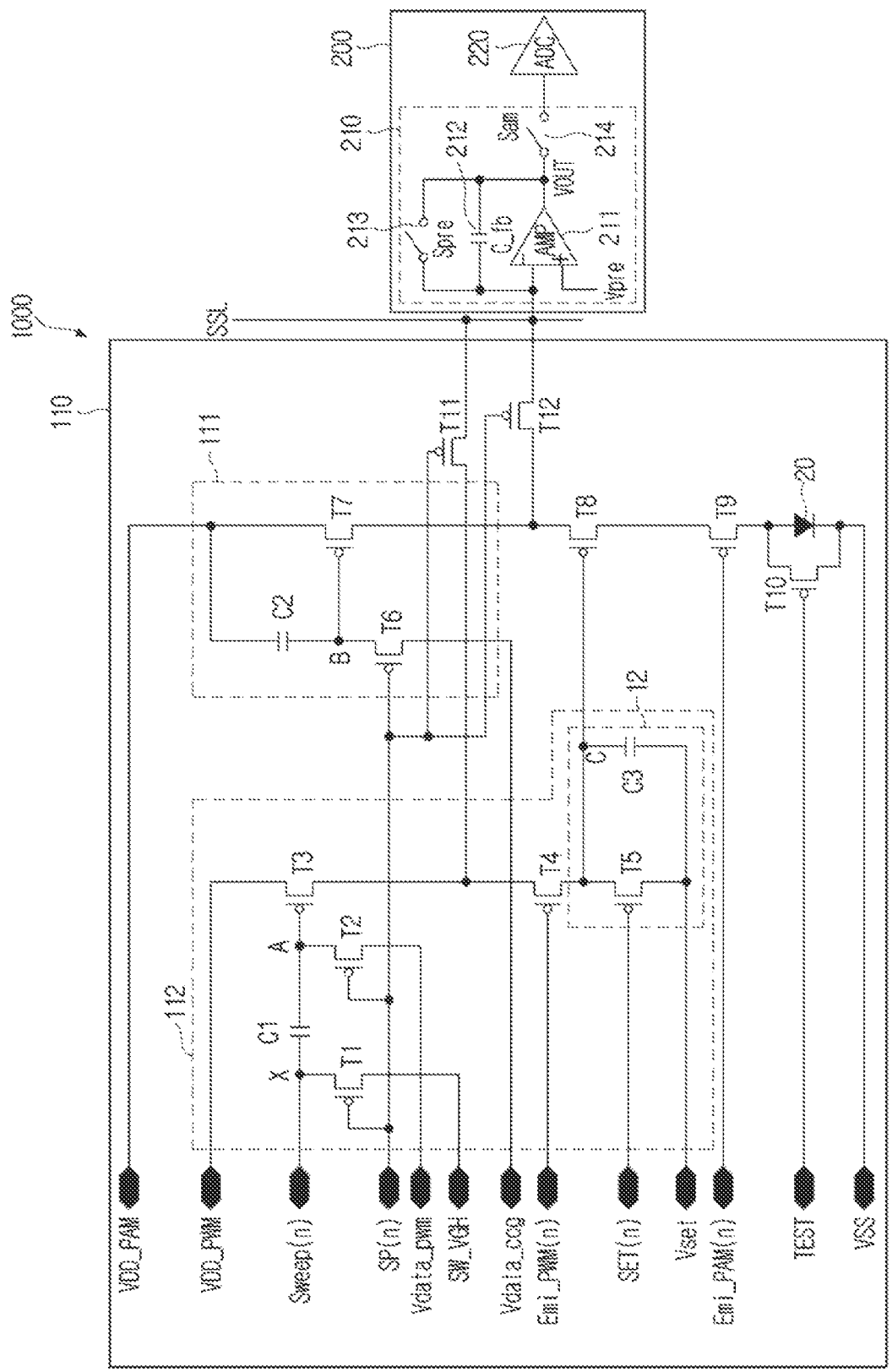
FIG. 25A is a detailed circuit diagram of a sub-pixel circuit and a sensing unit according to another embodiment of the present disclosure.
Figure 25B:
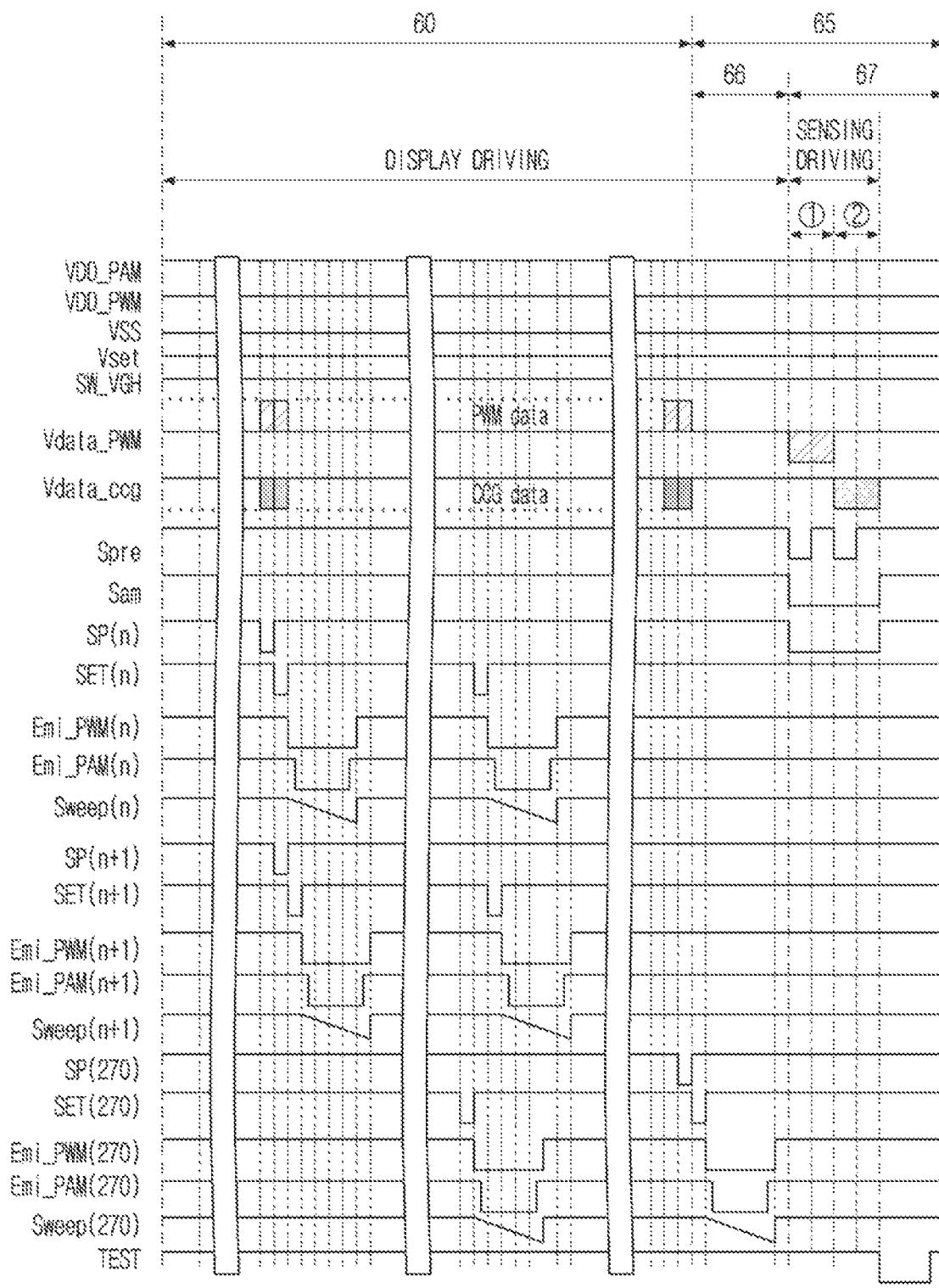
FIG. 25B is a driving timing diagram of the sub-pixel circuit illustrated in FIG. 25A.

FIG. 25A is a detailed circuit diagram of the sub-pixel circuit 110 and the sensing unit 200 according to another embodiment of the present disclosure, and FIG. 25B is a driving timing diagram of the sub-pixel circuit 110 illustrated in FIG. 25A. The sub-pixel circuit 110 illustrated in FIG. 25A differs from FIG. 24A only in that it uses the scan signal SP(n) without using separate control signals (PWM_Sen(n) and CCG_Sen(n) in FIG. 24A) to control the turn on/off of the transistors T11 and T12, and the rest is the same as the sub-pixel circuit 110 illustrated in FIG. 24A. The drive timing illustrated in FIG. 25B is also the same as the drive timing diagram of FIG. 24B except that the control signals PWM_Sen(n) and CCG_Sen(n) are not present.

In FIGS. 24A and 25B, as the low-level scan signal SP(n) is applied in the data setting period, the transistors T1, T2, T6, T11, and T12 are turned on together. However, in this case, the flow of current to the sensing unit 200 may be prevented by turning off a switch inside the amplifier 211. Therefore, the sensing driving operation is not performed in the data setting period, and only the data setting operation is performed. The switch inside the above-described amplifier 211 may be turned on in the sensing driving period. Therefore, in the sensing driving period, the first current and the second current described above flow in the sensing unit 200, and thus, the above-described sensing driving may be performed.

In this case, the second specific voltage is applied to the gate terminal of the second driving transistor T3 during the sensing period ① of the PWM circuit 112, the first specific voltage is applied to the gate terminal of the first driving transistor T7 during the sensing period ② of the constant current source circuit 111, and the time when the second specific voltage is applied and the time when the first specific voltage is applied do not overlap each other. Accordingly, the sensing driving operation described with reference to FIGS. 24A and 24B may be performed in the same manner even without using the separate control signals PWM_Sen(n) and CCG_Sen(n).

In addition, the rest of the contents related to the display driving, the sensing driving, the prevention of the luminance non-uniformity and horizontal crosstalk phenomenon due to the sweep load, etc., of the sub-pixel circuit 110 may be fully understood through the above description in FIGS. 24A and 24B, and therefore, redundant descriptions thereof will be omitted.

Figure 26A:
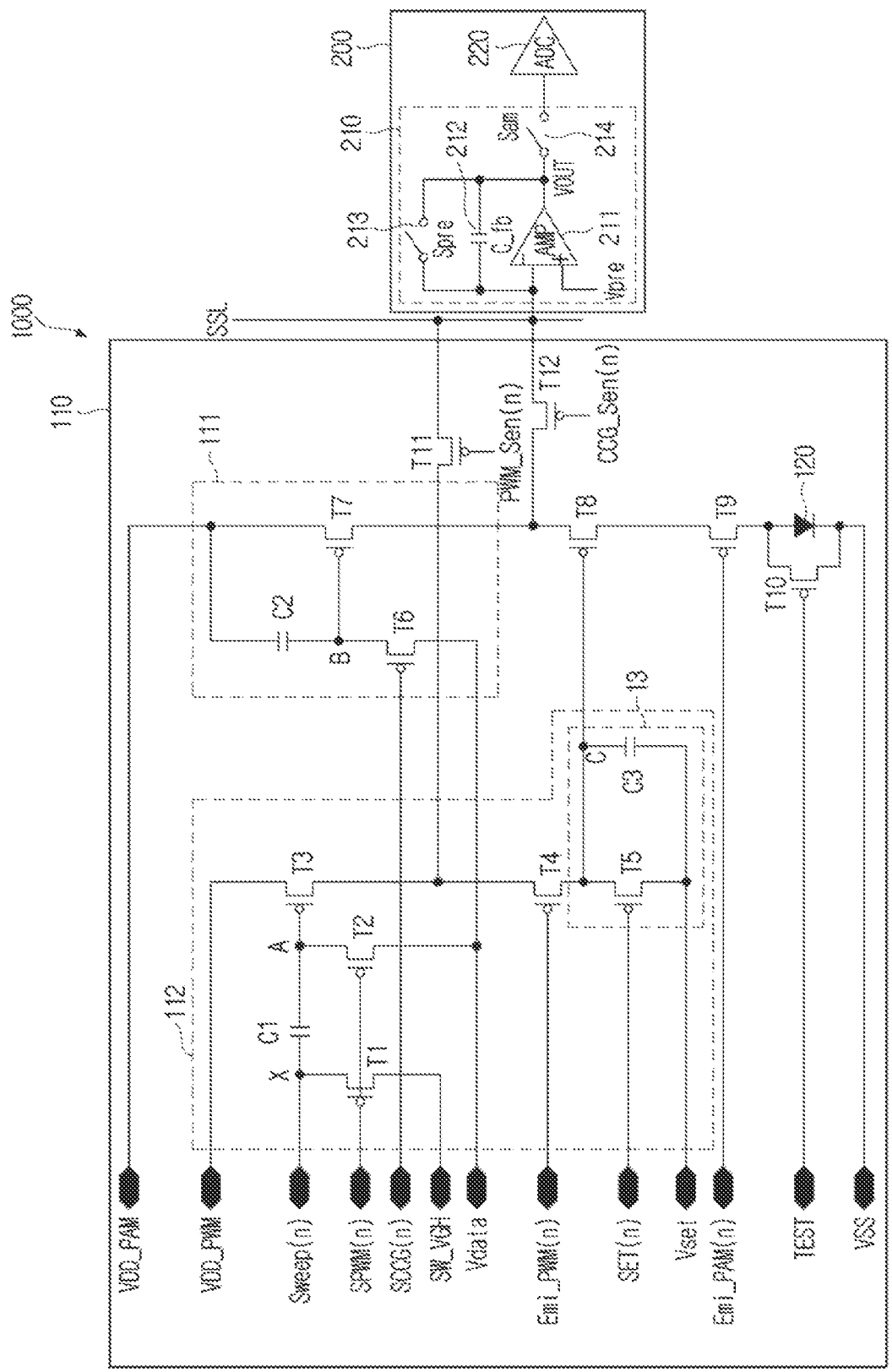
FIG. 26A is a detailed circuit diagram of a sub-pixel circuit and a sensing unit according to another embodiment of the present disclosure.
Figure 26B:
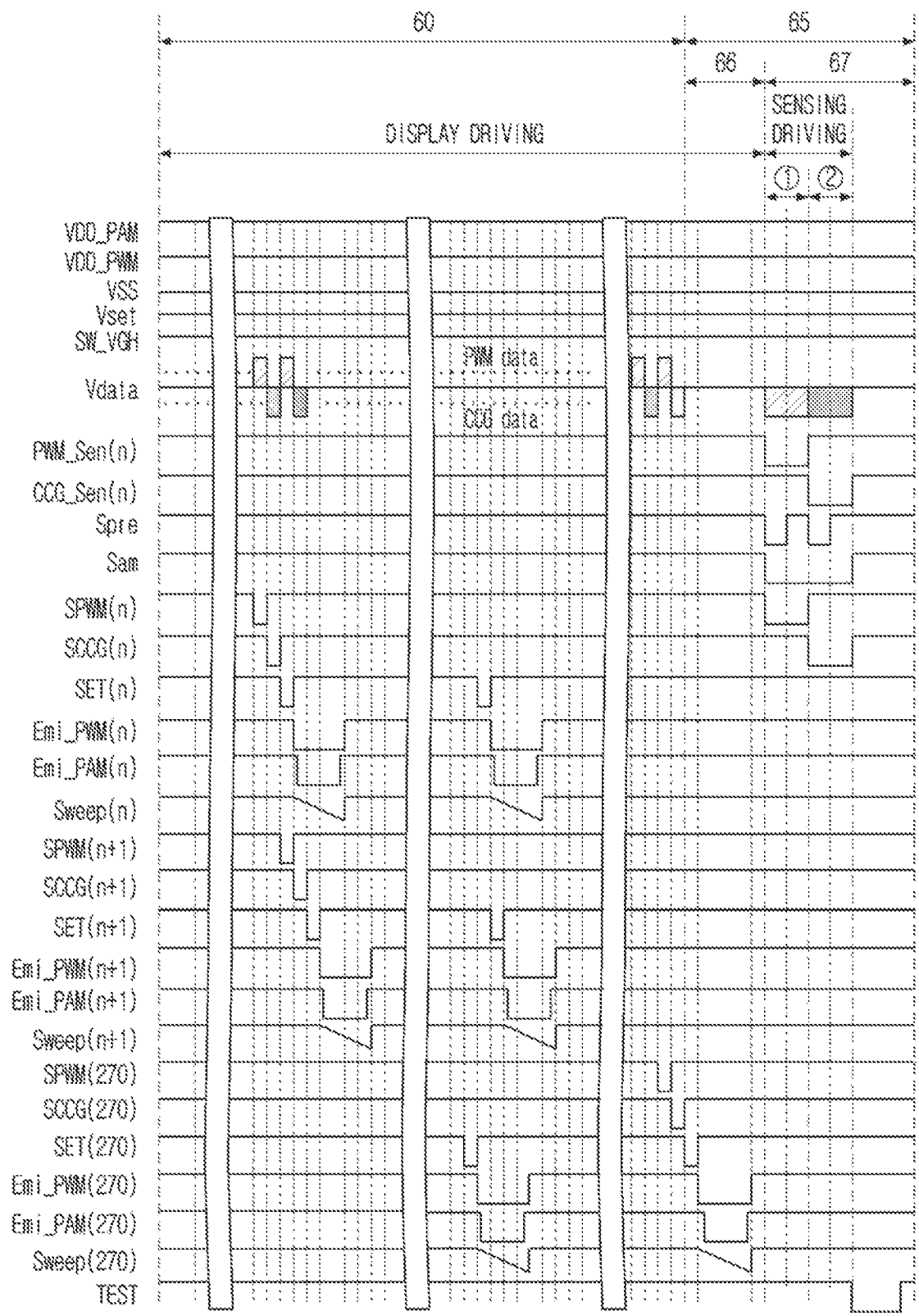
FIG. 26B is a driving timing diagram of the sub-pixel circuit illustrated in FIG. 26A.

FIG. 26A is a detailed circuit diagram of the sub-pixel circuit 110 and the sensing unit 200 according to another embodiment of the present disclosure, and FIG. 26B is a driving timing diagram of the sub-pixel circuit 110 illustrated in FIG. 26A. The sub-pixel circuit 110 illustrated in FIG. 26A is the same as the sub-pixel circuit 110 illustrated in FIG. 24A except that the image data voltage and the specific voltage are applied through one data signal line Vdata.

In this case, the PWM data voltage and the constant current generator data voltage from one data driver are time-divided and applied to the sub-pixel circuit 110 through the data signal line Vdata during the data setting period. In addition, the second specific voltage and the first specific voltage from the one data driver are time-divided and applied to the sub-pixel circuit 110 through the data signal line Vdata during the sensing driving period.

Therefore, in order to apply the PWM data voltage and the constant current generator data voltage, which are time-divided and applied during the data setting period, to the node A and the node B, respectively, and apply the second specific voltage and the first specific voltage, which are time-divided and applied during the sensing driving period, to the node A and the node B, respectively, two scan signals are required, and a scan signal SPWM(n) and a scan signal SCCG(n) in FIGS. 26A and 26B represent these two scan signals.

In FIGS. 26A and 26B, in the data setting period, when the low-level scan signal SPWM(n) is applied to the sub-pixel circuit 110, the PWM data voltage PWM data is applied to the node A through the turned-on transistor T2. In addition, when the low-level scan signal SCCG(n) is applied to the sub-pixel circuit 110, the constant current generator data voltage (CCG data) is applied to the node B through the turned-on transistor T6.

During the sensing period ① of the PWM circuit 112 in the sensing driving period, when the low-level scan signal SPWM(n) is applied to the sub-pixel circuit 110, the second specific voltage is input to the node A through the turned-on transistor T2. In addition, when the low-level scan signal SCCG(n) is applied to the sub-pixel circuit 110, the first specific voltage is applied to the node B through the turned-on transistor T6.

In FIG. 26B, it is exemplified that the scan signals are applied in the order of the SPWM(n) and SCCG(n), but the present disclosure is not limited thereto. According to the embodiment, the SCCG(n) signal may be applied first and the SPWM(n) signal may be applied later.

In addition, the rest of the contents related to the display driving, the sensing driving, the prevention of the luminance non-uniformity and horizontal crosstalk phenomenon due to the sweep load, etc., of the sub-pixel circuit 110 may be fully understood through the above description in FIGS. 24A and 24B, and therefore, redundant descriptions thereof will be omitted.

Figure 27A:
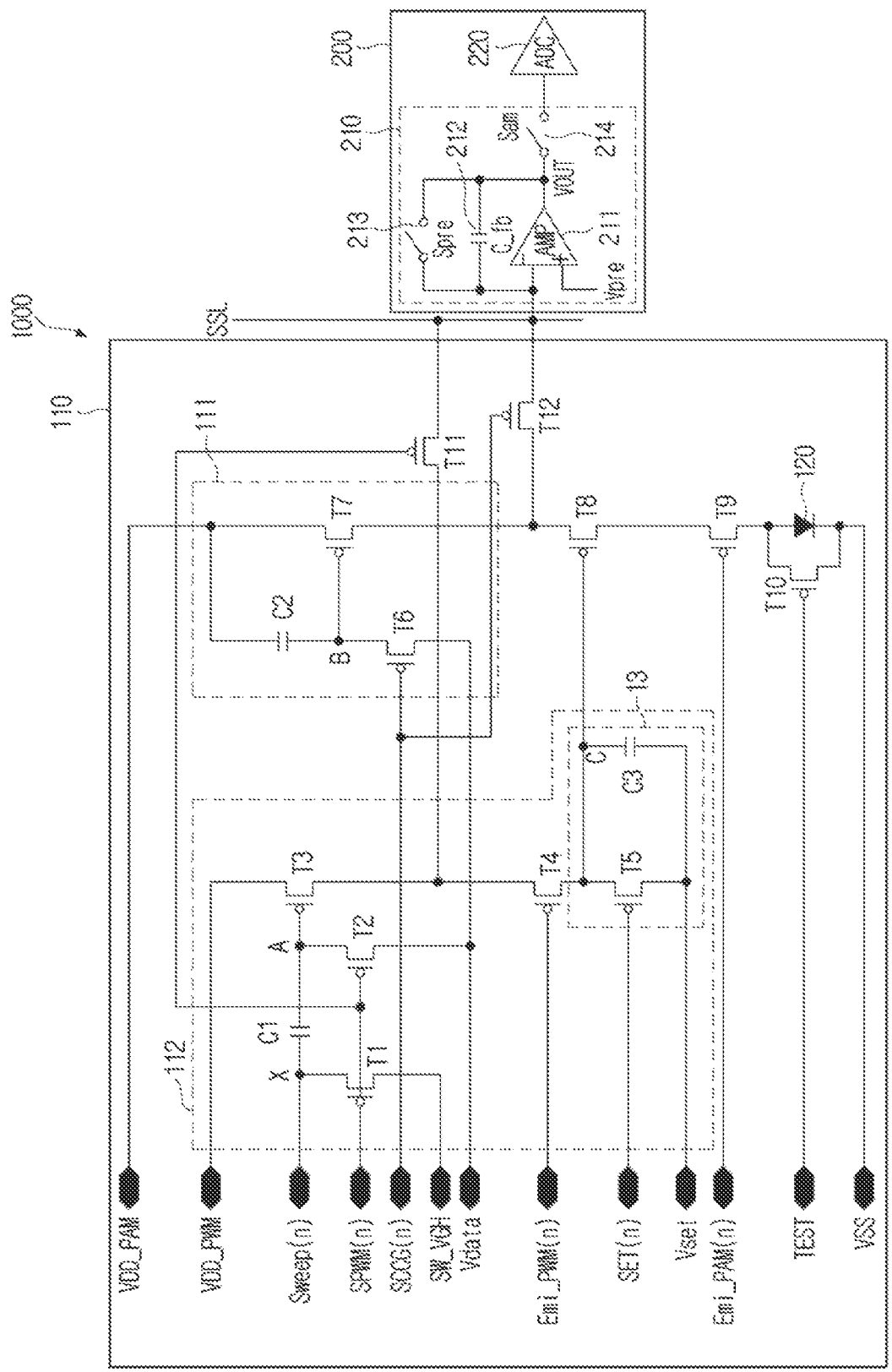
FIG. 27A is a detailed circuit diagram of a sub-pixel circuit and a sensing unit according to another embodiment of the present disclosure.
Figure 27B:
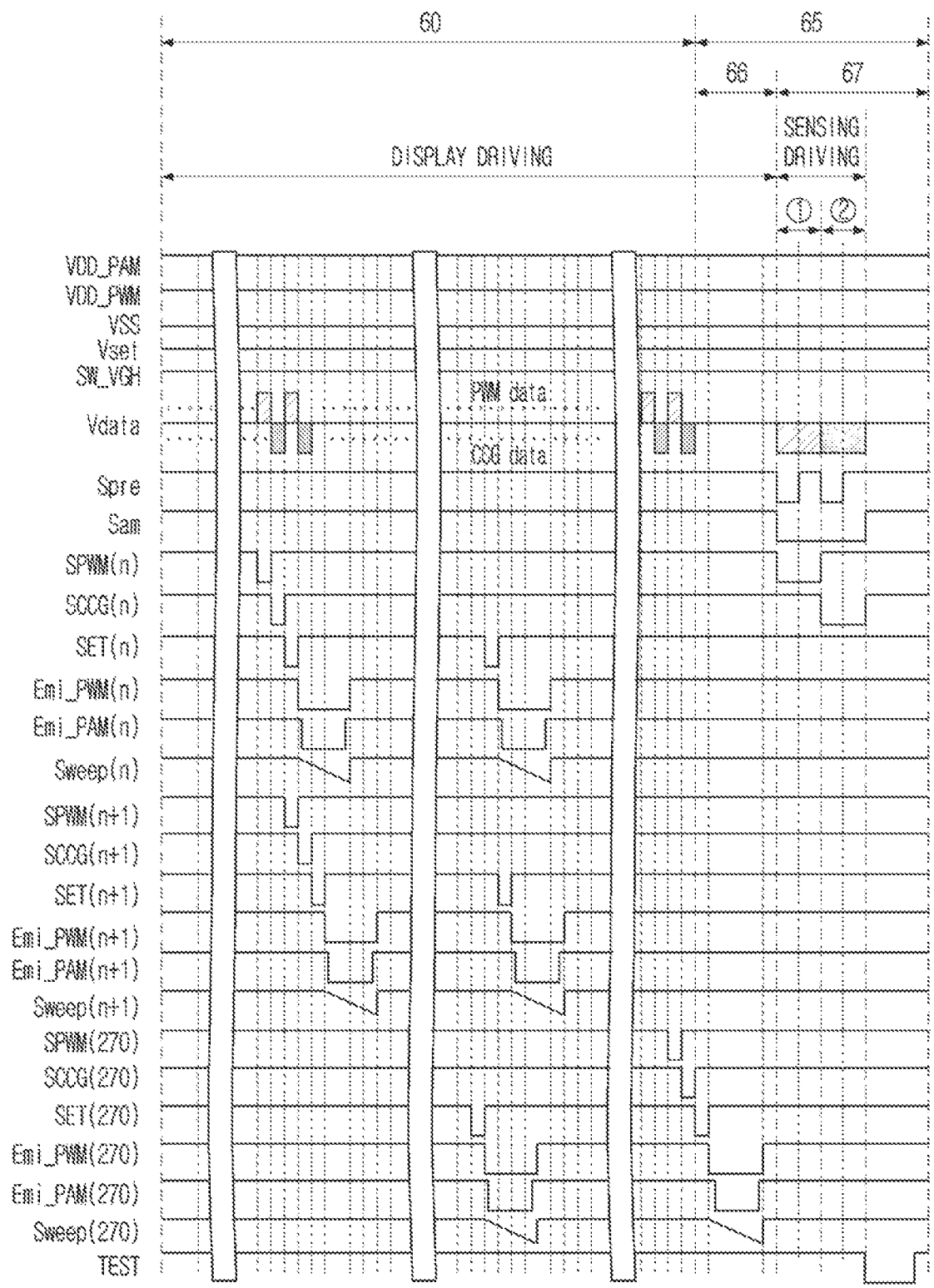
FIG. 27B is a driving timing diagram of the sub-pixel circuit illustrated in FIG. 27A.

FIG. 27A is a detailed circuit diagram of the sub-pixel circuit 110 and the sensing unit 200 according to another embodiment of the present disclosure, and FIG. 27B is a driving timing diagram of the sub-pixel circuit 110 illustrated in FIG. 27A. The sub-pixel circuit 110 illustrated in FIG. 27A is similar to the sub-pixel circuit 110 of FIG. 26A in that the image data voltages (PWM data voltage and constant current generator data voltage) and the specific voltages (second specific voltage and first specific voltage) are applied through one data signal line Vdata.

Therefore, in FIGS. 27A and 27B, the image data voltage and the specific voltage are applied to the sub-pixel circuits 110 in the data setting period and the sensing driving period, respectively, using two scan signals (or scan signal lines) such as SPWM(n) and SCCG(n).

The sub-pixel circuit 110 illustrated in FIG. 27A is similar to the embodiment of FIG. 25A in that it uses the scan signal without using the separate control signals (PWM_Sen(n) and CCG_Sen(n) in FIG. 26A) to control the turn on/off of transistors T11 and T11.

In the case of the embodiment of FIG. 27A, since two scan signals such as SPWM(n) and SCCG(n) are used, as illustrated, the gate terminal of the transistor T11 is connected to the scan signal SPWM(n) line, and the gate terminal of the transistor T12 is connected to the scan signal SCCG(n) line.

Even in the case of the embodiments of FIGS. 27A and 27B, by turning off the switch inside the amplifier 211 in the data setting period and turning on the switch inside the amplifier 211 in the sensing driving period, the fact that a current may flow in the sensing unit 200 only in the sensing driving period is as described above with reference to FIGS. 25A and 25B.

In addition, the rest of the contents related to the display driving, the sensing driving, the prevention of the luminance non-uniformity and horizontal crosstalk phenomenon due to the sweep load, etc., of the sub-pixel circuit 110 may be fully understood through the above description in FIGS. 24A and 24B, and therefore, redundant descriptions thereof will be omitted.

Hereinafter, the embodiments in which the low voltage SW_VGL of the sweep signal is applied to the node X and the sweep signal is applied to the source terminal of the second driving transistor will be described with reference to FIGS. 28A to 31B.

Figure 28A:
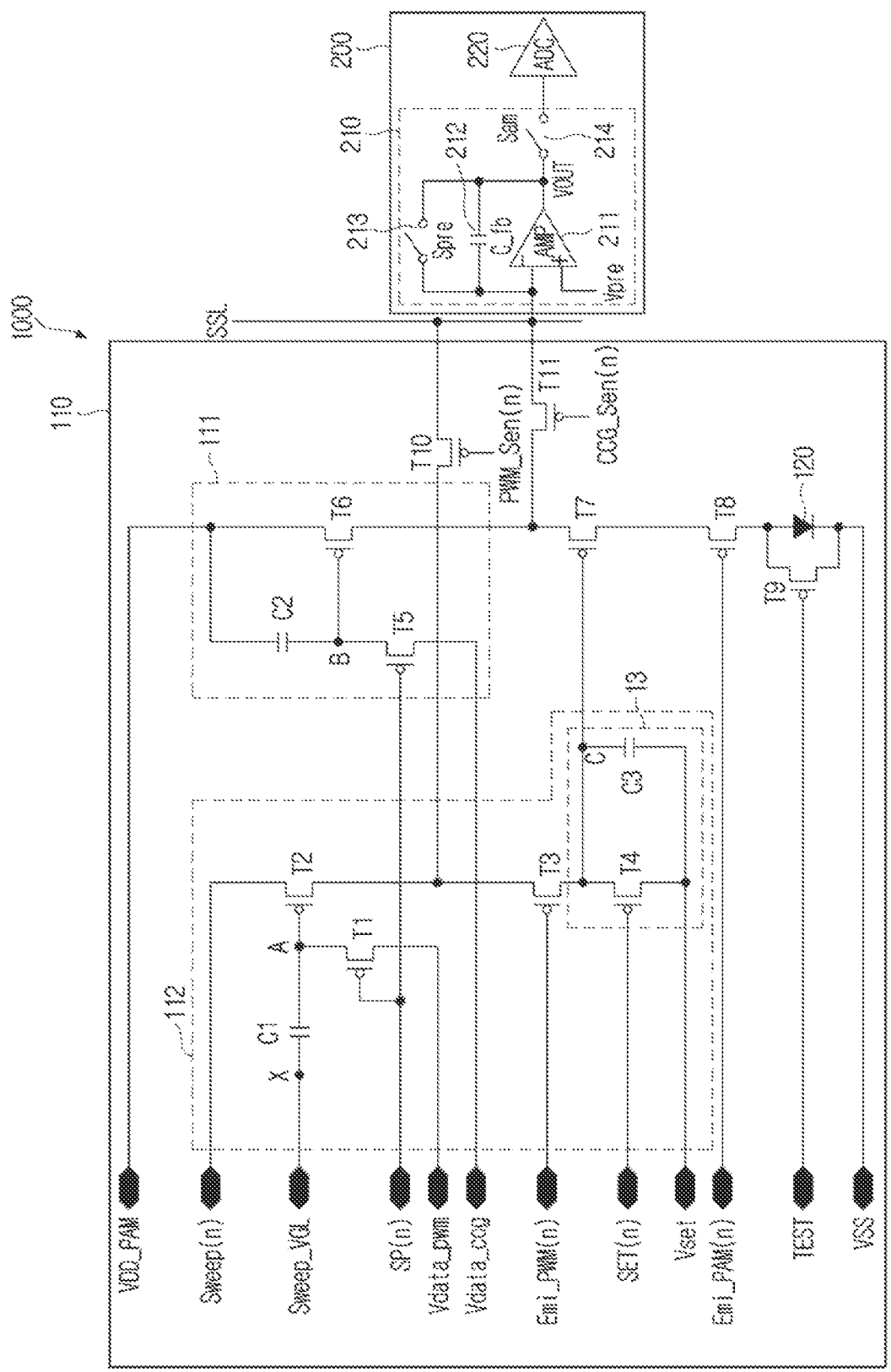
FIG. 28A is a detailed circuit diagram of the sub-pixel circuit and the sensing unit according to the embodiment of the present disclosure.
Figure 28B:
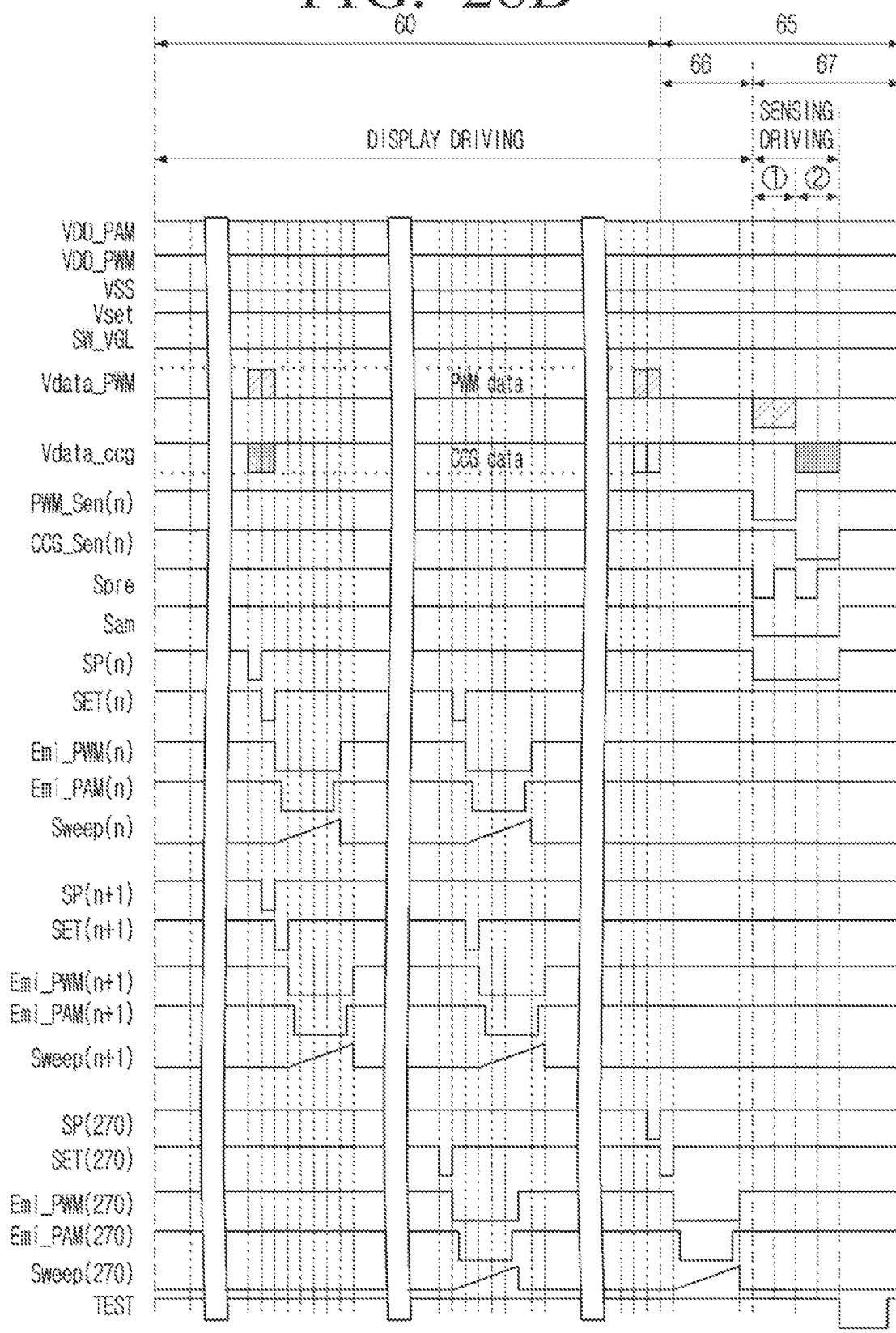
FIG. 28B is a driving timing diagram of the sub-pixel circuit illustrated in FIG. 28A.

FIG. 28A is a detailed circuit diagram of the sub-pixel circuit 110 and the sensing unit 200 according to another embodiment of the present disclosure, and FIG. 28B is a driving timing diagram of the sub-pixel circuit 110 illustrated in FIG. 28A. Since the embodiments illustrated in FIGS. 28A and 28B are similar in the configuration and operating principle to those described above with reference to FIGS. 24A and 24B, redundant descriptions thereof will be omitted and differences therebetween will be mainly described.

In the sub-pixel circuit 110 of FIG. 28A, the SW_VGL signal line is directly connected to the node X. Therefore, unlike the sub-pixel circuit 110 of FIG. 24A, the transistor T1 for applying the SW_VGH signal to the node X during the data setting period is not required.

In FIG. 28A, there is no transistor at a position corresponding to the transistor T1 of FIG. 24A. Accordingly, when the reference numbers of the transistors in FIGS. 28A and 24A are compared, the reference numbers of the transistors at the same position are shown so that FIG. 28A precedes FIG. 24A by one. In the sub-pixel circuit 110 of FIG. 24A, as illustrated in FIG. 24B, the sweep voltage that linearly decreases from the high voltage SW_VGH of the sweep signal to the low voltage of the sweep signal is applied to the node X in the light-emitting period.

However, in the sub-pixel circuit 110 of FIG. 28A, as illustrated in FIG. 28B, the sweep voltage that linearly increases from the low voltage SW_VGL of the sweep signal to the high voltage of the sweep signal is applied to the source terminal of the second driving transistor T2 in the light-emitting period. The operation of the PWM circuit 112 according to the sweep signal Sweep(n) in the embodiment of FIG. 28A will be described in detail by way of example.

For example, in a state in which a voltage (specifically, the PWM data voltage (+14[V])+the threshold voltage (−1[V]) of the second driving transistor T2) of +13[V] is set to the node A during the data setting period, when the sweep signal (e.g., voltage that linearly increases from +10[V] to +15[V]) is applied to the source terminal of the second driving transistor T2, the difference in the voltage between the gate terminal and the source terminal of the second driving transistor T2 decreases from +3[V] to −2[V].

In this case, when difference in the voltage between the gate terminal and the source terminal of the second driving transistor T2, which has decreased from +3[V], reaches the threshold voltage (−1[V]) of the second driving transistor T2, the second driving transistor T2 is turned on, and +14[V], which is a sweep voltage when the second driving transistor T2 is turned on, is applied to the first switching transistor T7, so the first switching transistor T7 is turned off.

The operating mechanism of the PWM circuit 112 of FIG. 28A is the same as the operating mechanism of the PWM circuit 112 described in FIGS. 24A and 24B except for the form of the sweep signal and the terminal to which the sweep signal is input. Since the rest of the contents related to the configuration and operation of the sub-pixel circuit 110 illustrated in FIGS. 28A and 28B may be fully understood through the above-described information in the illustrated contents and FIGS. 24A and 24B, redundant descriptions thereof will be omitted.

Figure 29A:
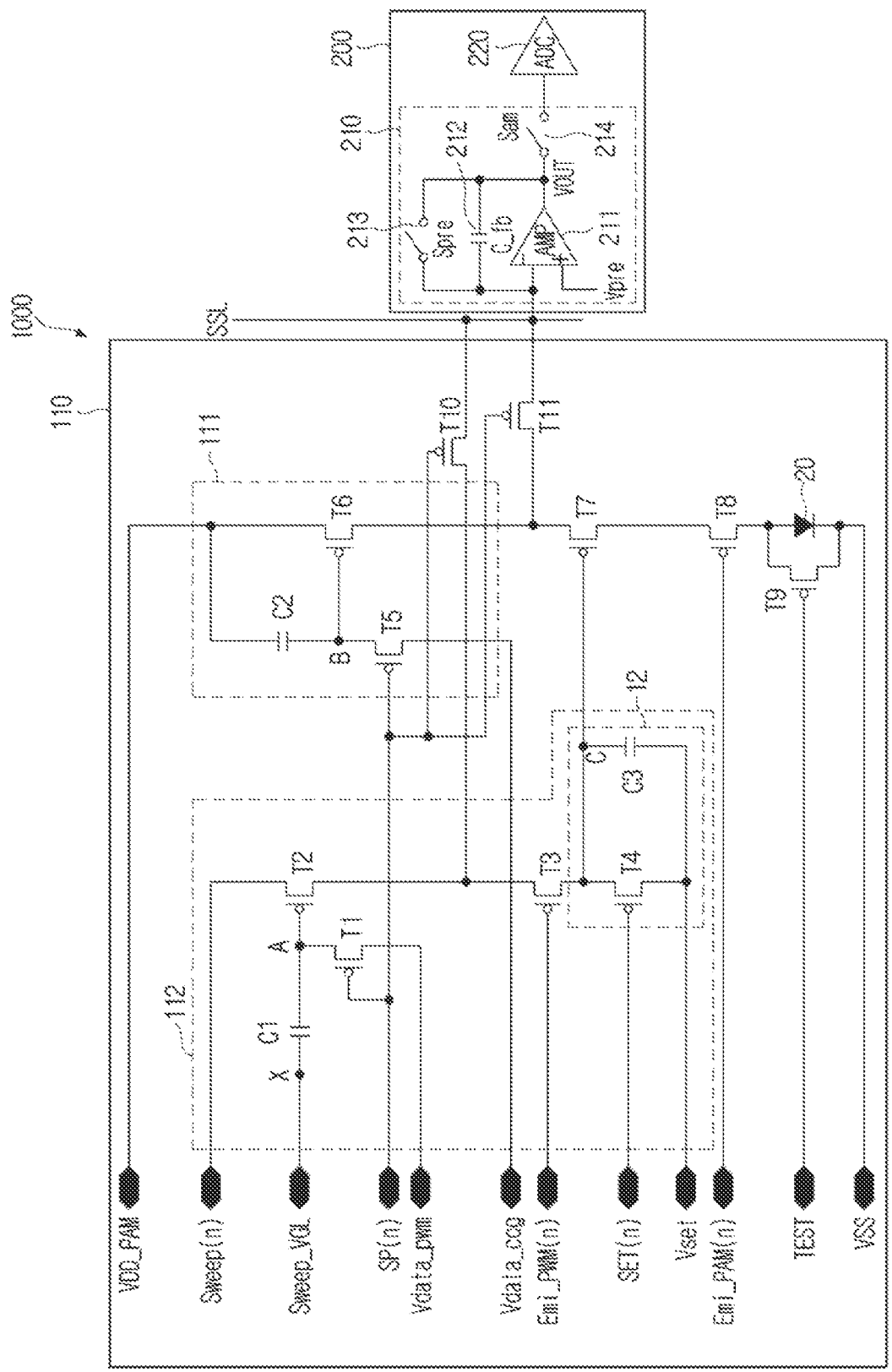
FIG. 29A is a detailed circuit diagram of a sub-pixel circuit and a sensing unit according to another embodiment of the present disclosure.
Figure 29B:
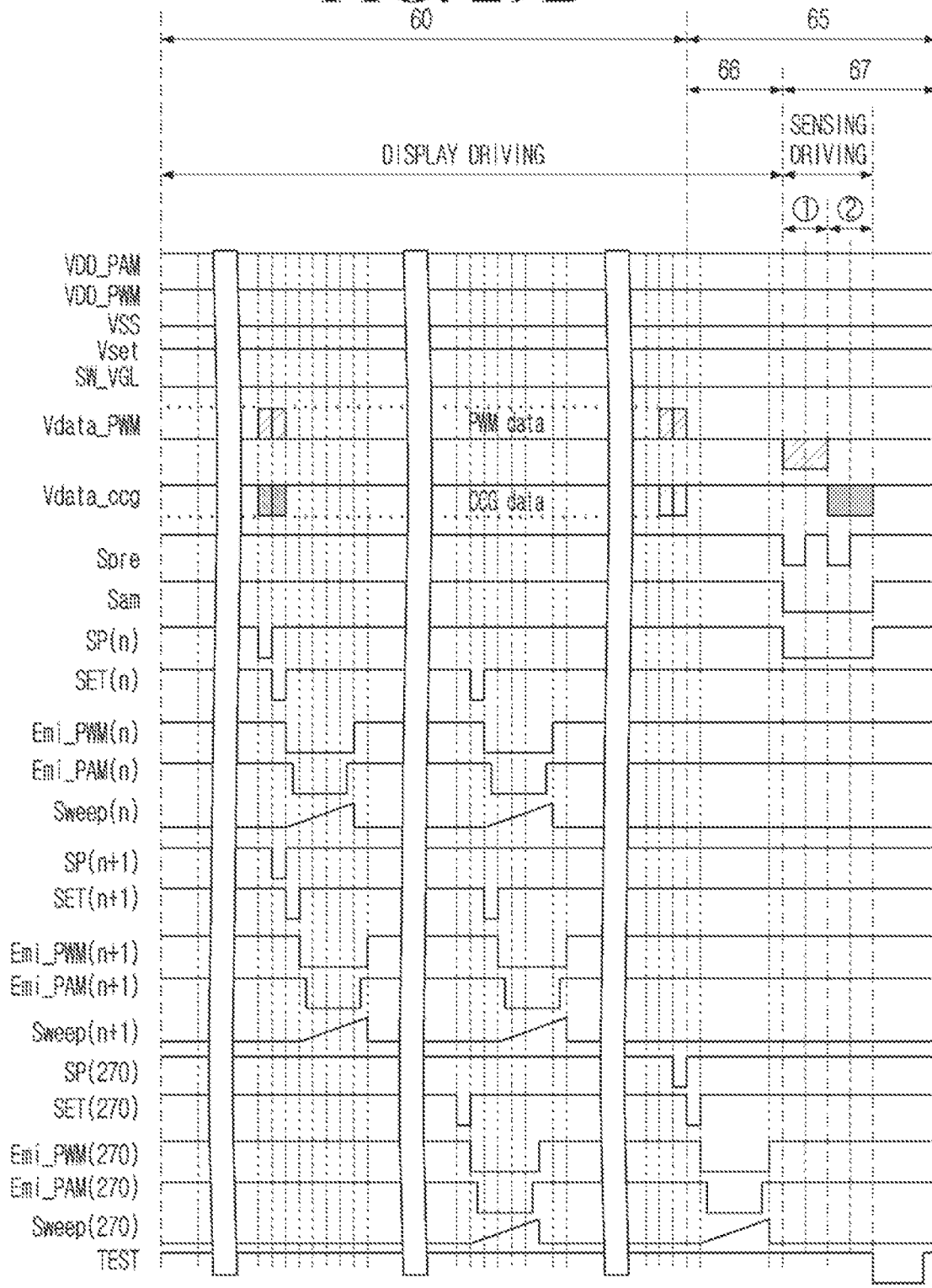
FIG. 29B is timing diagrams of various signals for driving the sub-pixel circuit of FIG. 29A.

FIG. 29A is a detailed circuit diagram of the sub-pixel circuit 110 and the sensing unit 200 according to another embodiment of the present disclosure, and FIG. 29B is a driving timing diagram of various signals for driving the sub-pixel circuit 110 illustrated in FIG. 29A.

The sub-pixel circuit 110 illustrated in FIG. 29A differs from FIG. 28A only in that it uses the scan signal SP(n) without using separate control signals (PWM_Sen(n) and CCG_Sen(n) in FIG. 28A) to control the turn on/off of the transistors T10 and T11, and the rest is the same as the sub-pixel circuit 110 illustrated in FIG. 28A. The drive timing illustrated in FIG. 29B is also the same as the drive timing diagram of FIG. 28B except that the control signals PWM_Sen(n) and CCG_Sen(n) are not present.

In FIGS. 29A and 29B, as the low-level scan signal SP(n) is applied in the data setting period, the transistors T1, T5, T10, and T11 are turned on together. However, in this case, the flow of current to the sensing unit 200 may be prevented by turning off a switch inside the amplifier 211. Therefore, the sensing driving operation is not performed in the data setting period, and only the data setting operation is performed. The switch inside the amplifier 211 may be turned on in the sensing driving period. Therefore, in the sensing driving period, the first current and the second current described above flow in the sensing unit 200, and thus, the above-described sensing driving may be performed.

In this case, the second specific voltage is applied to the gate terminal of the second driving transistor T2 during the sensing period ① of the PWM circuit 112, the first specific voltage is applied to the gate terminal of the first driving transistor T6 during the sensing period ② of the constant current source circuit 111, and the time when the second specific voltage is applied and the time when the first specific voltage is applied do not overlap each other. Therefore, the sensing driving may be performed without problems even without using the separate control signals PWM_Sen(n) and CCG_Sen(n). Since the rest of the contents related to the configuration and operation of the sub-pixel circuit 110 illustrated in FIGS. 29A and 29B may be fully understood through the illustrated contents and the above-described contents, redundant descriptions thereof will be omitted.

Figure 30A:
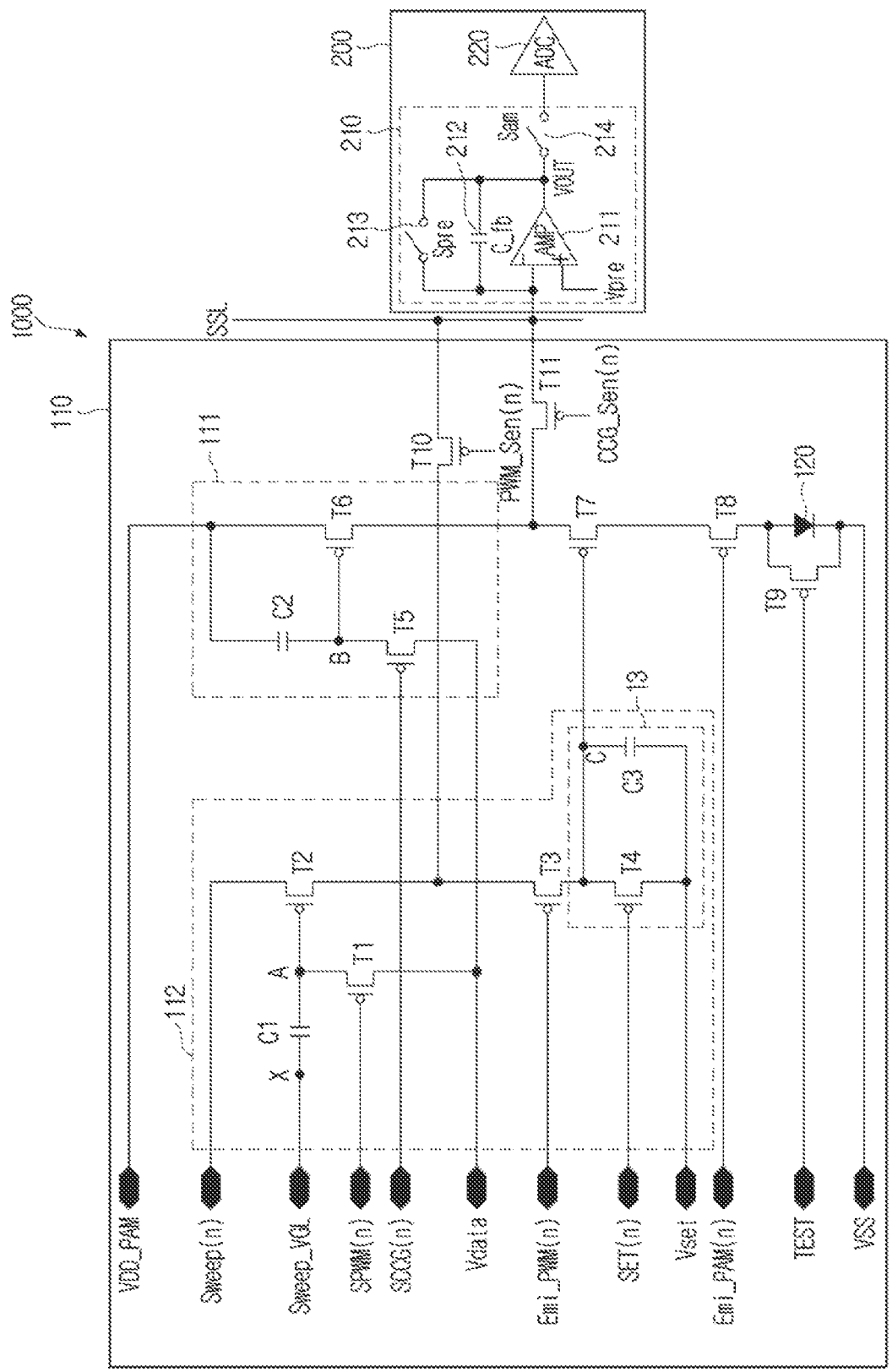
FIG. 30A is a detailed circuit diagram of a sub-pixel circuit and a sensing unit according to another embodiment of the present disclosure.
Figure 30B:
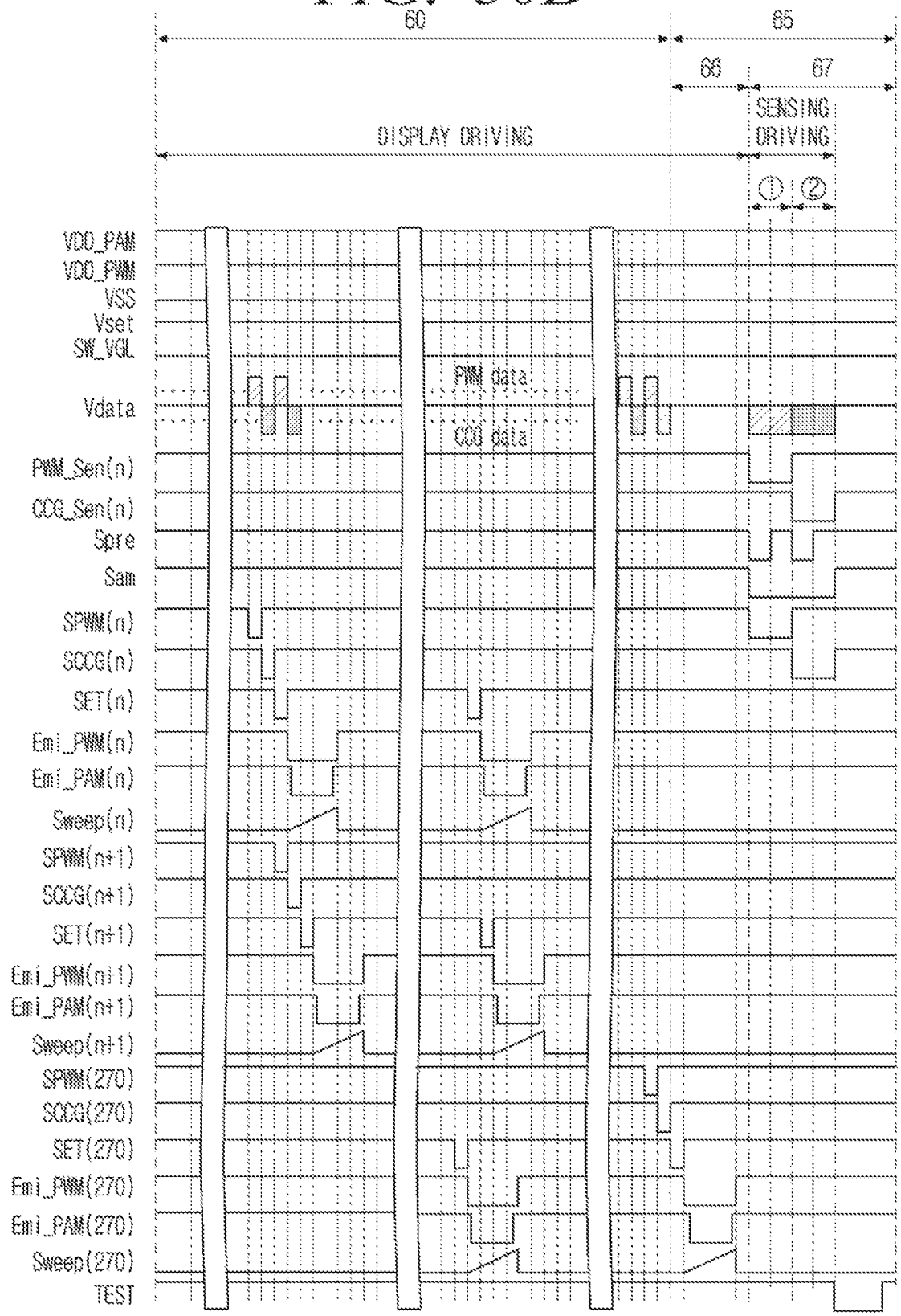
FIG. 30B is a driving timing diagram of the sub-pixel circuit illustrated in FIG. 30A.

FIG. 30A is a detailed circuit diagram of the sub-pixel circuit 110 and the sensing unit 200 according to another embodiment of the present disclosure, and FIG. 30B is a driving timing diagram of the sub-pixel circuit 110 illustrated in FIG. 30A. The sub-pixel circuit 110 illustrated in FIG. 30A is the same as the sub-pixel circuit 110 illustrated in FIG. 28A except that the image data voltage and the specific voltage are applied through one data signal line Vdata. In this case, as described above, two scan signals are required, and the scan signal SPWM(n) and the scan signal SCCG(n) of FIGS. 30A and 30B represent these two scan signals.

In FIGS. 30A and 30B, in the data setting period, when the low-level scan signal SPWM(n) is applied to the sub-pixel circuit 110, the PWM data voltage PWM data is applied to the node A through the turned-on transistor T1. In addition, when the low-level scan signal SCCG(n) is applied to the sub-pixel circuit 110, the constant current generator data voltage (CCG data) is applied to the node B through the turned-on transistor T5.

During the sensing period ① of the PWM circuit 112 in the sensing driving period, when the low-level scan signal SPWM(n) is applied to the sub-pixel circuit 110, the second specific voltage is input to the node A through the turned-on transistor T1. In addition, when the low-level scan signal SCCG(n) is applied to the sub-pixel circuit 110, the first specific voltage is applied to the node B through the turned-on transistor T5. In FIG. 30B, it is exemplified that the scan signals are applied in the order of the SPWM(n) and SCCG(n), but the present disclosure is not limited thereto. According to the embodiment, the SCCG(n) signal may be applied first and the SPWM(n) signal may be applied later.

Since the rest of the contents related to the configuration and operation of the sub-pixel circuit 110 illustrated in FIGS.

30A and 30B may be fully understood through the illustrated contents and the above-described contents, redundant descriptions thereof will be omitted.

Figure 31A:
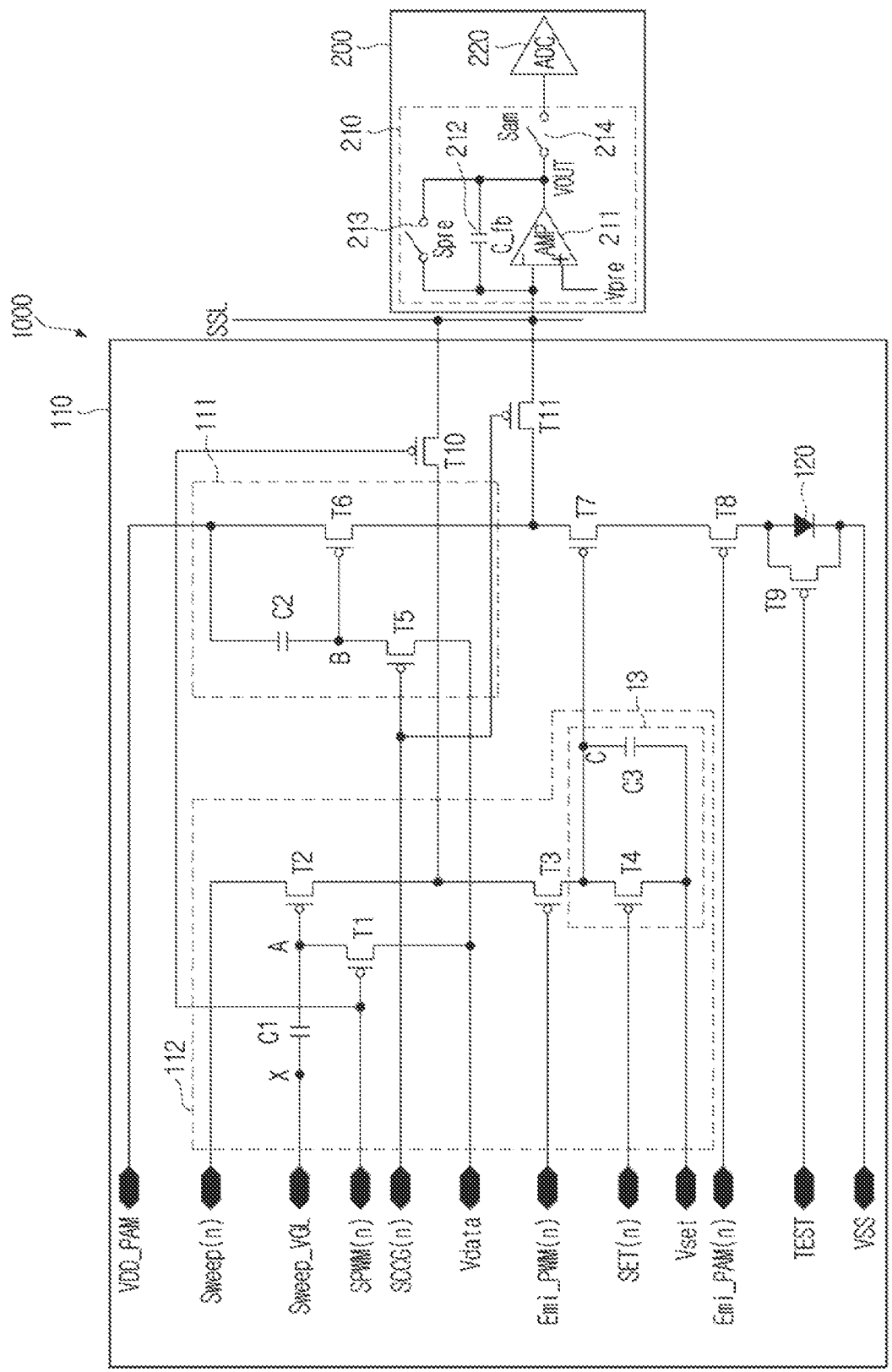
FIG. 31A is a detailed circuit diagram of a sub-pixel circuit and a sensing unit according to another embodiment of the present disclosure.
Figure 31B:
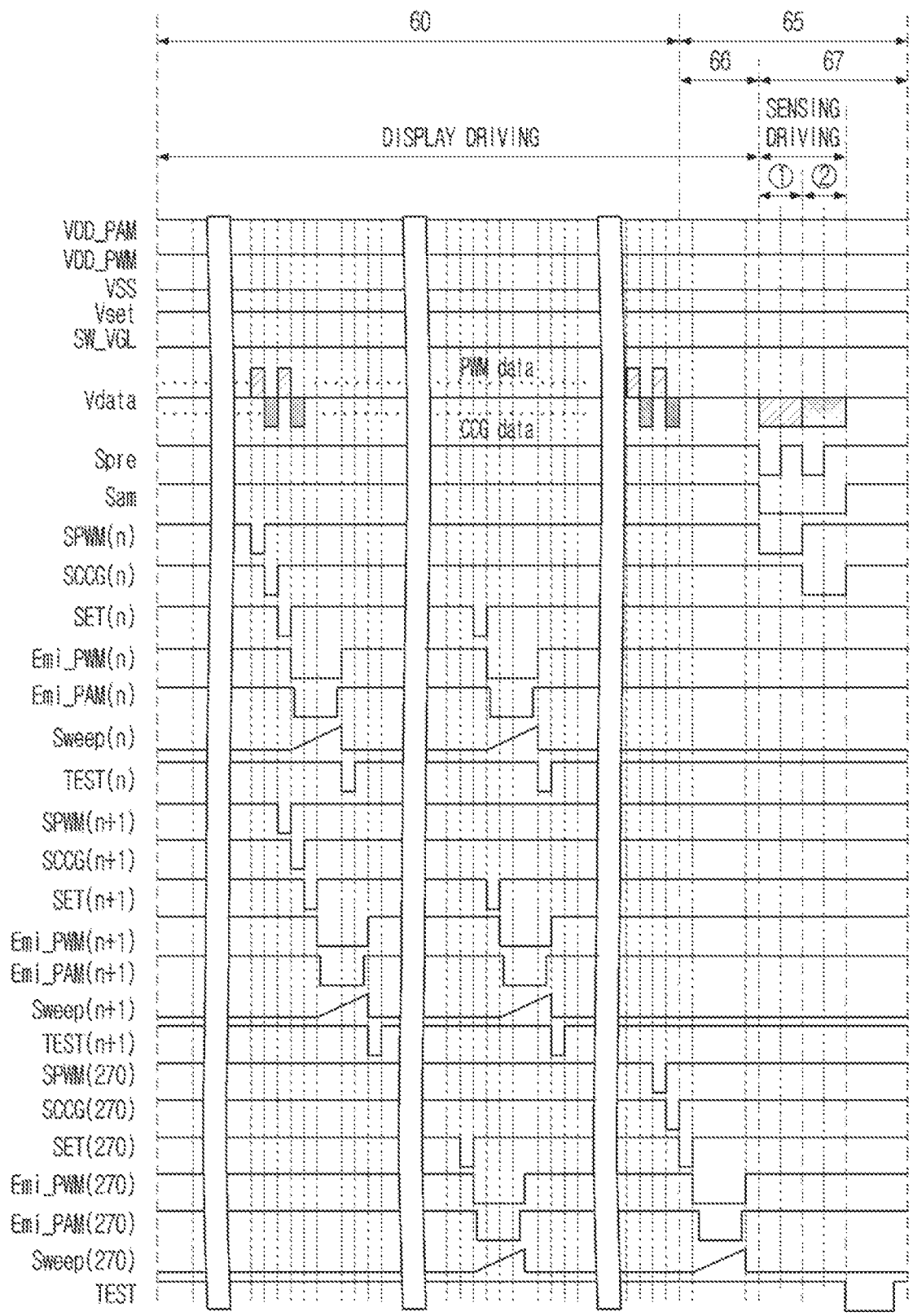
FIG. 31B is a driving timing diagram of the sub-pixel circuit illustrated in FIG. 31A.

FIG. 31A is a detailed circuit diagram of the sub-pixel circuit 110 and the sensing unit 200 according to another embodiment of the present disclosure, and FIG. 31B is a driving timing diagram of the sub-pixel circuit 110 illustrated in FIG. 31A.

The sub-pixel circuit 110 illustrated in FIG. 31A is similar to the sub-pixel circuit 110 of FIG. 30A in that the image data voltages (PWM data voltage and constant current generator data voltage) and the specific voltages (second specific voltage and first specific voltage) are applied through one data signal line Vdata. Therefore, in FIGS. 31A and 31B, the image data voltage and the specific voltage are applied to the sub-pixel circuits 110 in the data setting period and the sensing driving period, respectively, using two scan signals (or scan signal lines) such as SPWM(n) and SCCG(n).

The sub-pixel circuit 110 illustrated in FIG. 31A is similar to the embodiment of FIG. 29A in that it uses the scan signal without using the separate control signals (PWM_Sen(n) and CCG_Sen(n) in FIG. 30A) to control the turn on/off of transistors T10 and T11. In the case of the embodiment of FIG. 31A, since two scan signals such as SPWM(n) and SCCG(n) are used, as illustrated, the gate terminal of the transistor T10 is connected to the scan signal SPWM(n), and the gate terminal of the transistor T11 is connected to the scan signal SCCG(n).

Even in the case of the embodiments of FIGS. 31A and 31B, by turning off the switch inside the amplifier 211 in the data setting period and turning on the switch inside the amplifier 211 in the sensing driving period, the fact that a current may flow in the sensing unit 200 only in the sensing driving period is as described above.

In addition, since the rest of the contents related to the configuration and operation of the sub-pixel circuit 110 illustrated in FIGS. 30A and 30B may be fully understood through the illustrated contents and the above-described contents, redundant descriptions thereof will be omitted.

In the above, the embodiments to which the internal compensation method of the IR drop is applied have an advantage in that the IR drop of the driving voltage is simply compensated for during the operation of the sub-pixel circuit, and the embodiments in which the external compensation method of the IR drop is applied have an advantage in that the relatively small number of transistors are used and the accurate IR drop compensation is possible.

In addition, in the above embodiments in which the PWM data voltage and the constant current generator data voltage are respectively applied through separate wirings such as Vdata_pwm and Vdata_ccg, since two types of data drivers are used to provide the constant current generator data voltage and the PWM data voltage, there is relatively no risk of overheating of the data driver. In addition, the configuration may be relatively simplified in that the scan signal SP(n) may be provided using one type of scan driver. However, since two types of data drivers are used, the cost relatively increases, and the design of the display panel may be relatively complicated in that two types of data signal lines are required.

In the above embodiments in which the PWM data voltage and the constant current generator data voltage are respectively applied through one wiring such as Vdata, the cost is relatively reduced because one type of data driver is used, and the design may be relatively simplified in that one type of data signal line Vdata is sufficient.

However, since the relatively high PWM data voltage and the relatively low constant current generator data voltage are alternately applied to the display panel 100 through one type of data driver, there is a risk of overheating of the data driver, and the configuration may be relatively complicated in that two types of scan drivers are required to provide the scan signal SPWM(n) and the scan signal SCCG(n).

Figure 32A:
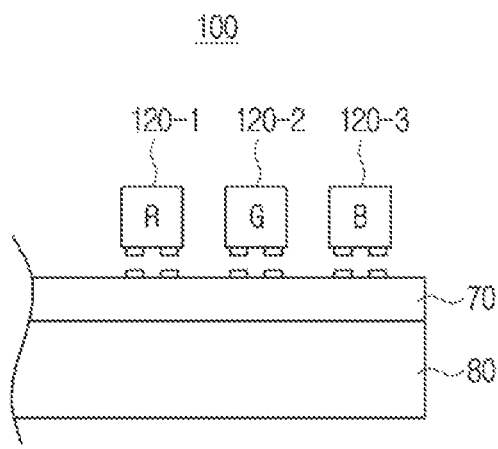
FIG. 32A is a cross-sectional view of a display panel according to an embodiment of the present disclosure.

FIG. 32A is a cross-sectional view of the display panel 100 according to the embodiment of the present disclosure. In FIG. 32A, one pixel included in the display panel 100 is illustrated. In FIG. 32A, the display panel 100 may include a glass substrate 80, a TFT layer 70, and inorganic light-emitting elements R, G, and B 120-1, 120-2, and 120-3. In this case, the above-described sub-pixel circuit 110 may be implemented as a thin film transistor (TFT) and included in the TFT layer 70 on the glass substrate 80. Each of the inorganic light-emitting elements R, G, and B 120-1, 120-2, and 120-3 may be mounted on the TFT layer 70 so as to be electrically connected to the corresponding sub-pixel circuit 110, and configure the above-described sub-pixels.

In the TFT layer 70, the sub-pixel circuit 110 for providing the driving current to the inorganic light-emitting elements 120-1, 120-2, and 120-3 may exist for each inorganic light-emitting element 120-1, 120-2, and 120-3, and each of the inorganic light-emitting elements 120-1, 120-2, and 120-3 may be mounted or disposed on the TFT layer 70 to be electrically connected to the corresponding sub-pixel circuit 110.

In FIG. 32A, it is exemplified that the inorganic light-emitting elements R, G, and B 120-1, 120-2, and 120-3 are micro LEDs of a flip chip type. However, the present disclosure is not limited thereto, and the inorganic light-emitting elements R, G, and B 120-1, 120-2, and 120-3 according to the embodiments may be lateral type or vertical type micro LEDs.

Figure 32B:
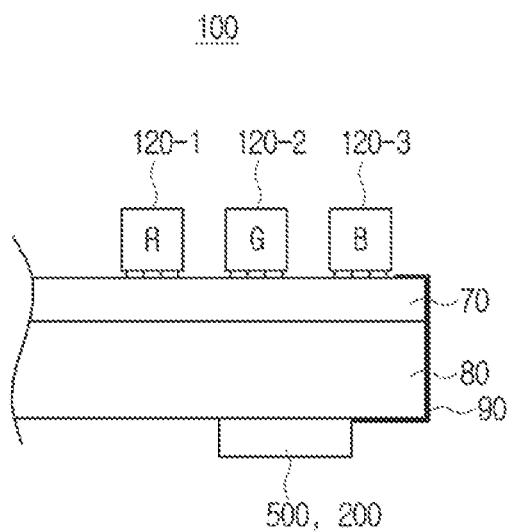
FIG. 32B is a cross-sectional view of a display panel according to another embodiment of the present disclosure.

FIG. 32B is a cross-sectional view of the display panel 100 according to the embodiment of the present disclosure. According to FIG. 32B, the display panel 100 may include the TFT layer 70 formed on one surface of the glass substrate 80, the inorganic light-emitting elements R, G, and B 120-1, 120-2, and 120-3 mounted on the TFT layer 70, the drive unit 500, the sensing unit 200, and a connection wiring 90 for electrically connecting the sub-pixel circuit 110 formed on the TFT layer 70 and the drive unit 500 and/or the sensing units 200.

As described above, according to the embodiment of the present disclosure, at least some of various drivers or circuits of the drive unit 500 may be implemented in the form of a separate chip to be disposed on the back surface of the glass substrate 80, and may be connected to the sub-pixel circuits 110 formed on the TFT layer 70 through the connection wiring 90. In addition, according to the embodiment of the present disclosure, the sensing unit 200 may also be disposed on the back surface of the glass substrate 80, and may be connected to the sub-pixel circuits 110 formed on the TFT layer 70 through the connection wiring 90.

In this regard, in FIG. 32B, the sub-pixel circuits 110 included in the TFT layer 70 are electrically connected to the drive unit 500 and/or the sensing unit 200 through the connection wiring 90 formed on an edge (or side surface) of the TFT panel (hereinafter, the TFT layer 70 and the glass substrate 80 are collectively referred to as a TFT panel). In this case, the connection wiring 90 may include at least some of the above-described scan line SCL, data line DL, and sensing line SSL.

In this way, the reason for connecting the sub-pixel circuits 110 included in the TFT layer 70 to the drive unit 500 and/or the sensing unit 200 by forming the connection wiring 90 at the edge area of the display panel 100 is that, in the case of connecting the sub-pixel circuits 110 and the drive unit 500 and/or the sensing unit 200 by forming a hole penetrating the glass substrate 80, problems such as the occurrence of cracks in the glass substrate 80 due to a temperature difference between the manufacturing process of the TFT panels (the TFT layer 70 and the glass substrate 80) and the process of filling holes with a conductive material may occur.

Figure 32C:
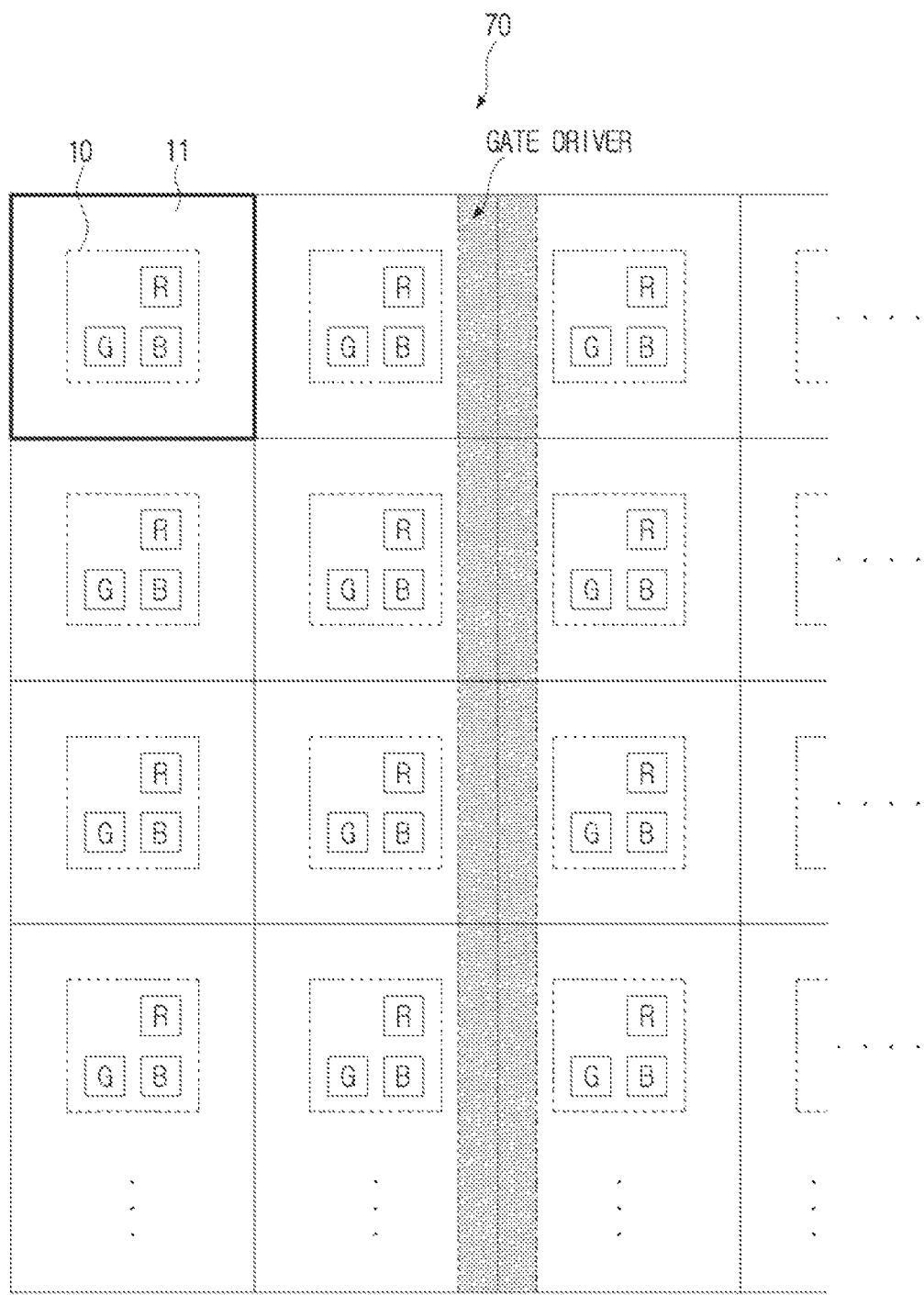
FIG. 32C is a plan view of a TFT layer according to an embodiment of the present disclosure.

As described above, according to another embodiment of the present disclosure, at least some of the above-described various drivers and circuits of the drive unit 500 may be formed on the TFT layer together with the sub-pixel circuits formed on the TFT layer in the display panel 100 and connected to the sub-pixel circuits. FIG. 32C illustrates such an embodiment.

FIG. 32C is a plan view of the TFT layer 70 according to the embodiment of the present disclosure. In FIG. 32C, the remaining area 11 other than the area (in this area, the sub-pixel circuits 110 corresponding to each of the R, G, and B sub-pixels included in the pixel 10 exist) occupied by one pixel 10 in the TFT layer 70 exists. As such, since the remaining areas 11 exist in the TFT layer 70, some of various drivers or circuits of the drive unit 500 described above may be formed in the remaining areas 11.

FIG. 32C shows an example in which the above-described gate drivers are implemented in the remaining area 11 of the TFT layer 70. In this way, the structure in which the gate driver is formed inside the TFT layer 70 may be referred to as a gate in panel (GIP) structure, but the name is not limited thereto.

FIG. 32C is only an example, and circuits that may be included in the remaining area 11 of the TFT layer 70 are not limited to the gate driver. According to the embodiment, the TFT layer 70 may further include a DeMUX circuit for selecting each of the R, G, and B sub-pixels, an Electro Static Discharge (ESD) protective circuit for protecting the sub-pixel circuit 110 from static electricity, a sweep voltage providing circuit, etc.

In the above, the case where the substrate on which the TFT layer 70 is formed is the glass substrate 80 has been exemplified, but the embodiment is not limited thereto. For example, the TFT layer 70 may be formed on a synthetic resin substrate. In this case, the sub-pixel circuits 110 of the TFT layer 70 may be connected to the drive unit 500 and/or the sensing unit 200 through a hole penetrating through the synthetic resin substrate.

In the above, the example in which the sub-pixel circuit 110 is implemented in the TFT layer 70 has been described. However, the embodiment is not limited thereto. That is, according to another embodiment of the present disclosure, when implementing the sub-pixel circuit 110, it is also possible to implement a pixel circuit chip in the form of a sub-miniature microchip in units of sub-pixels or units of pixels without using the TFT layer 70 and mount the pixel circuit chip on a substrate. In this case, the location where the sub-pixel chip is mounted may be, for example, the periphery of the corresponding inorganic light-emitting element 120, but is not limited thereto.

In addition, in one or more embodiments of the present disclosure described above, the TFT constituting the TFT layer (or TFT panel) is not limited to a specific structure or type. That is, the TFTs cited in various examples of the present disclosure may be implemented as a low temperature poly silicon (LTPS) TFT, an oxide TFT, a poly silicon or a-silicon TFT, an organic TFT, a graphene TFT, etc., and in the Si wafer CMOS process, only P type (or N-type) MOSFETs may be made and applied.

As described above, according to one or more embodiments of the present disclosure, it may be possible to prevent the wavelength of light emitted from the inorganic light-emitting element from changing according to the gradation. In addition, it may be possible to easily compensate for stains that may appear in the image due to the difference in the threshold voltage and mobility between the driving transistors. Also, the color correction becomes easy. In addition, when the large area display panel is configured by combining the display panels in the form of modules or when the single large display panel is configured, the stain compensation and the color correction may be more easily possible. In addition, it may be possible to reduce the power consumption consumed when driving the display panel. In addition, it may be possible to compensate for the influence of the drop in driving voltage, which occurs differently for each position of the display panel, on the data voltage setting process. In addition, it may be possible to design the more optimized driving circuit and drive the inorganic light-emitting element stably and efficiently. In addition, it may be possible to improve the problem of the luminance non-uniformity and horizontal crosstalk due to the sweep load.

It will be appreciated by those skilled in the art that various modifications and alterations may be made without departing from the essential characteristics of the present disclosure. In addition, the exemplary embodiments of the present disclosure are not to limit the spirit of the present disclosure, but are to describe the spirit of the present disclosure, and the scope of the present disclosure is not limited by the exemplary embodiments. Therefore, the scope of the present disclosure should be interpreted by the following claims, and it is to be interpreted that all the spirits equivalent to the following claims fall within the scope of the present disclosure.

What is claimed is:

1. A display apparatus comprising:
a display panel comprising:
a pixel array in which pixels including inorganic light-emitting elements are arranged in a plurality of row lines; and
sub-pixel circuits provided for each of the inorganic light-emitting elements and configured to provide a driving current to the inorganic light-emitting elements; and
a driver configured to:
set image data voltages to the sub-pixel circuits of the display panel in a row line order during a data setting period for each row line; and
drive the sub-pixel circuits to provide the driving current to the inorganic light-emitting elements of the pixel array in the row line order, based on a sweep signal sweeping from a first voltage to a second voltage and the set image data voltages during a light-emitting period for each row line,
wherein each of the sub-pixel circuits comprises:
a capacitor that has a first end to which the sweep signal is applied; and
a first driving transistor that is connected to a second end of the capacitor, receives the sweep signal through the capacitor in the light-emitting period, and is configured to control a time instance when the driving current is provided to an inorganic light-emitting element, based on the sweep signal, and wherein the driver is further configured to apply the first voltage to the first end of the capacitor, separately from the sweep signal, in the data setting period, wherein the driver comprises:
- a sweep driver circuit provided for each row line and configured to provide the sweep signal to the first end of the capacitor; and
- a power integrated circuit (IC) configured to provide the first voltage applied separately from the sweep signal to the display panel, and wherein the power IC is configured to provide the first voltage to the first end of the capacitor so that a voltage of the first end of the capacitor is maintained at the first voltage while the image data voltages are set in the data setting period, wherein the first voltage corresponds to a high voltage of the sweep signal.

2. The display apparatus of claim 1, wherein the image data voltages comprise a constant current generator data voltage and a pulse width modulation (PWM) data voltage, and wherein each of the sub-pixel circuits further comprises:
- a constant current source circuit that comprises a second driving transistor and is configured to provide a driving current having a magnitude based on the constant current generator data voltage to the inorganic light-emitting element; and
- a PWM circuit that comprises the first driving transistor and is configured to control a time instance in a case that the driving current is provided to the inorganic light-emitting element based on the PWM data voltage.

3. The display apparatus of claim 2, wherein the constant current source circuit is further configured to set a third voltage based on the constant current generator data voltage and a threshold voltage of the second driving transistor to a gate terminal of the second driving transistor in the data setting period, and wherein the PWM circuit is further configured to generate a fourth voltage based on the PWM data voltage and a threshold voltage of the first driving transistor while the first voltage is applied to one end of the capacitor in the data setting period.

4. The display apparatus of claim 3, wherein the constant current source circuit is further configured to provide a driving current having a magnitude based on the third voltage to the inorganic light-emitting element in the light-emitting period, and wherein the PWM circuit is further configured to control a time instance when the driving current is provided to the inorganic light-emitting element based on a voltage of a gate terminal of the first driving transistor that changes from the fourth voltage based on the sweep signal in the light-emitting period.

5. The display apparatus of claim 2, further comprising:
- a sensor configured to sense a current flowing in the first driving transistor and the second driving transistor of each of the sub-pixel circuits, respectively, based on a specific voltage applied to the sub-pixel circuit, the sensor being configured to output sensing data corresponding to the sensed current sensor; and
- a correction circuit that is configured to correct the constant current generator data voltage and the PWM data voltage applied to the sub-pixel circuits based on the sensing data.

6. The display apparatus of claim 5, wherein the driver is further configured to:
- set the image data voltages in the row line order in the sub-pixel circuits based on a first driving voltage in the data setting period, and
- drive the sub-pixel circuits such that the driving current is provided to the inorganic light-emitting elements of the pixel array in the row line order based on a second driving voltage and the first driving voltage.

7. The display apparatus of claim 5, further comprising a storage configured to store data for compensating for a drop in a driving voltage for each position of the display panel based on the driving current, wherein the correction circuit is further configured to correct the constant current generator data voltage and the PWM data voltage applied to the sub-pixel circuits based on the sensing data and the stored data.

8. The display apparatus of claim 1, wherein the sub-pixel circuits are driven in order of the data setting period and a plurality of light-emitting periods for each row line, and wherein the driver is further configured to drive the sub-pixel circuits of the row line such that a driving current corresponding to the set image data voltage is provided to the inorganic light-emitting elements of the row line in each of the plurality of light-emitting periods.

9. A display apparatus comprising:
- a display panel comprising a pixel array in which pixels comprising inorganic light-emitting elements are arranged in a plurality of row lines and sub-pixel circuits provided for each of the inorganic light-emitting elements and are configured to provide a driving current to the inorganic light-emitting elements; and
- a driver configured to:
  - set image data voltages to the sub-pixel circuits of the display panel in a row line order during a data setting period for each row line, and
  - drive the sub-pixel circuits to provide the driving current to the inorganic light-emitting elements of the pixel array in the row line order, based on a sweep signal sweeping from a first voltage to a second voltage and the set image data voltages during a light-emitting period, wherein each of the sub-pixel circuits comprises:
- a capacitor; and
- a first driving transistor that is connected to a first end of the capacitor, and is configured to control a time instance when the driving current is provided to an inorganic light-emitting element, based on the sweep signal, and wherein the driver is further configured to apply the first voltage to a second end of the capacitor separately from the sweep signal, wherein the driver comprises:
- a sweep driver circuit provided for each row line and configured to provide the sweep signal to the first end of the capacitor; and
- a power integrated circuit (IC) configured to provide the first voltage applied separately from the sweep signal to the display panel, and wherein the power IC is configured to provide the first voltage to the first end of the capacitor so that a voltage of the first end of the capacitor is maintained at the first voltage while the image data voltages are set in the data setting period, wherein the first voltage corresponds to a high voltage of the sweep signal.

10. The display apparatus of claim 9, wherein the image data voltages comprise a constant current generator data voltage and a pulse width modulation (PWM) data voltage, and wherein each of the sub-pixel circuits comprises:
- a constant current source circuit that comprises a second driving transistor, and is configured to provide a driving current having a magnitude based on the constant current generator data voltage to the inorganic light-emitting element; and
- a PWM circuit that comprises the first driving transistor and is configured to control a time instance when the driving current is provided to the inorganic light-emitting element based on the PWM data voltage.

11. The display apparatus of claim 10, wherein the constant current source circuit is further configured to set a third voltage based on the constant current generator data voltage and a threshold voltage of the second driving transistor to a gate terminal of the second driving transistor in the data setting period, and wherein the PWM circuit is further configured to generate a fourth voltage based on the PWM data voltage and a threshold voltage of the first driving transistor while the first voltage is applied to one end of the capacitor in the data setting period.

12. The display apparatus of claim 11, wherein the constant current source circuit is further configured to provide a driving current having a magnitude based on the third voltage to the inorganic light-emitting element in the light-emitting period, and wherein the PWM circuit is further configured to control a time when the driving current is provided to the inorganic light-emitting element based on a difference in voltage between a source terminal and a gate terminal of the first driving transistor that changes based on the sweep signal in the light-emitting period.

13. The display apparatus of claim 9, wherein the sub-pixel circuits are driven in order of the data setting period and a plurality of light-emitting periods for each row line, and wherein the driver is further configured to drive the sub-pixel circuits of the row line such that a driving current corresponding to the set image data voltage is provided to the inorganic light-emitting elements of the row line in each of the plurality of light-emitting periods.

* * * * *